United States Patent
Ueda

(10) Patent No.: US 12,294,783 B2
(45) Date of Patent: May 6, 2025

(54) IMAGE PICKUP APPARATUS, ACCESSORY APPARATUS, AND COMMUNICATION CONTROL METHOD

(71) Applicant: CANON KABUSHIKI KAISHA, Tokyo (JP)

(72) Inventor: Masaru Ueda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 18/320,430

(22) Filed: May 19, 2023

(65) Prior Publication Data

US 2023/0379577 A1 Nov. 23, 2023

(30) Foreign Application Priority Data

May 23, 2022 (JP) .................................. 2022-083901

(51) Int. Cl.
  *H04N 23/663* (2023.01)
  *H04L 67/104* (2022.01)

(52) U.S. Cl.
  CPC ......... *H04N 23/663* (2023.01); *H04L 67/104* (2013.01)

(58) Field of Classification Search
  CPC ...... H04N 23/663; H04N 23/55; H04N 23/69; H04N 23/665; H04N 23/80; H04L 67/104;

(Continued)

(56) References Cited

U.S. PATENT DOCUMENTS 5,003,399 A * 3/1991 Ishimaru ................ G03B 17/14
                                                396/529
9,360,738 B2 * 6/2016 Imafuji .................... G02B 7/08
(Continued)

FOREIGN PATENT DOCUMENTS

JP     6427287 B1    11/2018

OTHER PUBLICATIONS

Extended European search report issued in European Appln. No. 23174485.5, mailed on Oct. 10, 2023.
(Continued)

*Primary Examiner* — Chiawei Chen
(74) *Attorney, Agent, or Firm* — ROSSI, KIMMS & McDOWELL LLP

(57) ABSTRACT

A camera is operable while a plurality of accessory apparatuses are connected to the camera. The camera perform first communication for simultaneous communication with the plurality of accessory apparatuses using a data communication channel, and second communication for individual communication with a specific accessory apparatus among the plurality of accessory apparatuses using the data communication channel. In performing the second communication with the plurality of accessory apparatuses by switching between specific accessory apparatuses in a predetermined order within one or more communication periods, at least one of the communication period, a communication speed, a data packet number, a data packet length, and a combination and order of a communication source and a communication destination to be communicated for each communication period is determined based on accessory information acquired from the plurality of accessory apparatuses.

17 Claims, 31 Drawing Sheets

(58) Field of Classification Search
CPC ... G03B 17/565; G03B 2206/00; G03B 17/14
See application file for complete search history.

(56) References Cited

U.S. PATENT DOCUMENTS

| | | | | |
|---|---|---|---|---|
| 9,769,229 | B2* | 9/2017 | Morotomi | G06F 1/1624 |
| 10,750,078 | B2* | 8/2020 | Seki | H04N 23/663 |
| 10,965,853 | B2* | 3/2021 | Inoue | H04N 23/60 |
| 11,006,031 | B2 | 5/2021 | Watanabe | |
| 11,297,666 | B2* | 4/2022 | Bang | H04W 76/14 |
| 11,385,527 | B2* | 7/2022 | Okada | H04N 23/663 |
| 11,743,582 | B2* | 8/2023 | Tsuchiya | H04N 23/651 |
| | | | | 348/211.1 |
| 2007/0005845 | A1* | 1/2007 | Abe | G06F 3/123 |
| | | | | 710/62 |
| 2011/0170853 | A1* | 7/2011 | Osawa | G03B 7/20 |
| | | | | 396/529 |
| 2012/0155853 | A1* | 6/2012 | Osawa | G03B 17/14 |
| | | | | 396/529 |
| 2015/0069244 | A1* | 3/2015 | Ko | G01S 7/4816 |
| | | | | 250/338.4 |
| 2015/0070521 | A1 | 3/2015 | Yasuda | |
| 2015/0177848 | A1* | 6/2015 | Jung | H04N 21/482 |
| | | | | 715/810 |
| 2015/0261069 | A1* | 9/2015 | Imafuji | H04N 23/65 |
| | | | | 348/211.4 |
| 2015/0281534 | A1 | 10/2015 | Nakata et al. | |
| 2015/0334258 | A1* | 11/2015 | O'Neill | H04N 1/00307 |
| | | | | 348/207.1 |
| 2019/0306392 | A1 | 10/2019 | Imamura | |
| 2020/0007744 | A1 | 1/2020 | Sugiyama | |
| 2020/0014828 | A1* | 1/2020 | Inoue | H04N 23/74 |
| 2020/0029015 | A1* | 1/2020 | Kawai | H04N 23/665 |
| 2020/0092461 | A1 | 3/2020 | Watanabe | |
| 2020/0145718 | A1 | 5/2020 | Kurita et al. | |
| 2020/0288521 | A1* | 9/2020 | Bang | H04W 76/15 |
| 2021/0132470 | A1* | 5/2021 | Okada | H04N 23/54 |
| 2021/0227140 | A1 | 7/2021 | Ohishi | |

OTHER PUBLICATIONS

Extended European Search Report issued in European Appln. No. 23174486.3 mailed Oct. 26, 2023.

Okada. Copending U.S. Appl. No. 18/320,514, filed May 19, 2023 (the application is not yet available to the public and the Examiner has ready access to the application).

Office Action issued in U.S. Appl. No. 18/320,514, mailed Nov. 21, 2024.

* cited by examiner

| | CHARACTERISTIC INFORMATION | LENS | ADAPTER |
|---|---|---|---|
| (a1) | FUNCTION | IMAGE STABILIZATION (1ms PERIODIC COMMUNICATION) | WITH CONTROL RING (16ms PERIODIC COMMUNICATION) |
| (a2) | SUPPORTED BAUD RATE | 2.5Mbps, 2Mbps, 1Mbps, 500kbps | 2.5Mbps, 2Mbps, 1Mbps, 500kbps |
| (a3) | COMMUNICATION DIRECTION SWITCHING TIME | t1 = 80us<br>t2 = 20us<br>t3 = 80us | t1 = 90us<br>t2 = 20us<br>t3 = 90us |
| (a4) | TRANSMISSION/RECEPTION BUFFER SIZE | TRANSMISSION: 64byte<br>RECEPTION: 64byte | TRANSMISSION: 32byte<br>RECEPTION: 32byte |

FIG. 12

| | PARAMETER | | DETERMINED VALUE |
|---|---|---|---|
| (b1) | PERIOD | | 1ms |
| (b2) | BAUD RATE | | 2.5Mbps |
| (b3) | DATA PACKET LENGTH | | C→L: 32byte, L→C: 20byte<br>C→A: 20byte, A→C: 20byte |
| (b4) | STRUCTURE WITHIN ONE PERIOD | MAXIMUM DATA PACKET NUMBER | THREE |
| (b5) | | TYPE AND NUMBER OF DATA PACKETS | FIRST TO FOURTEENTH PERIODS:<br>C→L, L→C ONE EACH<br>FIFTEENTH PERIOD:<br>C→L, L→C, C→A ONE EACH<br>SIXTEENTH PERIOD:<br>C→L, L→C, A→C ONE EACH |
| (b6) | | ORDER OF DATA PACKETS (PRIORITY) | (1) C→L (2) L→C (3) C→A (4) A→C |

FIG. 13

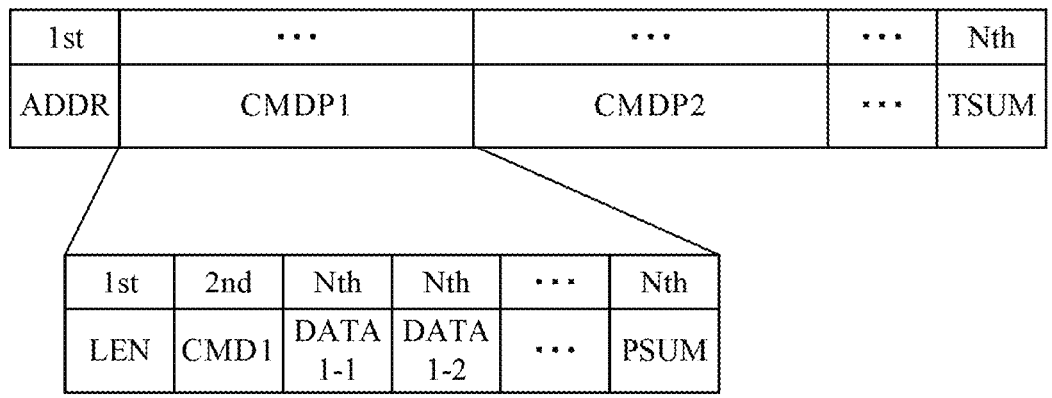
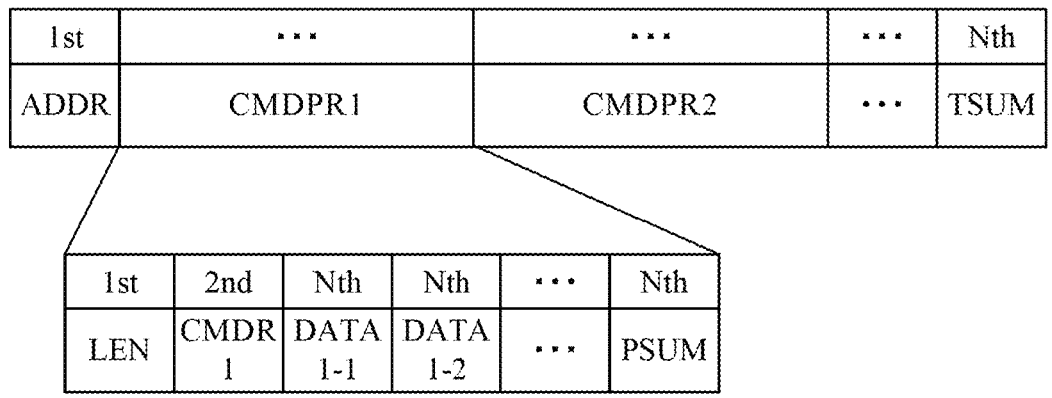
FIG. 15

| PARAMETER | | PRE-CHANGE | POST-CHANGE |
|---|---|---|---|
| | MAX DATA PACKET NUMBER | THREE | THREE |
| STRUCTURE WITHIN ONE PERIOD | TYPE AND NUMBER OF DATA PACKETS | FIRST TO FOURTEENTH PERIODS: C→L, L→C ONE EACH FIFTEENTH PERIOD: C→L, L→C, C→A ONE EACH SIXTEENTH PERIOD: C→L, L→C, A→C ONE EACH | FIRST PERIOD: C→L, L→C, C→A ONE EACH SECOND PERIOD: C→L, L→C, A→C ONE EACH |
| | ORDER OF DATA PACKETS (PRIORITY) | (1) C→L (2) L→C (3) C→A (4) A→C | (1) C→L (2) C→A (3) A→C (4) L→C |
| DATA PACKET LENGTH | | C→L: 32byte, L→C: 20byte C→A: 20byte, A→C: 20byte | C→L: 32byte, L→C: 20byte C→A: 32byte, A→C: 20byte |

FIG. 17

| CHARACTERISTIC INFORMATION | | LENS | | | ADAPTER | | |
|---|---|---|---|---|---|---|---|
| FUNCTION | | IMAGE STABILIZATION | STATUS NOTIFICATION | | CONTROL RING | STATUS NOTIFICATION | |
| | | FUNCTION INFORMATION 1 | FUNCTION INFORMATION 3 | | FUNCTION INFORMATION 2 | FUNCTION INFORMATION 3 | |
| (a11) | FUNCTION INFORMATION | | | | | | |
| (a12) | REQUIRED PERIOD | 1ms | - | | 16ms | - | |
| (a13) | REQUIRED DATA SIZE | 24byte (C→L) | 12byte(C→L), 12byte(L→C) | | 16byte (A→C) | 12byte(C→A), 12byte(A→C) | |
| SUPPORTED BAUD RATE | | 2.5Mbps, 2Mbps, 1Mbps, 500Kbps | | | 2.5Mbps, 2Mbps, 1Mbps, 500Kbps | | |
| COMMUNICATION DIRECTION SWITCHING TIME | | t1=70us, t2=10us, t3=70us | | | t1=70us, t2=10us, t3=70us | | |
| TRANSMISSION/RECEPTION BUFFER SIZE | | TRANSMISSION: 64byte RECEPTION: 64byte | | | TRANSMISSION: 64byte RECEPTION: 64byte | | |

| PARAMETER | DETERMINED VALUE |
|---|---|
| COMMUNICATION PERIOD | 1ms |
| COMMUNIDATION BAUD RATE | 2.5Mbps |
| DATA PACKET SIZE | C→L: 42byte, L→C: 14byte<br>C→A: 14byte, A→C: 30byte |

FIG. 24

| CHARACTERISTIC INFORMATION | LENS | | | ADAPTER | | |
|---|---|---|---|---|---|---|
| FUNCTION | IMAGE STABILIZATION | STATUS NOTIFICATION | | CONTROL RING | STATUS NOTIFICATION | |
| FUNCTION INFORMATION | FUNCTION INFORMATION 1 | FUNCTION INFORMATION 3 | | FUNCTION INFORMATION 2 | FUNCTION INFORMATION 3 | |
| REQUIRED PERIOD | 1ms | - | | 16ms | - | |
| REQUIRED DATA SIZE | 24byte(C→L) | 12byte(C→L),<br>12byte(L→C) | | 16byte(A→C) | 12byte(C→A),<br>12byte(A→C) | |
| SUPPORTED BAUD RATE | 2.5Mbps, 2Mbps, 1Mbps, 500Kbps | | | 2.5Mbps, 2Mbps, 1Mbps, 500Kbps | | |
| COMMUNICATION DIRECTION SWITCHING TIME | t1=70us, t2=10us, t3=70us | | | t1=70us, t2=10us, t3=70us | | |
| TRANSMISSION/RECEPTION BUFFER SIZE | TRANSMISSION: 64byte<br>RECEPTION: 64byte | | | TRANSMISSION: 8byte<br>RECEPTION: 8byte | | |

| PARAMETER | DETERMINED VALUE |
|---|---|
| COMMUNICATION PERIOD | 1ms |
| COMMUNICATION BAUD RATE | 2.5Mbps |
| DATA PACKET SIZE | C→L:46byte, L→C:18byte<br>C→A:8byte, A→C:8byte |

IMAGE PICKUP APPARATUS, ACCESSORY APPARATUS, AND COMMUNICATION CONTROL METHOD

BACKGROUND

Technical Field

One of the aspects of the disclosure relates to a communication control technology between an image pickup apparatus (referred to as a camera hereinafter) and an accessory apparatus attached to it.

Description of Related Art

The camera, interchangeable lenses, and accessory apparatus such as an intermediate adapter operate as a camera system while they communicate with each other. Japanese Patent No. 6427287 discloses a camera system that can perform broadcast communication in which a camera simultaneously communicates with a plurality of accessory apparatuses, and Peer-to-Peer (P2P) communication in which a camera designates a specific accessory apparatus and individually communicates with this specific accessory apparatus. Even in a case where a plurality of accessory apparatuses are attached to a camera, the camera can communicate with an arbitrary accessory apparatus using these communication methods.

In order for the camera to perform P2P communication with a specific accessory apparatus in the camera system disclosed in Japanese Patent No. 6427287, communication specifying the specific accessory apparatus is first performed, and then communication for switching a communication method and a communication direction, etc. is to be performed. Therefore, communications other than the P2P communication take a longer time than the P2P communication. As a result, it is necessary to restrict communication with another accessory apparatus or reduce the communication frequency with a specific accessory apparatus in order to secure communication between a camera and a specific accessory apparatus at a desired timing.

SUMMARY

One of the aspects of the present disclosure provides an image pickup apparatus, an accessory apparatus, and the like, each of which can realize excellent communication between a camera and an accessory apparatus by performing efficient data communication between the camera and the accessory apparatus.

A camera according to one aspect of the disclosure is operable while a plurality of accessory apparatuses are connected to the camera. The camera includes a memory device that stores a set of instructions, and at least one processor that executes the instructions to control communication with the plurality of accessory apparatuses using a notification channel for notification with the plurality of accessory apparatuses and a data communication channel for data communication with the plurality of accessory apparatuses, and perform first communication for simultaneous communication with the plurality of accessory apparatuses using the data communication channel, and second communication for individual communication with a specific accessory apparatus among the plurality of accessory apparatuses using the data communication channel. In performing the second communication with the plurality of accessory apparatuses by switching between specific accessory apparatuses that communicate in a predetermined order within one or more communication periods, at least one of the communication period, a communication speed, a data packet number, a data packet length, and a combination and an order of a communication source and a communication destination to be communicated for each communication period is determined based on accessory information acquired from the plurality of accessory apparatuses. A communication control method corresponding to the above camera also constitutes another aspect of the disclosure. A storage medium storing a program that causes a computer to execute the above communication control method also constitutes another aspect of the disclosure.

An accessory apparatus according to another aspect of the disclosure is connectable to a camera that is operable while a plurality of accessory apparatuses are connected to the camera. The accessory apparatus includes a memory device that stores a set of instructions, and at least one processor that executes the instructions to control communication with the camera using a notification channel for notification with the camera and a data communication channel for data communication with the camera, and perform first communication for simultaneous communication from the camera to the plurality of accessory apparatuses using the data communication channel, and second communication for individual communication with the camera using the data communication channel. In performing the second communication with the plurality of accessory apparatuses by switching between specific accessory apparatuses that communicate in a predetermined order within one or more communication periods, at least one of the communication period, a communication speed, a data packet number, a data packet length, and a combination and order of a communication source and a communication destination to be communicated for each communication period is determined based on accessory information acquired by the camera from the plurality of accessory apparatuses. A communication control method corresponding to the above accessory apparatus also constitutes another aspect of the disclosure. A storage medium storing a program that causes a computer to execute the above communication control method also constitutes another aspect of the disclosure.

Further features of the disclosure will become apparent from the following description of embodiments with reference to the attached drawings.

BRIEF DESCRIPTION OF THE DRAWINGS

FIG. 12 illustrates characteristic information that the camera receives from the accessory in the first embodiment.

FIG. 13 illustrates setting information for the time-division communication determined based on the characteristic information according to the first embodiment.

FIG. 15 illustrates an internal structure of a data packet according to the first embodiment.

FIG. 17 illustrates setting information for each of pre-change time-division communication and post-change time-division communication in the first embodiment.

FIG. 20 illustrates characteristic information that a camera receives from an accessory according to a second embodiment.

FIG. 23 illustrates setting information for time-division communication determined based on characteristic information according to the second embodiment.

FIG. 24 illustrates characteristic information that a camera receives from an accessory according to a third embodiment.

DESCRIPTION OF THE EMBODIMENTS

Referring now to the accompanying drawings, a description will be given of embodiments according to the disclosure. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

First Embodiment

Figure 1:
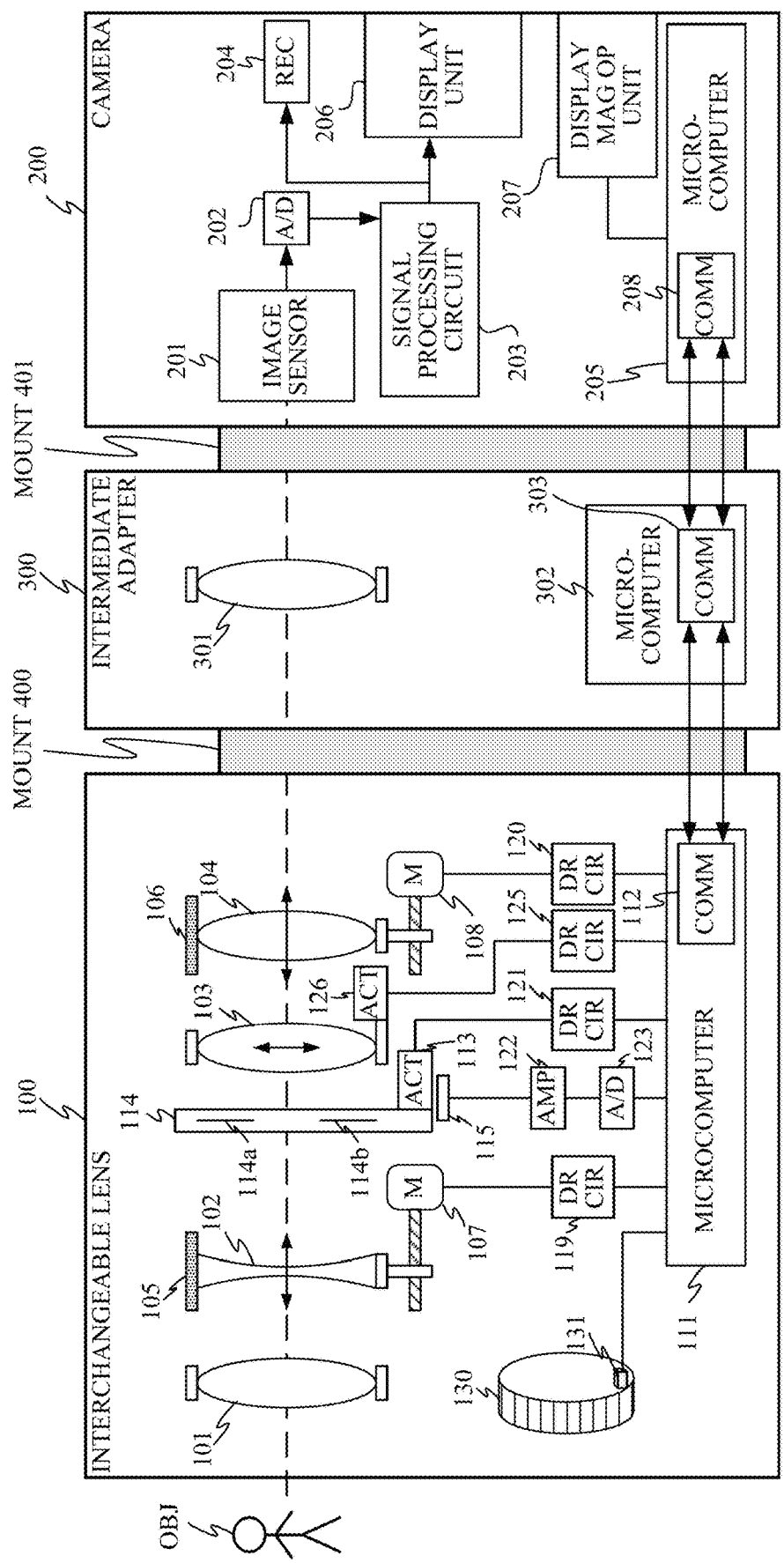
FIG. 1 is a block diagram illustrating a configuration of a camera system according to a first embodiment.

FIG. 1 illustrates a camera system according to a first embodiment of the disclosure. The camera system includes a camera (image pickup apparatus) 200, an interchangeable lens 100, and an intermediate adapter 300 mounted between the camera 200 and the interchangeable lens 100. The interchangeable lens 100 and intermediate adapter 300 serve as an accessory apparatus connected to a camera 200 that is operable while a plurality of accessory apparatuses are connected (attached) to the camera. Attachment to the camera 200 here includes not only direct connection to the camera 200 but also indirect connection via an accessory apparatus such as an intermediate adapter 300. In other words, it may be communicably connected to the camera 200. A plurality of intermediate adapters may be attached between the camera 200 and the interchangeable lens 100.

Control commands and internal information are communicated among the camera 200, the interchangeable lens 100, and the intermediate adapter 300 via their respective communication units. Among the camera 200, the interchangeable lens 100, and the intermediate adapter 300, communication (first communication) using the broadcast communication method and communication (second communication) using the P2P communication method are performed.

The broadcast communication method is a communication method for one-to-many communication (simultaneous communication) in which data is simultaneously transmitted from the camera 200 as a communication master to each accessory apparatus as a communication slave. In the following description, communication based on the broadcast communication method will be referred to as broadcast communication. The P2P communication method is a communication method in which the camera 200 as a communication master performs one-to-one communication with one accessory apparatus serving as a communication slave as a communication party (communication entity, specific accessory apparatus).

The P2P communication method includes two communication methods. One communication method requires the designation of a communication party each time the camera 200 switches the communication party. The communication method does not require the designation of the communication party and switches the communication party with the camera 200 in a predetermined order. In the following description, communication using the communication method that requires the designation of a communication party will be referred to as party specified communication, and communication using the communication method in which communication parties are switched in order will be referred to as time-division communication. The party specified communication and time-division communication will be collectively referred to as P2P communication.

In party specified communication, the camera 200 transmits information specifying (designating) a communication party to each accessory apparatus by broadcast communication. In time-division communication, the camera 200 transmits information such as the order of accessory apparatuses serving as communication parties and a communication direction to each accessory apparatus by broadcast communication.

When P2P communication is started, the communication party of the camera 200 is notified to each accessory apparatus. Thus, in P2P communication, the camera 200 does not need to send information for identifying the communication party to each accessory apparatus. Specifying a communication party with the camera 200 through broadcast communication and then shifting to P2P communication with that communication party can improve a communication speed in P2P communication.

Party specified communication is to specify the next communication party in broadcast communication whenever the communication party is switched, but the camera 200 can select an arbitrary communication party according to the situation. Time-division communication can further improve the communication speed because the switching timing of the communication party and communication direction has already been determined and the time required to specify a communication party can be saved, although the degree of freedom in selecting a communication party is lower than party specified communication.

<Configuration of Camera System>

The intermediate adapter 300 is mechanically and electrically connected to the camera 200 via a mount 401 as a coupling mechanism. The intermediate adapter 300 receives power from the camera 200 via an unillustrated power supply terminal provided on the mount 401, and operates an adapter microcomputer (MICRO-COMP) 302 as an accessory control unit.

The interchangeable lens 100 is mechanically and electrically connected to the intermediate adapter 300 via a mount 400 as a coupling mechanism. The interchangeable lens 100 receives power from the camera 200 via an unillustrated power terminal provided on the mount 400 and a power terminal provided on the mount 401 described above. The interchangeable lens 100 that receives power from the camera 200 operates various actuators and a lens microcomputer 111, which will be described below. The interchangeable lens 100, the intermediate adapter 300, and the camera 200 communicate with one another via communication terminals (which will be described below) provided on the mounts 400 and 401, respectively.

The interchangeable lens 100 includes an imaging optical system. The imaging optical system includes, in order from an object OBJ side, a field lens 101, a magnification varying lens 102 for magnification variation, an aperture (stop) unit 114 for adjusting a light amount, an image stabilizing lens 103 for image stabilization, and a focus lens 104 for performing focusing.

The magnification varying lens 102 and focus lens 104 are held by lens holding frames 105 and 106, respectively. The lens holding frames 105 and 106 are guided by unillustrated guide shafts so as to be movable in the optical axis direction indicated by a broken line in FIG. 1, and are driven by stepping motors 107 and 108 in the optical axis direction, respectively. The stepping motors 107 and 108 respectively move the magnification varying lens 102 and the focus lens 104 in synchronization with the driving pulse.

The image stabilizing lens 103 reduces (corrects) image blur caused by camera shake such as manual shake by moving in a direction orthogonal to the optical axis of the imaging optical system.

The lens microcomputer 111 is an accessory control unit configured to control the operation of each component in the interchangeable lens 100. The lens microcomputer 111 receives a control command transmitted from the camera 200 via a lens communication unit (COMM) 112 as an accessory communication unit, and receives a transmission request for lens data. The lens microcomputer 111 performs lens control corresponding to the control command, and transmits the lens data corresponding to the transmission request to the camera 200 via the lens communication unit 112.

The lens microcomputer 111 outputs a driving signal to a zoom driving circuit (DR CIR) 119 and a focus driving circuit (DR CIR) 120 in accordance with a command relating to magnification variation and focusing among the control commands to drive the stepping motors 107 and 108. Thereby, zoom processing for controlling the magnification varying operation by the magnification varying lens 102 and autofocus (AF) processing for controlling the focusing operation by the focus lens 104 are performed.

The aperture unit 114 has aperture blades 114a and 114b. Positions of the aperture blades 114a and 114b are detected by a Hall element 115 and input to the lens microcomputer 111 via an amplifier circuit 122 and an A/D conversion circuit 123. The lens microcomputer 111 outputs a driving signal to an aperture driving circuit (DR CIR) 121 based on the input signal from the A/D conversion circuit 123 to drive an aperture actuator 113. Thereby, a light amount adjusting operation by the aperture unit 114 is controlled.

The lens microcomputer 111 drives an image stabilizing actuator 126 via an image stabilizing driving circuit (DR CIR) 125 in accordance with the vibration detected by an unillustrated vibration sensor such as a vibration gyroscope provided in the interchangeable lens 100. Thereby, image stabilizing processing for controlling the shift operation of the image stabilizing lens 103 is performed.

The intermediate adapter 300 is an extender for extending a focal length of the interchangeable lens 100 in this embodiment. The intermediate adapter 300 is not limited to an extender, and can use those having various functions. For example, The intermediate adapter 300 may have a built-in filter that changes the transmittance of light transmitting through the interchangeable lens 100. This intermediate adapter 300 may have a plurality of internal filters with different light transmittances and be able to select a proper filter according to an imaging situation or the like.

The intermediate adapter 300 includes a magnification varying lens 301 configured to extend the focal length of the interchangeable lens 100 and an adapter microcomputer 302 as accessory control unit configured to control the operation of each part in the intermediate adapter 300. The adapter microcomputer 302 receives a control command transmitted from the camera 200 via an adapter communication unit (COMM) 303 as an accessory communication unit, and performs adapter control corresponding to the control command. The adapter microcomputer 302 also transmits adapter data corresponding to a transmission request from the camera 200 to the camera 200 via the adapter communication unit 303.

The camera 200 includes an image sensor 201 such as a CCD sensor or CMOS sensor, an A/D conversion circuit 202, a signal processing circuit 203, a recorder (REC) 204, a camera microcomputer 205, and a display unit 206.

The image sensor 201 photoelectrically converts an object image formed by the imaging optical system in the interchangeable lens 100 and outputs an electric signal (analog signal). The A/D conversion circuit 202 converts an analog signal from the image sensor 201 into a digital signal. The signal processing circuit 203 performs various image processing for the digital signal from the A/D conversion circuit 202 to generate a video signal.

The signal processing circuit 203 generates focus information indicating a contrast state of an object image, that is, a focus state of the imaging optical system, and luminance information indicating an exposure state from the video signal. The signal processing circuit 203 outputs the video signal to the display unit 206, and the display unit 206 displays the video signal as a live-view image for checking the composition, focus state, and the like.

The camera microcomputer 205 as a camera control unit controls the camera 200 according to an input from a camera operation member such as an imaging instruction switch and various setting switches (not illustrated). The camera microcomputer 205 transmits a control command relating to the magnification varying operation of the magnification varying lens 102 to the lens microcomputer 111 via the camera communication unit 208 in accordance with the operation of an unillustrated zoom switch. The camera microcomputer 205 transmits to the lens microcomputer 111 via the camera communication unit 208 a control command relating to the light amount adjusting operation of the aperture unit 114 according to the luminance information and the focusing operation of the focus lens 104 according to the focus information.

The camera microcomputer 205 simultaneously transmits data to the intermediate adapter 300 and the interchangeable lens 100 in broadcast communication, and performs one-to-one data communication with either the intermediate adapter 300 or the interchangeable lens 100 in P2P communication.

<Configuration of Communication Circuit>

Figure 2:
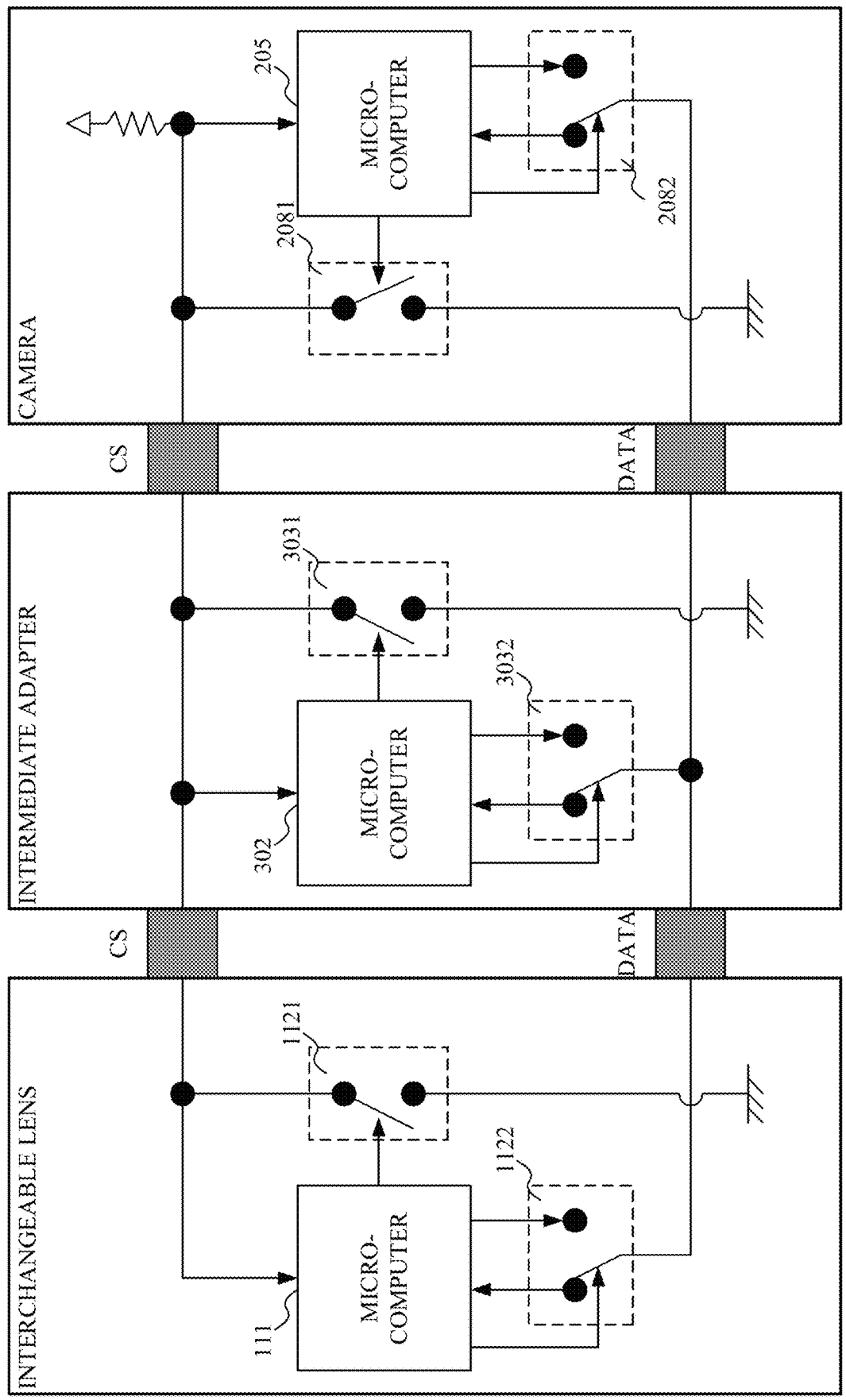
FIG. 2 illustrates a communication circuit in the camera system according to the first embodiment.

Referring now to FIG. 2, a description will be given of a communication circuit configured in a camera system including the camera 200, the intermediate adapter 300, and the interchangeable lens 100. The communication circuit includes a notification channel (first communication channel) CS for notification of a communication timing, a communication party, etc., and a data communication channel (second communication channel) DATA for data communication.

The camera 200 and the intermediate adapter 300 are connected via the mount 401 as described in FIG. 1. The mount 401 is provided with at least two communication terminals. The intermediate adapter 300 and the interchangeable lens 100 are connected via a mount 400. The mount 400 is provided with at least two communication terminals. The notification channel CS and the data communication channel DATA are formed through communication terminals provided on each mount.

The notification channel CS is connected to the camera microcomputer 205, the adapter microcomputer 302, and the lens microcomputer 111, and each microcomputer can detect a signal level (voltage level) of the notification channel CS. The notification channel CS is pull-up-connected to an unillustrated power source disposed in the camera 200. The notification channel CS can be grounded via a ground switch 2081 included in the camera 200 and grounded via a ground switch 3031 included in the intermediate adapter 300. The notification channel CS can be grounded via a ground switch 1121 included in the interchangeable lens 100.

Due to this circuit configuration, any ground switch included in the camera 200, the intermediate adapter 300, and the interchangeable lens 100 can be set to a connected state (first setting) to set a signal level of the notification channel CS to a low level (first level). Setting all the ground switches included in the camera 200, the intermediate adapter 300, and the interchangeable lens 100 to a cutoff state (second setting) can set a signal level of the notification channel CS to a high level (second level).

Each microcomputer can change the connection state between the notification channel CS and the ground by changing the connection state of the ground switch. In other words, each microcomputer can set a signal level of the notification channel CS to either a high level or a low level by changing the connection state of the ground switch.

For example, the camera microcomputer 205 can set the signal level of the notification channel CS to a low level by connecting the ground switch 2081 included in the camera 200. In the following description, connecting the ground switch will be described as "outputting Low to the notification channel CS," and disconnecting the ground switch will be described as "outputting High to the notification channel CS."

That is, in a case where all microcomputers output High to the notification channel CS, the signal level of the notification channel CS becomes high. In a case where one of the microcomputers outputs Low to the notification channel CS, the signal level of the notification channel CS becomes low. The role of the notification channel CS during data communication will be described below.

The data communication channel DATA is a bidirectional data communication channel that can switch a data propagation direction. The data notification channel DATA is connected to the camera microcomputer 205, the adapter microcomputer 302, and the lens microcomputer 111.

The data communication channel DATA is connected to the camera microcomputer 205 via an input/output (I/O) switch included in the camera 200. The camera microcomputer 205 includes a data output unit for transmitting data and a data input unit for receiving data. The camera microcomputer 205 selectively connects the data communication channel DATA to one of the data output unit and the data input unit according to the operation of the input/output switch 2082.

The data communication channel DATA is connected to the adapter microcomputer 302 via an input/output switch 3032 included in the intermediate adapter 300. The adapter microcomputer 302 includes a data output unit for transmitting data and a data input unit for receiving data. The adapter microcomputer 302 selectively connects the data communication channel DATA to one of the data output unit and the data input unit according to the operation of the input/output switch 3032.

The data communication channel DATA is connected to the lens microcomputer 111 via an input/output switch 1122 included in the interchangeable lens 100. The lens microcomputer 111 includes a data output unit for transmitting data and a data input unit for receiving data. The lens microcomputer 111 selectively connects the data communication channel DATA to one of the data output unit and the data input unit according to the operation of the input/output switch 1122. This circuit configuration can properly switch the data propagation direction (communication direction) of the data communication channel DATA.

<Data Format>

Figure 3:
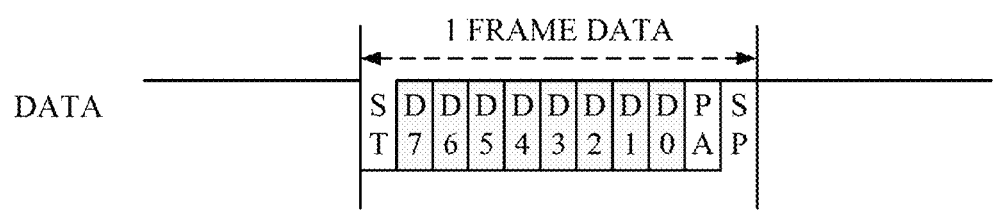
FIG. 3 illustrates a format of data transmitted and received in the first embodiment.

FIG. 3 illustrates a format of data communicated via the data communication channel DATA. The data format is illustrated in an asynchronous communication system in which the communication speed is preset for both the data transmission side and the data reception side, and data communication is performed at the communication bit rate based on this setting. The communication bit rate indicates a data amount that can be transferred in one second, and is expressed in units of bps (bits per second). FIG. 3 illustrates a signal waveform of one frame as the minimum communication unit.

The signal level of the data communication channel DATA is maintained at a high level in a case where data communication is not performed. Thereafter, in order to notify the data receiving side of the start of data transmission, the signal level of the data communication channel DATA is set to a low level for one bit period. This 1-bit period will be called a start bit ST, and a data frame starts from the start bit ST. 1-byte data is transmitted in an 8-bit period from the 2nd bit to the 9th bit following the start bit ST.

The data bit array in MSB (Most Significant Bit) first format starts with the highest data D7, followed by data D6, D5, D4, . . . , D1, and ends with the lowest data D0. 1-bit parity information (PA) is added to the tenth bit, and the signal level of the data communication channel DATA is set to a high level during a period of a stop bit SP indicating the end of one frame. Thereby, the data frame period started from the start bit ST ends. The parity information need not be 1 bit, and a plurality of bits of parity information may be added. The parity information is not essential, and the format may have no parity information.

The data bit array in LSB (Least Significant Bit) first format may start with the lowest data D0, followed by data D1, D2, D3, . . . D6, and ends with the highest data D7. In this embodiment, 1-byte data is transmitted in an 8-bit period, but 1-byte data may be transmitted in bit periods other than the 8-bit period.

<Broadcast Communication>

Figure 4:
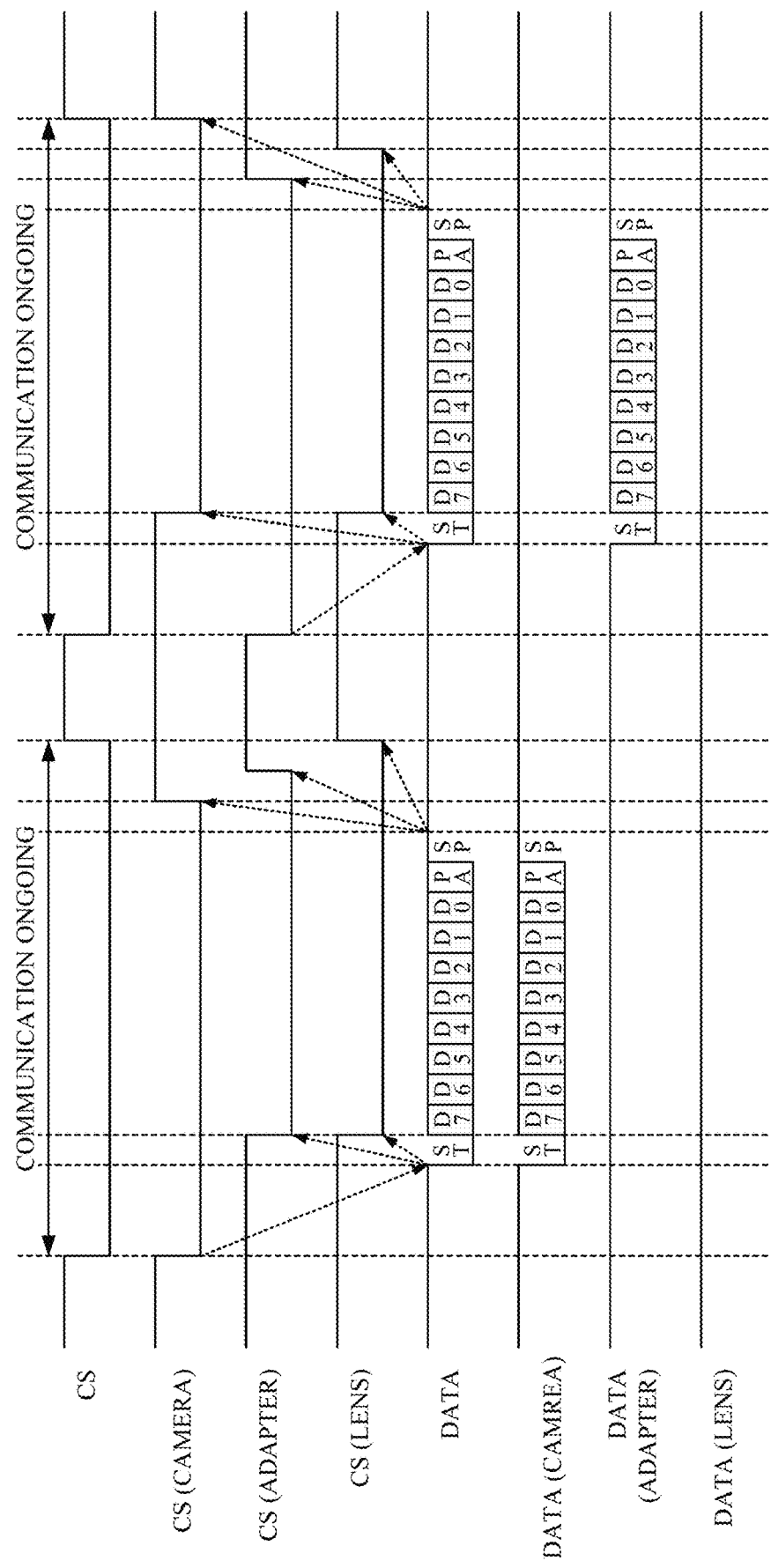
FIG. 4 illustrates signal waveforms in broadcast communication according to the first embodiment.

FIG. 4 illustrates waveforms of signals transmitted and received in broadcast communication. In broadcast communication, the camera 200 (camera microcomputer 205) as the communication master outputs Low to the notification channel CS to notify the interchangeable lens 100 (lens microcomputer 111) and the intermediate adapter 300 (adapter microcomputer 302) as communication slaves of the start of broadcast communication. Next, the camera microcomputer 205 transmits data to the lens microcomputer 111 and the adapter microcomputer 302 via the data communication channel DATA.

The lens microcomputer 111 and the adapter microcomputer 302 output Low to the notification channel CS upon detecting the start bit ST via the data communication channel DATA. Since the camera microcomputer 205 has outputted Low when the lens microcomputer 111 and the adapter microcomputer 302 output Low to the notification channel CS, the signal level of the notification channel CS remains Low.

The lens microcomputer 111 and the adapter microcomputer 302 notify the camera microcomputer 205 of the communication standby request by outputting Low to the notification channel CS. The communication standby request is to temporarily stop the communication in the camera system, and the presence or absence of the communication standby request is determined according to the signal level of the notification channel CS.

The camera microcomputer 205 outputs High to the notification channel CS after transmitting all data. The lens microcomputer 111 and the adapter microcomputer 302 receive the stop bit SP transmitted from the data communication channel DATA, and then analyze the received data and perform internal processing corresponding to the received data. Thereafter, the lens microcomputer 111 and the adapter microcomputer 302 output High to the notification channel CS in response to the preparation for executing the next communication.

The signal level of the notification channel CS becomes high in a case where all components of the camera system output High to the notification channel CS. The camera microcomputer 205, the lens microcomputer 111, and the adapter microcomputer 302 can confirm that the signal level of the notification channel CS has returned to a high level, and that each component constituting the camera system is ready for the next communication.

In FIG. 4, the data transmitted by the camera microcomputer 205 includes a transmission request command to the adapter microcomputer 302, and the data transmission by the adapter microcomputer 302 follows the data transmission by the camera microcomputer 205. More specifically, after the signal level of the notification channel CS becomes high, the adapter microcomputer 302 outputs Low to the notification channel CS. Thereby, the adapter microcomputer 302 notifies the lens microcomputer 111 and the camera microcomputer 205 of the start of broadcast communication. Next, the adapter microcomputer 302 transmits data to the lens microcomputer 111 and the camera microcomputer 205 via the data communication channel DATA.

The lens microcomputer 111 and the camera microcomputer 205 output Low to the notification channel CS upon detecting the start bit ST via the data communication channel DATA. Since the adapter microcomputer 302 has outputted Low to the notification channel CS when the lens microcomputer 111 and the camera microcomputer 205 output Low to the notification channel CS, the signal level of the notification channel CS remains low.

After transmitting all the data, the adapter microcomputer 302 outputs High to the notification channel CS. After receiving the stop bit SP transmitted from the data communication channel DATA, the lens microcomputer 111 and the camera microcomputer 205 analyze the received data and perform internal processing corresponding to the received data. Thereafter, the lens microcomputer 111 and the camera microcomputer 205 output High to the notification channel CS in response to the preparation for executing the next communication.

The signal level of the notification channel CS becomes high in a case where all components constituting the camera system output High to the notification channel CS. The camera microcomputer 205, the lens microcomputer 111, and the adapter microcomputer 302 confirm that the signal level of the notification channel CS has returned to a high level, and that each component constituting the camera system is ready for the next communication.

As described above, in broadcast communication, the data transmission side outputs Low to the notification channel CS to change the signal level of the notification channel CS from High to Low, thereby notifying the data reception side of the start of broadcast communication. The data receiving side notifies each component of the camera system of cancellation of the communication standby request by changing the output to the notification channel CS from Low to High.

The broadcast communication illustrated in FIG. 4 is merely illustrative, and other broadcast communications may be performed. For example, the data transmitted and received in single broadcast communication may be multi-byte data instead of 1-byte data.

In switching the communication method from broadcast communication to P2P communication, data for instructing switching of the communication method is transmitted from the camera microcomputer 205 to the lens microcomputer 111 and the adapter microcomputer 302.

<Party Specified Communication>

Figure 5:
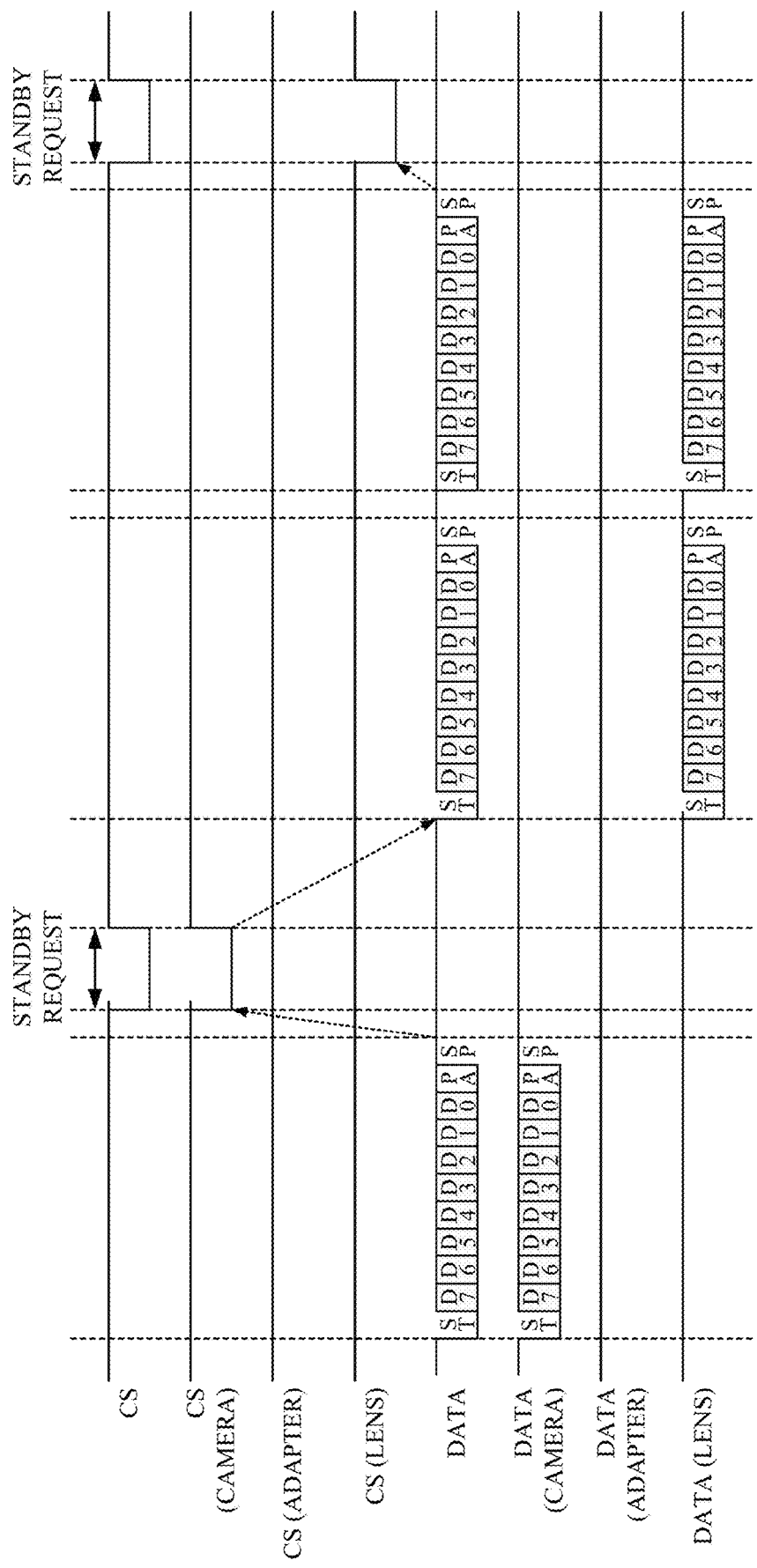
FIG. 5 illustrates signal waveforms in party specified communication according to the first embodiment.

FIG. 5 illustrates waveforms of signals transmitted and received in party specified communication of P2P communication. In party specified communication, the camera 200 (camera microcomputer 205) as a communication master individually communicates with a single component selected (designated) as a communication slave among the components (interchangeable lens 100 and intermediate adapter 300) in the camera system. FIG. 5 illustrates a case where the interchangeable lens 100 (lens microcomputer 111) is selected as a communication slave (specific accessory apparatus).

Information indicating a communication slave in party specified communication is transmitted by broadcast communication. In party specified communication, the data transmission side does not output Low to the notification channel CS, and transmits data to the data reception side while maintaining the notification channel CS high. That is, in party specified communication, a voltage level of the notification channel CS during data transmission from the camera microcomputer 205 to the lens microcomputer 111 and the adapter 300 (adapter microcomputer 302) is made different from that in broadcast communication.

In a case where switching from broadcast communication to party specified communication is executed, data transmission from the camera microcomputer 205, as a communication master to the lens microcomputer 111 is first started. FIG. 5 illustrates an example in which 2-byte data is transmitted from the lens microcomputer 111 to the camera microcomputer 205 after 1-byte data is transmitted from the camera microcomputer 205 to the lens microcomputer 111. The camera microcomputer 205 transmits data to the lens microcomputer 111 via the data communication channel DATA. In a case where the data transmission is completed, the camera microcomputer 205 outputs Low to the notification channel CS to notify the communication standby request. Then, the camera microcomputer 205 outputs High to the notification channel CS again after completing the preparation for receiving data as the data receiving side.

The lens microcomputer 111 recognizes that the data transmission from the camera microcomputer 205 is completed by the fact that the signal level of the notification channel CS becomes low, analyzes the received data, and performs internal processing corresponding to the received data. In the example of FIG. 5, the data received from the camera microcomputer 205 includes a data transmission request from the lens microcomputer 111 to the camera microcomputer 205, and the lens microcomputer 111 generates data to be transmitted to the camera microcomputer 205.

Thereafter, the lens microcomputer 111 recognizes that the communication standby request has been canceled because the signal level of the notification channel CS returns to a high level, and transmits 2-byte data to the camera microcomputer 205. In a case where the data transmission is completed, the lens microcomputer 111 outputs Low to the notification channel CS to notify the communication standby request. The lens microcomputer 111 outputs High to the notification channel CS again after completing the preparation for receiving data as the data receiving side. The adapter microcomputer 302 that is not selected as a communication party in party specified communication does not change the output to the notification channel CS or does not participate in data transmission and reception.

The lens microcomputer 111 determines whether party specified communication is continuing or switching to broadcast communication is performed based on the data transmission timing from the camera microcomputer 205 after outputting High to the notification channel CS again. If receiving data from the camera microcomputer 205 while the signal level of the notification channel CS remains high, the lens microcomputer 111 determines that the party specified communication is continuing. If receiving data from the camera microcomputer 205 after the signal level of the notification channel CS has changed to a low level, the lens microcomputer 111 determines that the party specified communication has been switched to broadcast communication.

As described above, in party specified communication, the data transmission side notifies the data reception side that the data transmission side has completed data transmission by changing the output to the notification channel CS from High to Low. Therefore, in party specified communication, a plurality of data frames can be continuously transmitted until the data transmission side changes the signal level of the notification channel CS. Since the communication configuration is not such that communication from a communication master is inserted whenever a communication slave transmits one data frame, high-speed communication can be secured between the camera microcomputer 205 and the accessory apparatus such as the lens microcomputer 111 and the adapter microcomputer 302.

In this camera system, the camera microcomputer 205, lens microcomputer 111, and adapter microcomputer 302 switch the notification channel CS between Low and High so that the signal level of the notification channel CS can be changed after data transmission. This change in the signal level of the notification channel CS is used as a signal for switching between the data transmission side and the data reception side. The data transmission side notifies a communication standby request by maintaining the signal level of the notification channel CS low until the data reception preparation as the data reception side in the next communication is completed.

<Switching Between Broadcast Communication and Party Specified Communication>

Figure 6:
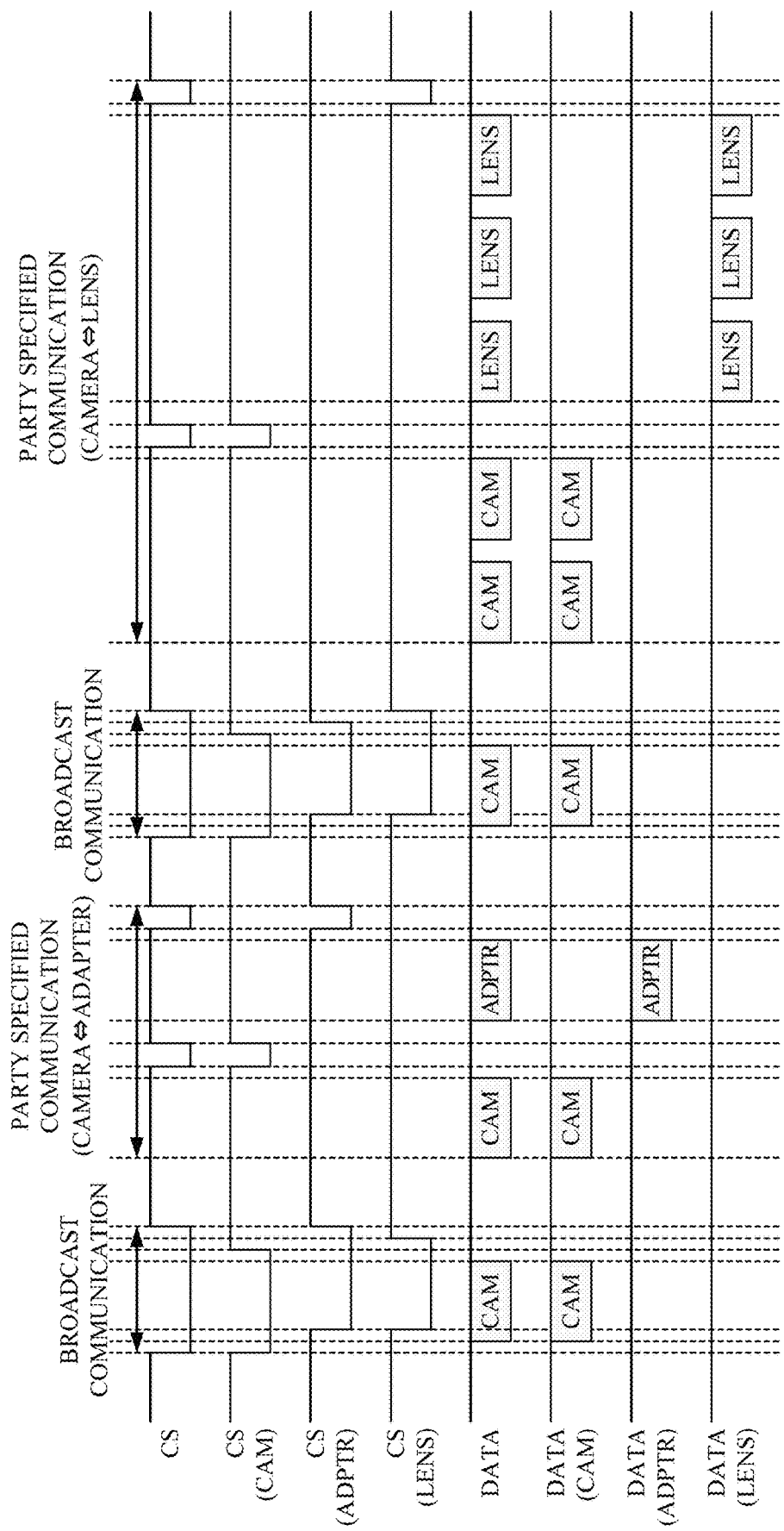
FIG. 6 illustrates signal waveforms in switching communication methods according to the first embodiment.

FIG. 6 illustrates waveforms of signals in a case where broadcast communication and party specified communication are switched and executed. In both broadcast communication and party specified communication, the camera (CAM) 200 (camera microcomputer 205) becomes the communication master and communicates with the intermediate adapter (ADPTR) 300 (adapter microcomputer 302) and the interchangeable lens (LENS) 100 (lens microcomputer 111). Information indicating the communication party for the camera microcomputer 205 in party specified communication is notified in broadcast communication.

First, information indicating that the adapter microcomputer 302 has been selected as a communication party in party specified communication is transmitted and received in broadcast communication, and then party specified communication is performed between the camera microcomputer 205 and the adapter microcomputer 302. Information indicating a communication party in party specified communication will be hereinafter referred to as communication party specified data. A description will now be given of communication party specified data that has a function as a command for switching from broadcast communication to party specified communication. Party specified communication may be switched by transmitting and receiving a signal instructing switching from broadcast communication to party specified communication separately from communication party specified data.

The lens microcomputer 111 that is not selected as a communication party in party specified communication outputs High to the notification channel CS when the analysis of the data received from the camera microcomputer 205 and internal processing are completed after receiving the communication party specified data. While party specified communication is being performed between the camera microcomputer 205 and the adapter microcomputer 302, the setting corresponding to the broadcast communication is maintained without changing the output to the notification channel CS.

In a case where the switching to party specified communication is completed, the adapter microcomputer 302 notifies the camera microcomputer 205 of the communication method switching completion by outputting High to the notification channel CS. The camera microcomputer 205 outputs High to the notification channel CS in a case where switching to party specified communication is completed. The lens microcomputer 111 that is not selected as a communication party in the party specified communication outputs High to the notification channel CS when analysis of data received from the camera microcomputer 205 and internal processing are completed.

In a case where the camera microcomputer 205 detects that the signal level of the notification channel CS has become high, it starts the party specified communication illustrated in FIG. 5. An outline of communication in party specified communication is as explained in FIG. 5.

In a case where the party specified communication between the camera microcomputer 205 and the adapter microcomputer 302 ends, the camera microcomputer 205 transmits communication party specified data indicating that the lens microcomputer 111 has been selected as the communication party in the party specified communication by broadcast communication. Thereafter, party specified communication is performed between the camera microcomputer 205 and the lens microcomputer 111.

The adapter microcomputer 302 recognizes that party specified communication has been switched to broadcast communication because the signal level of the notification channel CS becomes low before data is transmitted from the camera microcomputer 205.

<Broadcast Communication Processing>

Figure 7A:
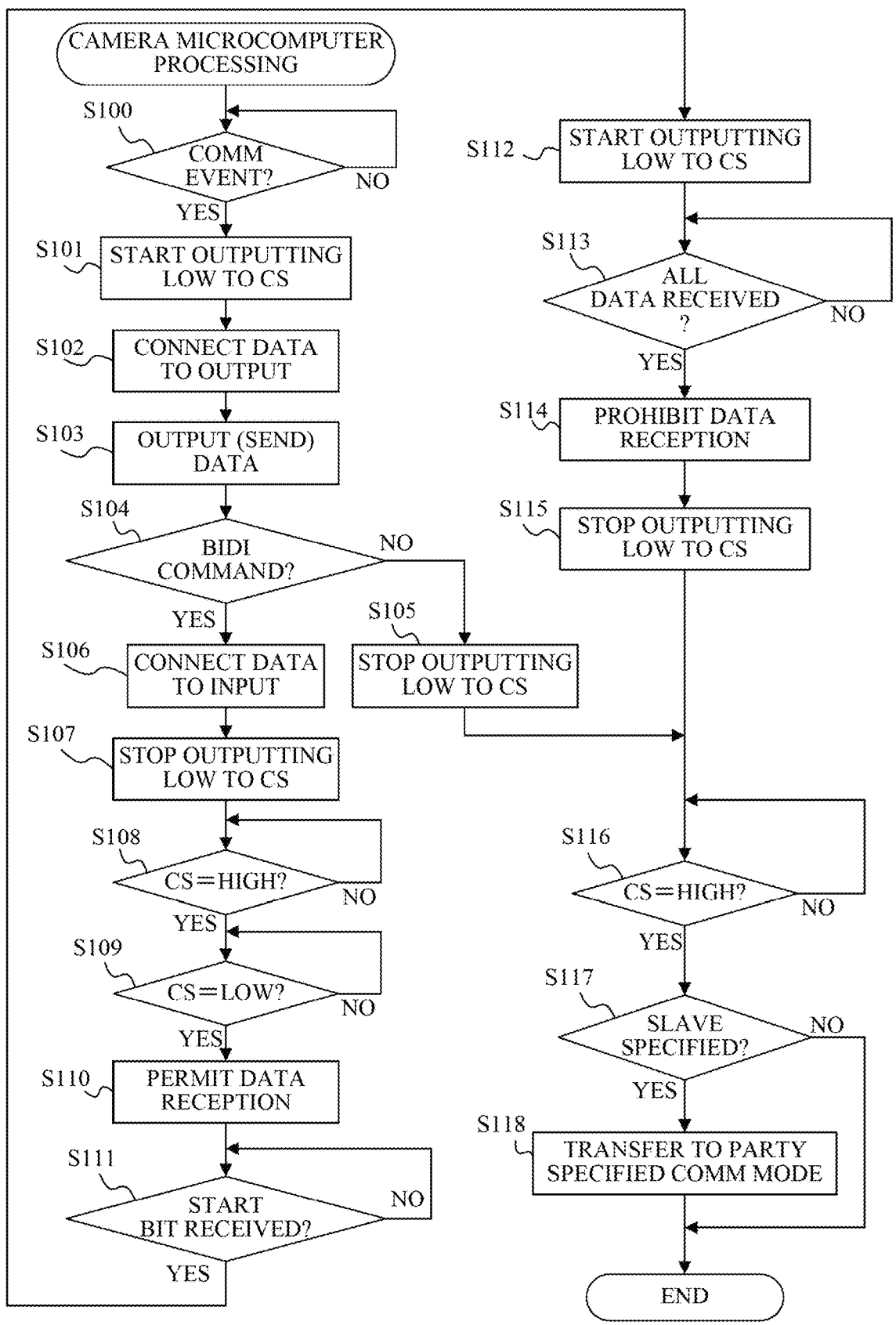
FIGS. 7A and 7B are flowcharts illustrating broadcast communication processing according to the first embodiment.
Figure 7B:
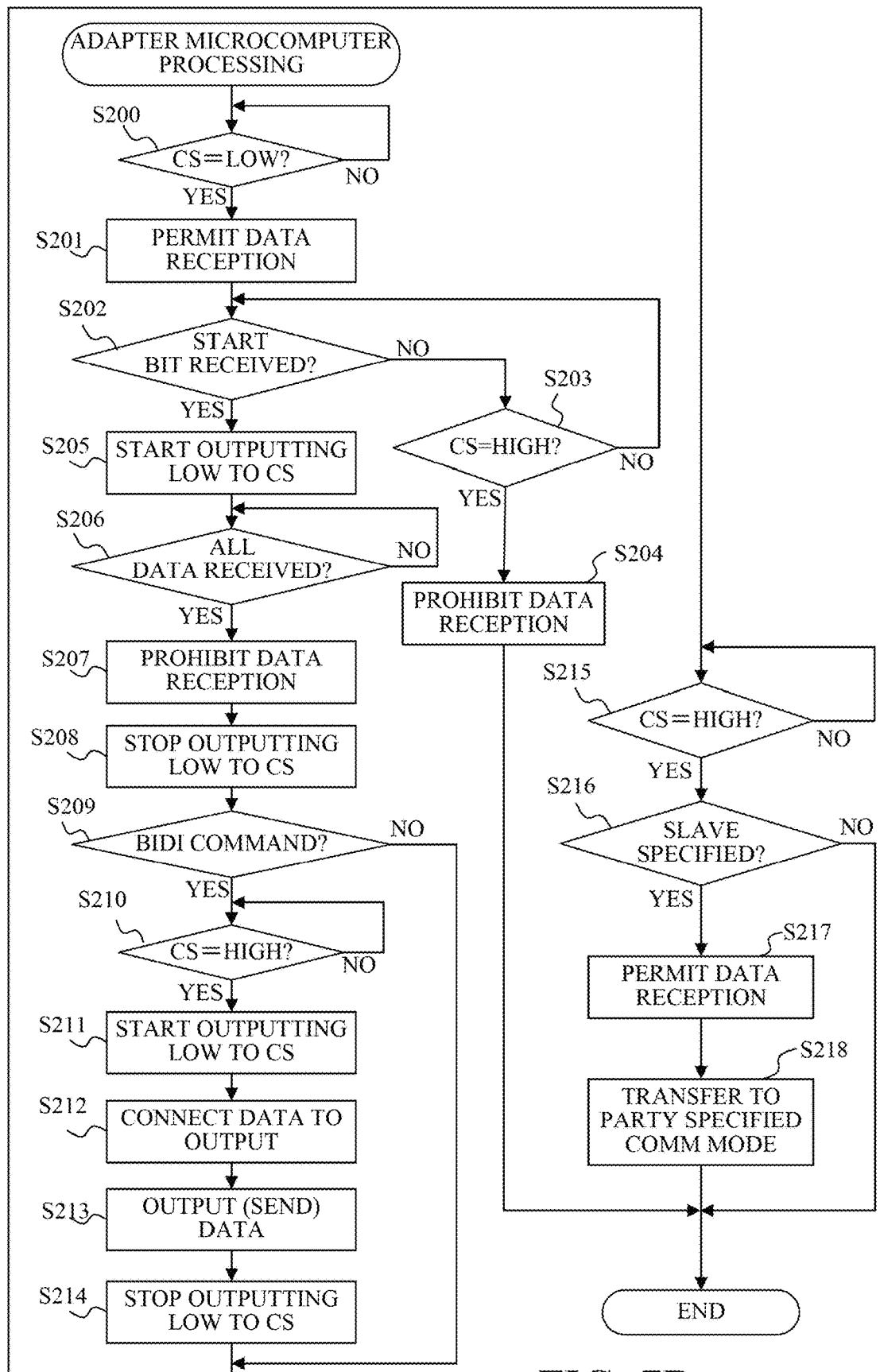

Flowcharts of FIGS. 7A and 7B illustrate broadcast communication processing executed by the camera microcomputer 205 as a communication master and the adapter microcomputer 302 as a communication slave. The camera microcomputer 205 and the adapter microcomputer 302 perform the processing illustrated in the flowcharts of FIGS. 7A and 7B according to computer programs. In FIGS. 7A and 7B and the flowcharts of other figures to be described below, "S" stands for the step. The broadcast communication processing executed by the lens microcomputer 111 is basically the same as the broadcast communication processing executed by the adapter microcomputer 302, and thus a description thereof is omitted.

The camera microcomputer 205 determines whether an event to start broadcast communication has occurred in S100. The flow proceeds to S101 in a case where the event to start broadcast communication has occurred, and repeats the determination of S100 in a case where no event has occurred.

In S101, the camera microcomputer 205 outputs Low to the notification channel CS to set a signal level of the notification channel CS to a low level, and notifies the lens microcomputer 111 and the adapter microcomputer 302 of the start of broadcast communication.

Next, in S102, the camera microcomputer 205 operates the input/output switch 2082 to connect the data communication channel DATA to the data output unit of the camera microcomputer 205. data transmission is started in S103.

Next, in S104, the camera microcomputer 205 determines whether or not the data transmitted in S103 includes a transmission request command (bidirectional command (BIDI command). The transmission request command is a command that requests the communication slave that has received data transmitted from the camera microcomputer 205 as the communication master to transmit data to the camera microcomputer 205.

In a case where the data transmitted from the camera microcomputer 205 in S103 does not include the transmission request command, the flow proceeds to S105, and the camera microcomputer 205 stops outputting Low to the notification channel CS after data transmission from the camera microcomputer 205 is completed. Then, the flow proceeds to S116.

In a case where the data transmitted from the camera microcomputer 205 in S103 includes the transmission request command, the flow proceeds to S106. In S106, after data transmission from the camera microcomputer 205 is completed, the data communication channel DATA is connected to the data input unit of the camera microcomputer 205, and the flow proceeds to S107. In S107, the camera microcomputer 205 stops outputting Low to the notification channel CS and outputs High.

Next, in S108, the camera microcomputer 205 determines whether the signal level of the notification channel CS has become high. This determination continues until the signal level of the notification channel CS becomes high. In a case where the signal level of the notification channel CS is high, it indicates that the camera system is ready for communication. In a case where the signal level of the notification channel CS becomes high, the camera microcomputer 205 determines in S109 whether the signal level of the notification channel CS has become low. This determination continues until the signal level of the notification channel CS becomes low.

Communication from the adapter microcomputer 302 as the communication slave to the camera microcomputer 205 is started in a case where the signal level of the notification channel CS becomes low. The camera microcomputer 205 that has determined that the signal level of the notification channel CS has become low permits data reception in the data communication channel DATA in S110.

Next, in S111, the camera microcomputer 205 determines whether or not a start bit included in the data transmitted from the adapter microcomputer 302 has been received. This determination continues until the start bit is received.

In a case where the start bit is received, the flow proceeds to S112 to output Low to the notification channel CS, and the camera microcomputer 205 determines in S113 whether or not a stop bit has been received, that is, whether or not all data transmitted from the adapter microcomputer 302 has been received. This determination continues until the stop bit is received. Upon receiving the stop bit, the camera microcomputer 205 prohibits the reception of data in the data communication channel DATA in S114, analyzes the received data, and executes internal processing corresponding to the received data. Thereafter, in S115, the camera microcomputer 205 stops outputting Low to the notification channel CS and outputs High.

Next, in S116, the camera microcomputer 205 determines whether the signal level of the notification channel CS has become high. This determination continues until the signal level of the notification channel CS becomes high. In a case where the signal level of the notification channel CS becomes high, the camera microcomputer 205 determines in S117 whether or not the data transmitted in S103 was communication party specified data. In a case where the data is communication party specified data, the flow proceeds to S118 and the camera microcomputer 205 shifts to party specified communication. In a case where the data is not communication party specified data, the camera microcomputer 205 ends this flow.

On the other hand, in S200, the adapter microcomputer 302 determines whether the signal level of the notification channel CS has become low. This determination continues until the signal level of the notification channel CS becomes low. Data transmission from the camera microcomputer 205 as the communication master is started in a case where the signal level of the notification channel CS becomes low. Therefore, in S201, the adapter microcomputer 302 permits data reception via the data communication channel DATA.

Next, in S202, the adapter microcomputer 302 determines whether or not a start bit has been received. In a case where the start bit has not been received, the flow proceeds to S203 and the camera microcomputer 205 determines whether the signal level of the notification channel CS is high.

The reason why the adapter microcomputer 302 performs the processing of S203 and S204 is to handle a situation where party specified communication is performed between the camera microcomputer 205 and the lens microcomputer 111 and the adapter microcomputer 302 performs broadcast communication. In this situation, since the adapter microcomputer 302 does not receive data from the camera microcomputer 205, the adapter microcomputer 302 prohibits data reception via the data communication channel DATA in S204.

As explained using FIG. 5 in the section of <party specified communication>, the signal level of the notification channel CS changes between High and Low even in party specified communication. The signal level of the notification channel CS is normally high, and is set to a low level in notifying a communication standby request or notifying the start of communication in broadcast communication. In party specified communication, it is set to a low level in notifying a communication standby request.

The adapter microcomputer 302 does not receive a start bit from the camera microcomputer 205 in S202 in the following situations. The first situation is that data transmission has not been started after the camera microcomputer 205 has set the signal level of the notification channel CS to a low level. The second situation is that the camera microcomputer 205 and the lens microcomputer 111 are performing party specified communication, and the adapter microcomputer 302 is not involved in the party specified communication.

In the first situation, the signal level of the notification channel CS does not become high, so the flow returns from S203 to S202 and the adapter microcomputer 302 repeats the determinations of S202 and S203 until data transmission from the camera microcomputer 205 starts. In the second situation, either the camera microcomputer 205 or the lens microcomputer 111 does not notify the communication standby request and the signal level of the notification channel CS is high. In this situation, the flow basically proceeds from S203 to S204 and the adapter microcomputer 302 prohibits data reception via the data communication channel DATA. In the party specified communication, in a case where a communication standby request has been notified, the flow returns from S203 to S202 and the adapter microcomputer 302 makes the determination of S203 again. Although the determination of S203 may be performed multiple times, in a case where the communication standby request is canceled and the signal level of the notification channel CS becomes high, the flow proceeds from S203 to S204.

By adding the processing of S203 and S204 as described above, the camera system can use both broadcast communication and party specified communication. In this embodiment, while party specified communication is performed between the camera microcomputer 205 and the lens microcomputer 111, the adapter microcomputer 302 can be set to a standby state so as to handle broadcast communication.

Upon receiving a start bit in S202, the adapter microcomputer 302 starts analyzing the received data and internal processing corresponding to the received data, and outputs Low to the notification channel CS. Thereby, a communication standby request is notified to each component in the camera system.

Next, in S206, the adapter microcomputer 302 determines whether or not a stop bit has been received. This determination continues until the stop bit is received. Upon receiving the stop bit, the adapter microcomputer 302 prohibits data reception in the data communication channel DATA in S207, and continues analysis of the received data and internal processing corresponding to the received data. In a case where the internal processing of the data is completed and the next data communication can be executed, the adapter microcomputer 302 stops outputting Low to the notification channel CS and outputs High in S208.

Next, in S209, the adapter microcomputer 302 determines whether the data received from the camera microcomputer 205 includes a transmission request command. In a case where the transmission request command is included, the flow proceeds to S210 and the adapter microcomputer 302 determines whether or not the signal level of the notification channel CS has become high. This determination continues until the signal level of the notification channel CS becomes high. A high signal level of the notification channel CS means that the camera system is ready for communication. In a case where the data received from the camera microcomputer 205 does not include a transmission request command, the flow proceeds to S215, which will be described below.

In a case where it is determined in S210 that the signal level of the notification channel CS is high, the adapter microcomputer 302 proceeds to S211. In S211, the adapter microcomputer 302 notifies the camera microcomputer 205 and the lens microcomputer 111 of the start of broadcast communication by outputting Low to the notification channel CS to set the signal level of the notification channel CS to a low level.

Next, in S212, the adapter microcomputer 302 connects the data communication channel DATA to the data output unit of the adapter microcomputer 302 by operating the input/output switch 3032. Then, in S213, data transmission is started.

In a case where the data transmission is completed, the adapter microcomputer 302 stops outputting Low to the notification channel CS and outputs High in S214. Next, in S215, the adapter microcomputer 302 determines whether or not the signal level of the notification channel CS has become high. This determination continues until the signal level of the notification channel CS becomes high.

In a case where the signal level of the notification channel CS becomes high, the flow proceeds to S216. In S216, the adapter microcomputer 302 determines whether the data received from the camera microcomputer 205 is communication party specified data and whether the adapter microcomputer 302 itself has been selected as the communication party of the camera microcomputer 205 in party designated communication. In a case where the adapter microcomputer 302 is selected as the communication party of the camera microcomputer 205, the flow proceeds to S217 and the adapter microcomputer 302 permits data reception in the data communication channel DATA. Next, in S218, the broadcast communication is shifted to party specified communication.

In a case where the data received from the camera microcomputer 205 is not communication party specified data, or in a case where the adapter microcomputer 302 is not selected as the communication party in party specified communication, the adapter microcomputer 302 ends this flow without transferring to party specified communication.

<Party Specified Communication Processing>

Figure 8A:
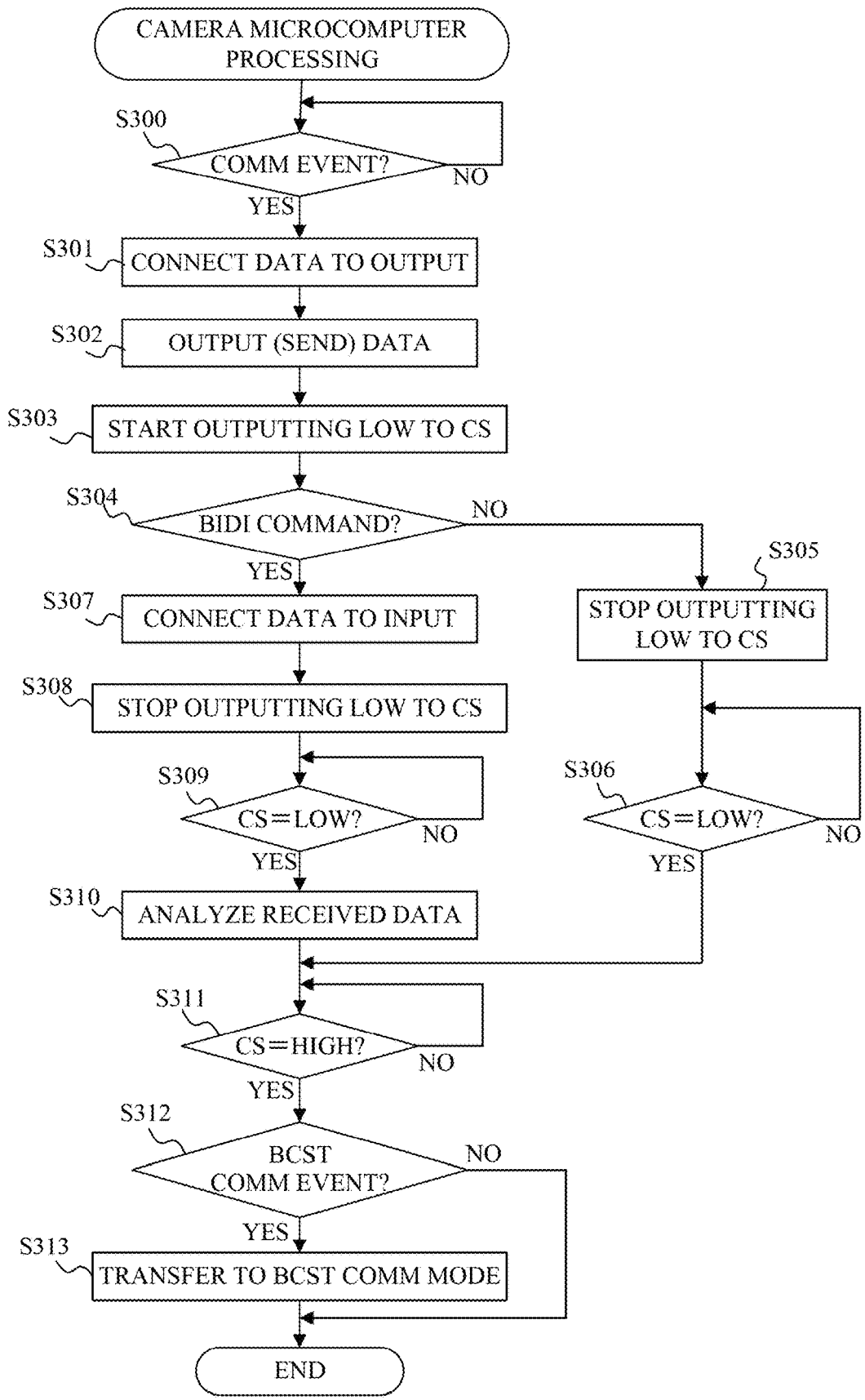
FIGS. 8A and 8B are flowcharts illustrating party specified communication processing according to the first embodiment.
Figure 8B:
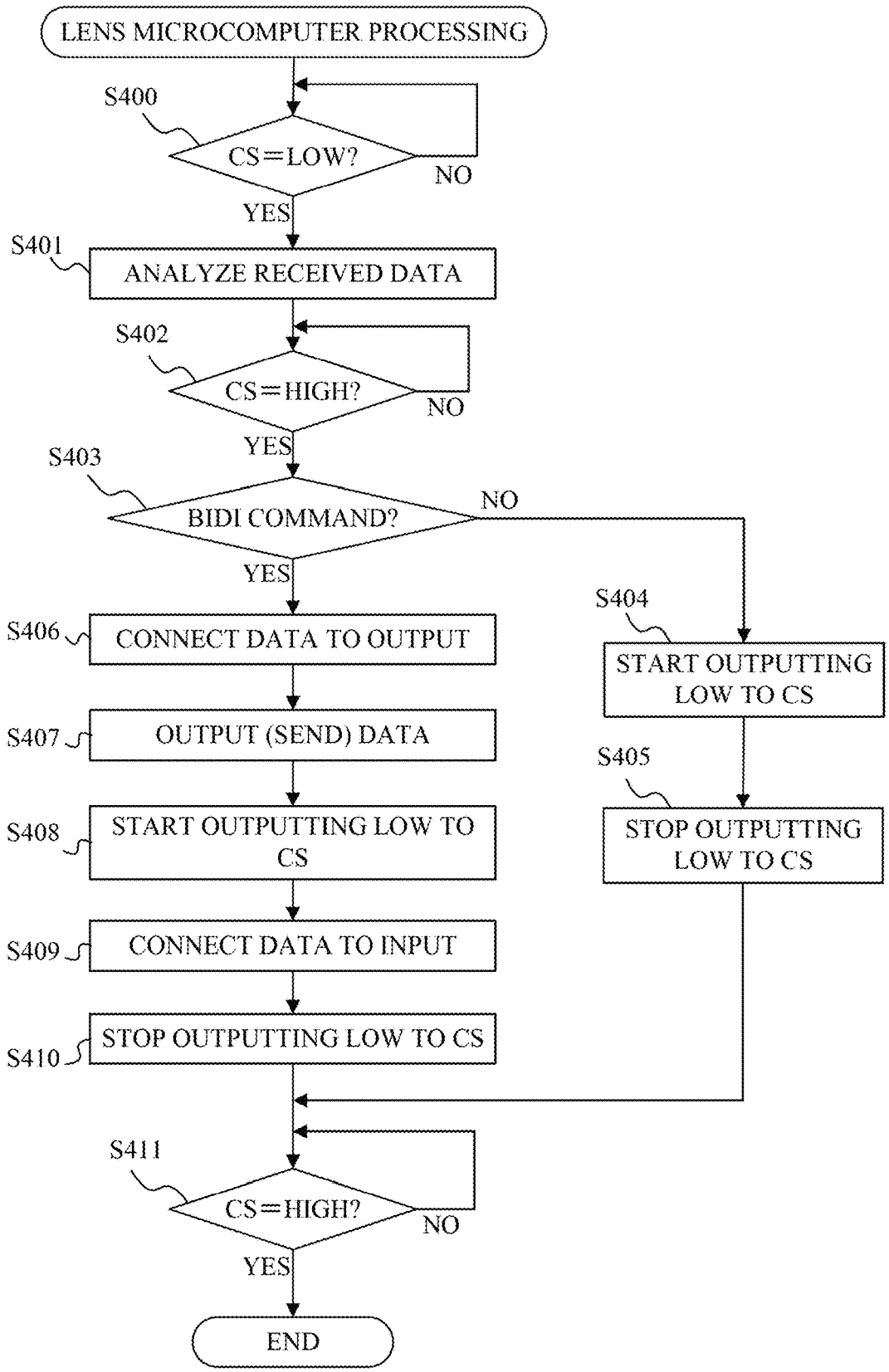

Flowcharts of FIGS. 8A and 8B illustrate party specified communication processing executed by the camera microcomputer 205 as a communication master and the lens microcomputer 111 as a communication slave. The camera microcomputer 205 and the lens microcomputer 111 perform the processing illustrated in the flowcharts of FIGS. 8A and 8B according to computer programs. The party specified communication processing executed by the adapter microcomputer 302 is basically the same as the party specified communication processing executed by the lens microcomputer 111, and a description thereof will be omitted.

The camera microcomputer 205 determines whether an event to start party specified communication has occurred in S300. The flow proceeds to S301 in a case where an event to start party specified communication has occurred, and the camera microcomputer 205 repeats the determination of S300 in a case where no event has occurred.

In S301, the camera microcomputer 205 connects the data communication channel DATA to the data output unit of the camera microcomputer 205 by operating the input/output switch 2082. Next, the camera microcomputer 205 starts data transmission in S302.

In S303, the camera microcomputer 205 outputs Low to the notification channel CS to set the signal level of the notification channel CS to a low level. Thereby, the camera microcomputer 205 issues a communication standby request to the lens microcomputer 111, which is a communication slave. The lens microcomputer 111 does not transmit data to the camera microcomputer 205 while the signal level of the notification channel CS is low.

In S304, the camera microcomputer 205 determines whether the data transmitted in S302 includes a transmission request command (bidirectional (BIDI) command). The transmission request command is a command that requests the communication slave to transmit data to the camera microcomputer 205. In a case where the transmission data does not include the transmission request command, the lens microcomputer 111 does not transmit the data. In this case, the flow proceeds from S304 to S305 and the camera microcomputer 205 confirms whether or not the lens microcomputer 111 has notified a communication standby request.

More specifically, the camera microcomputer 205 stops outputting Low to the notification channel CS in S305, and then determines in S306 whether the signal level of the notification channel CS is low. Thereby, it is determined whether or not the lens microcomputer 111 has set the signal level of the notification channel CS to a low level, that is, whether or not the lens microcomputer 111 has notified the communication standby request.

Upon receiving data from the camera microcomputer 205, the lens microcomputer 111 notifies a communication standby request by outputting Low to the notification channel CS for a certain period in order to analyze the data and perform internal processing. S306 is performed for recognizing the notification standby request of the lens microcomputer 111. After S305, the signal level of the notification channel CS may temporarily become high. In this case, the camera microcomputer 205 waits until the signal level of the notification channel CS becomes low by making the determination of S306. After confirming that the signal level of the notification channel CS has become low in S306, the flow proceeds to S311.

In S304, in a case where the data transmitted in S302 includes a transmission request command, the flow proceeds to S307.

In S307, the camera microcomputer 205 connects the data communication channel DATA to the data input unit of the camera microcomputer 205 by operating the input/output switch 2082. In S308, the camera microcomputer 205 stops outputting Low to the notification channel CS and outputs High.

The camera microcomputer 205 receives data from the lens microcomputer 111 while the signal level of the notification channel CS is high, and determines in S309 whether the signal level of the notification channel CS has become low. The camera microcomputer 205 determines that the data transmission of the lens microcomputer 111 is completed because the signal level of the notification channel CS becomes low, and analyzes the data in S310.

Next, in S311, the camera microcomputer 205 determines whether the signal level of the notification channel CS has become high. This determination continues until the signal level of the notification channel CS becomes high. The high signal level of the notification channel CS means that the lens microcomputer 111 as a communication slave is ready for data communication.

In a case where the signal level of the notification channel CS becomes high, the flow proceeds to S312 and the camera microcomputer 205 determines whether an event to transfer to broadcast communication (BCST COMM event) has occurred. In a case where the event to transfer to broadcast communication occurs, the flow proceeds to S313 and the camera microcomputer 205 transfers to broadcast communication (BCST COMM mode). In a case where no transfer event to broadcast communication has occurred, the camera microcomputer 205 continues the party specified communication.

On the other hand, in a case where switching from broadcast communication to party specified communication is executed, the lens microcomputer 111 first receives data transmitted from the camera microcomputer 205. While the data transmitted from the camera microcomputer 205 is being received, the signal level of the notification channel CS is kept high.

In S400, the lens microcomputer 111 determines whether the signal level of the notification channel CS has become low. The lens microcomputer 111 determines that the data transmission of the camera microcomputer 205 is completed in a case where the signal level of the notification channel CS becomes low, and analyzes the data in S401.

Next, in S402, the lens microcomputer 111 determines whether the signal level of the notification channel CS has become high. This determination continues until the signal level of the notification channel CS becomes high. The low signal level of the notification channel CS corresponds to a state in which the camera microcomputer 205 notifies a communication standby request.

In a case where the signal level of the notification channel CS becomes high, the lens microcomputer 111 determines in S403 whether or not the data received from the camera microcomputer 205 includes a transmission request command (bidirectional (BIDI) command). In a case where the received data does not include a transmission request command, the flow proceeds to S404.

In S404, the lens microcomputer 111 sets the signal level of the notification channel CS to a low level and notifies the camera microcomputer 205 of the communication standby request in order to perform internal processing and the like for the data received from the camera microcomputer 205. In a case where the lens microcomputer 111 becomes ready for communication, the lens microcomputer 111 sets the signal level of the notification channel CS to a high level in S405 to cancel the communication standby request, and the flow proceeds to S411.

In a case where the data received from the camera microcomputer 205 includes a transmission request command in S403, the flow proceeds to S406. In S406, the lens microcomputer 111 connects the data communication channel DATA to the data output unit of the lens microcomputer 111 by operating the input/output switch 1122. Next, in S407, data transmission to the camera microcomputer 205 is started.

In S408 after the data transmission to the camera microcomputer 205 is completed, the lens microcomputer 111 outputs Low to the notification channel CS to set the signal level of the notification channel CS to a low level. Thereby, the lens microcomputer 111 issues a communication standby request to the camera microcomputer 205 as the communication master. The camera microcomputer 205 does not transmit data to the lens microcomputer 111 while the signal level of the notification channel CS is low.

In S409, the lens microcomputer 111 connects the data communication channel DATA to the data input unit of the lens microcomputer 111 by operating the input/output switch 1122. Next, in S410, the lens microcomputer 111 stops outputting Low to the notification channel CS and outputs High.

In S411, the lens microcomputer 111 determines whether the signal level of the notification channel CS has become high. This determination continues until the signal level of the notification channel CS becomes high. The high signal level of the notification channel CS corresponds to a state in which the camera microcomputer 205 and the lens microcomputer 111 are communicable.

As described above, a voltage level of the notification channel CS during data transmission from the camera 200 to the interchangeable lens 100 and the adapter 300 is made different between broadcast communication and party specified communication. Due to this communication system, the camera 200 can select an arbitrary communication party according to the situation at that time, and communicate with the freely specified communication party until the communication party is to be changed.

<Time-Division Communication>

Figure 9:
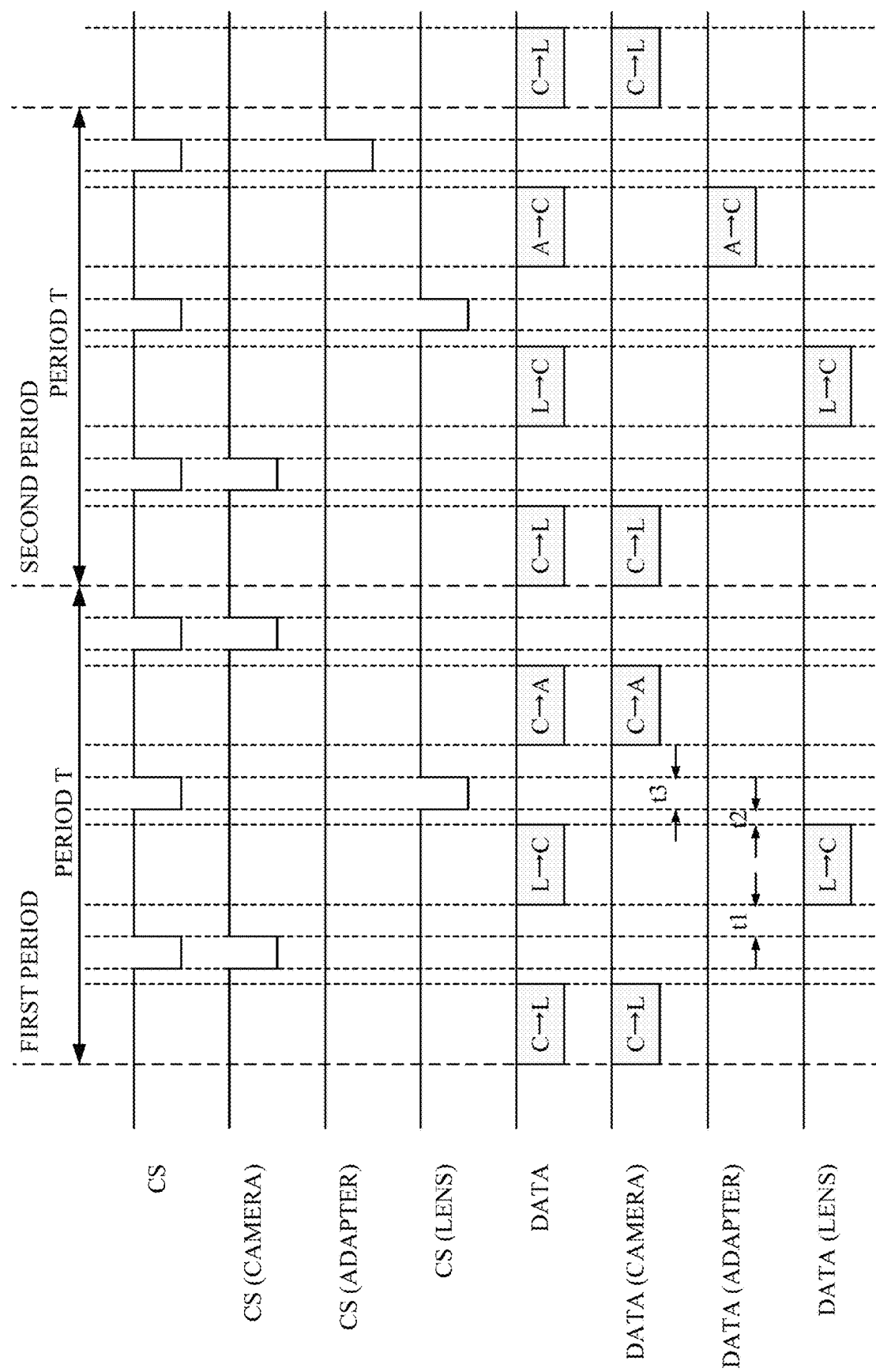
FIG. 9 illustrates signal waveforms in time-division communication according to the first embodiment.

FIG. 9 illustrates waveforms of signals transmitted and received in time-division communication of P2P communications. In time-division communication, similarly to party specified communication, the camera 200 serves as a communication master, and performs one-to-one communication a single component selected as a communication slave among components in the camera system. In party specified communication, a communication party is specified by broadcast communication, and one-to-one communication can be performed with the same communication party without respecifying the communication party until it becomes necessary to switch the communication party. In a case where a plurality of accessory apparatuses are connected to the camera 200, the next communication party can be freely selected. However, in switching a communication party, party specified communication is to terminate the communication of the current communication party once, to specify the next communication party in broadcast communication, and then to start communication with that communication party. Therefore, it takes time to switch the communication party.

On the other hand, in time-division communication, the timing of switching a communication party and a communication direction is predetermined. Therefore, although the communication party cannot be selected at an arbitrary timing, time-division communication can reduce the time required to switch the communication party.

In FIG. 9, the communication master is the camera 200, and the communication slaves are the interchangeable lens 100 and the intermediate adapter 300. In time-division communication, a basic communication period is determined, which is indicated by period T in FIG. 9. For data transmitted and received through the data communication channel DATA, a transmitter, a receiver, the maximum number of data, the order, etc. are specifically determined in each communication period. Referring now to FIGS. 12 and 13, a description will be given of determining the communication period, transmitter, receiver, maximum number of data, order, etc. . . .

In FIG. 9, one or more data blocks transmitted by the camera 200 and received by the interchangeable lens 100 will be represented by "C→L." An arrow "→" indicates a communication direction, and "C→L" and "L→C" indicate communication in one direction (from the camera 200 to the interchangeable lens 100) and in the opposite direction (from the interchangeable lens 100 to the camera 200) between camera 200 and interchangeable lens 100, respectively.

A data block in which such a transmitter, such as the camera 200, and receiver, such as the interchangeable lens 100, are fixed will be called a data packet hereinafter. A data packet transmitted by the interchangeable lens 100 and received by the camera 200 will be represented by "L→C," and a data packet transmitted by the camera 200 and received by the intermediate adapter 300 will be represented by "C→A." A data packet transmitted by the intermediate adapter 300 and received by the camera 200 will be represented by "A→C." In this embodiment, "C→L" and "L→C" appear every period, but "C→A" and "A→C" appear once every two periods. Time-division communication can freely determine how many types of data packets appear in each period and in what periodical frequency they appear.

The camera 200 is always either a transmitter or a receiver in each data packet of time-division communication, and thus FIG. 9 omits neither.

Similarly to party specified communication, a data transmission side does not output Low to the notification channel CS and transmits data to a data reception side while maintaining the notification channel CS high. Using "C→L" and "L→C" as an example, the camera microcomputer 205 transmits data to the lens microcomputer 111 via the data communication channel DATA while keeping the notification channel CS high. In a case where the data packet transmission is completed, the camera microcomputer 205 sets the signal level of the notification channel CS to a low level and notifies the communication standby request. Next, the camera microcomputer 205 returns the signal level of the notification channel CS to a high level after completing the preparation for receiving data as the data receiving side.

On the other hand, the lens microcomputer 111 recognizes that the data transmission from the camera microcomputer 205 is completed by the fact that the signal level of the notification channel CS becomes low, and analyzes the received data and performs internal processing corresponding to the received data. The lens microcomputer 111 generates data to be transmitted to the camera microcomputer 205 in the data packet "L→C." Next, the lens microcomputer 111 recognizes that the communication standby request has been canceled in a case where the signal level of the notification channel CS returns to a high level, and transmits the data packet "L→C" to the camera microcomputer 205. In a case where this transmission is completed, the lens microcomputer 111 sets the signal level of the notification channel CS to a low level and notifies the communication standby request. Next, the lens microcomputer 111 returns the signal level of the notification channel CS to a high level after completing preparations for receiving data as the data receiving side. During this period, the adapter microcomputer 302, which is not involved in the one-to-one communication, does not affect the notification channel CS or the data communication channel DATA as the data receiving side. Even in a case where the transmitter and receiver are different, the transmission and reception operations are similarly performed as described above.

The period T is controlled by the camera microcomputer 205. In a case where the sum of the communication time of each data packet in one period, the communication waiting request time, and the waiting time that does not belong to any of them is less than the period T, the camera microcomputer 205 waits for communication until the next period starts.

<Time-Division Communication Processing>

Figure 10A:
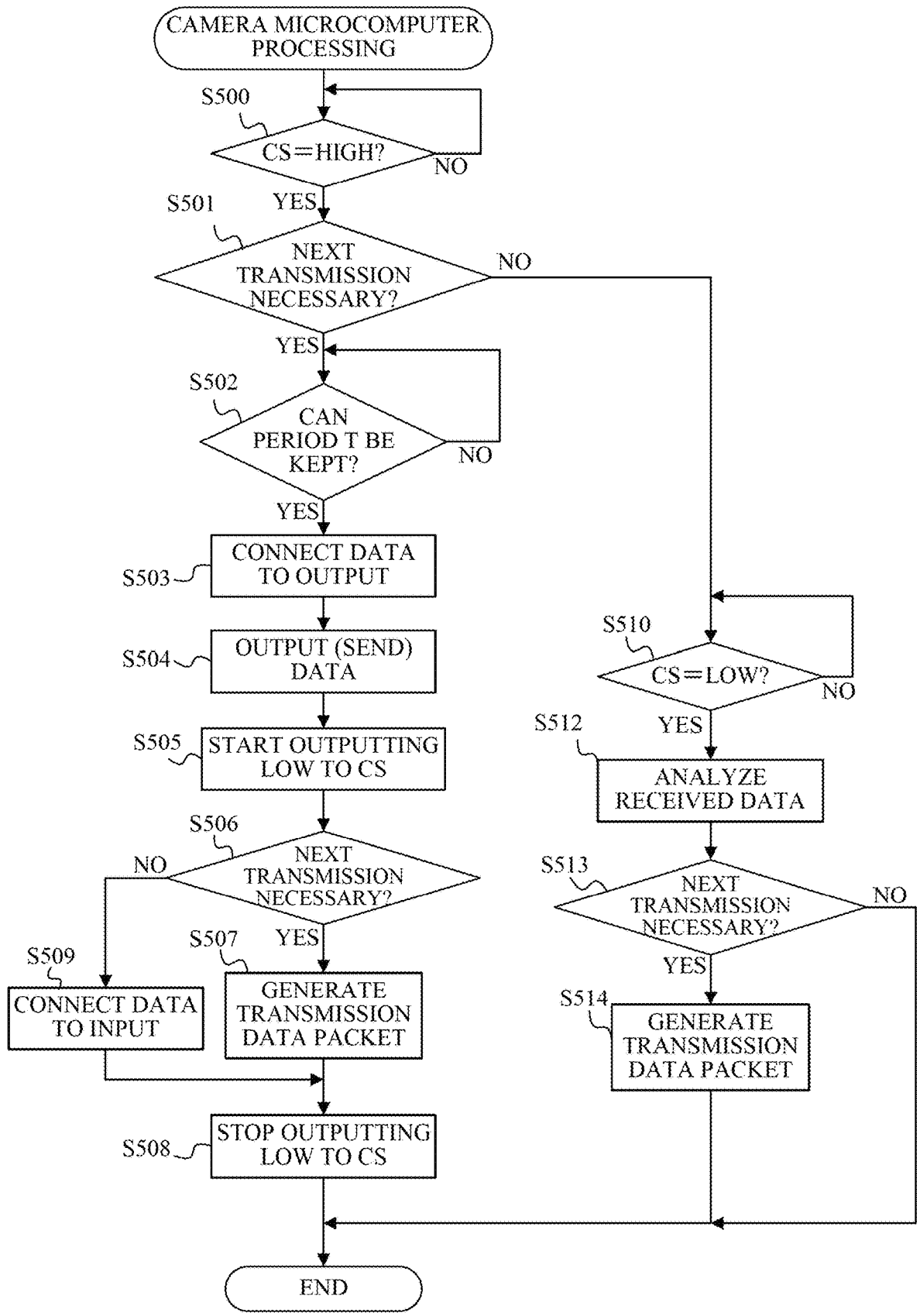
FIGS. 10A and 10B are flowcharts illustrating time-division communication processing according to the first embodiment.
Figure 10B:
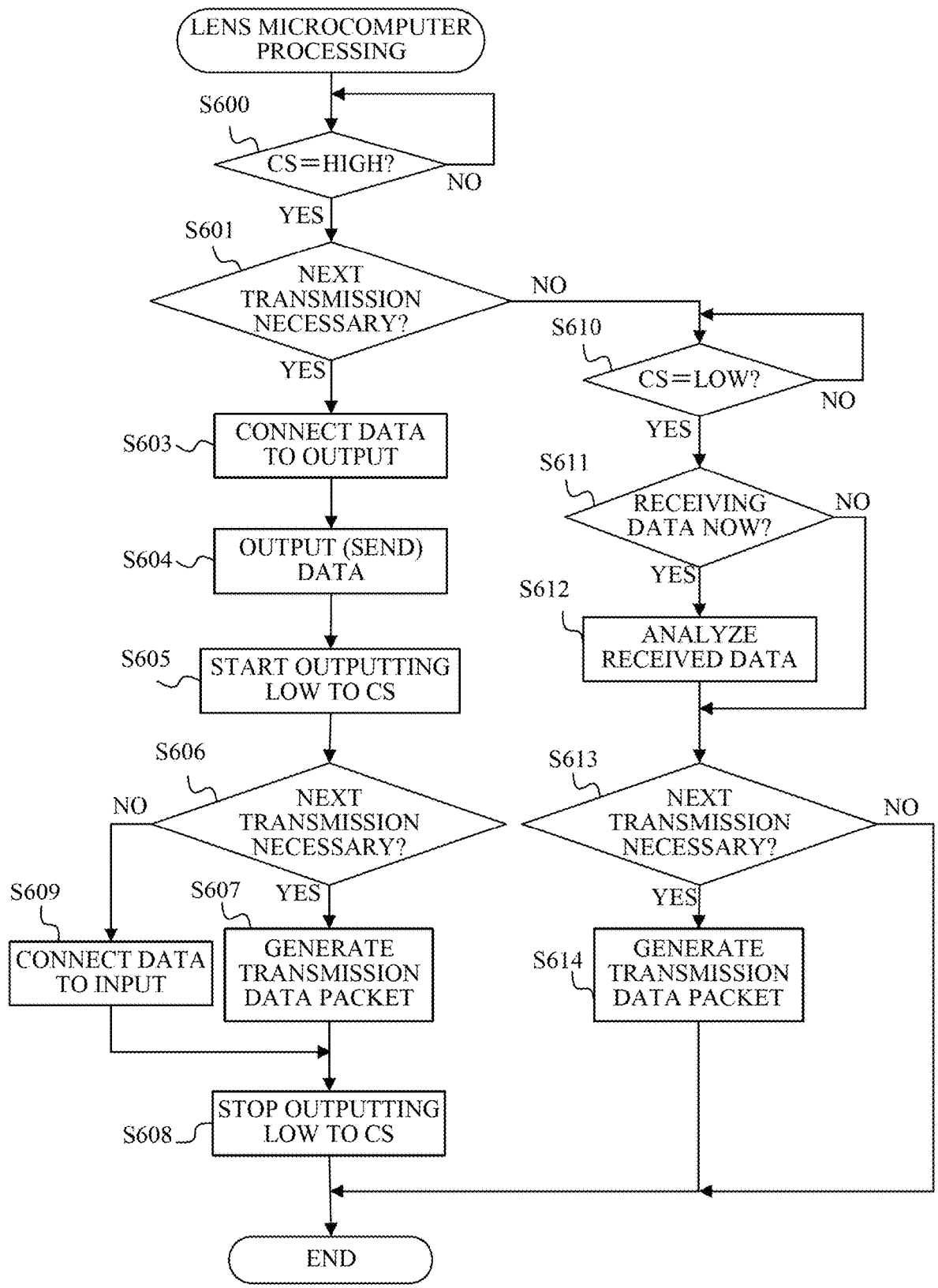

Flowcharts of FIGS. 10A and 10B illustrate time-division communication processing (communication control methods) executed by the camera microcomputer 205 as a communication master and the lens microcomputer 111 as a communication slave. The camera microcomputer 205 and the lens microcomputer 111 perform the processing illustrated in the flowcharts of FIGS. 10A and 10B according to computer programs. The party specified communication processing executed by the adapter microcomputer 302 is basically the same as the party specified communication processing executed by the lens microcomputer 111, and a description thereof will be omitted. FIGS. 10A and 10B also omit a case where the camera 200 is neither a transmitter nor a receiver of time-division communication, as in FIG. 9.

In S500, the camera microcomputer 205 confirms whether the signal level of the notification channel CS is high, and the flow proceeds to S501 in a case where it is high, and waits for it to become high in a case where it is low.

In S501, the camera microcomputer 205 determines whether or not the camera microcomputer 205 is to transmit the next data packet, and if so, the flow proceeds to S502; otherwise, the flow proceeds to S510.

In S502, the camera microcomputer 205 determines whether or not the period T as the communication period can be kept if the processing is continued as it is, and repeats the determination of S502 to waits for processing in a case where the period T cannot be kept (or the processing is too fast). In a case where a predetermined time has passed, the flow proceeds to S503. The camera microcomputer 205 waits in S502 only in transmitting the first data packet of each period T in FIG. 9. In other cases, the camera microcomputer 205 determines that the period T can be kept and the flow proceeds to S503.

In S503, the camera microcomputer 205 connects the data communication channel DATA to the data output unit of the camera microcomputer 205, and starts data transmission in S504.

In S505, the camera microcomputer 205 outputs Low to the notification channel CS to set the signal level of the notification channel CS to a low level. Thereby, the camera microcomputer 205 notifies the next data packet transmitter of the communication standby request.

Thereafter, in S506, the camera microcomputer 205 determines whether or not the camera microcomputer 205 is to transmit the next data packet, and if so, the flow proceeds to S507.

In S507, the camera microcomputer 205 generates a data packet for the next transmission. Next, in a case where the data packet to be transmitted is ready, the flow proceeds to S508 to stop outputting Low to the notification channel CS.

In a case where the camera microcomputer 205 determines in S506 that the camera microcomputer 205 is not to transmit the next data packet (that is, the camera microcomputer 205 is to receive the next data packet), the flow proceeds to S509.

In S509, the camera microcomputer 205 connects the data communication channel DATA to the data input unit of the camera microcomputer 205, and then in S508 stops outputting Low to the notification channel CS.

After proceeding from S501 to S510, the camera microcomputer 205 determines whether the signal level of the notification channel CS is low, repeats the determination in a case where the signal level is not low, and analyzes the received data in S512 if the signal level is low.

Next, in S513, the camera microcomputer 205 determines whether or not the camera microcomputer 205 is to transmit the next data packet, and if so, the flow proceeds to S514. If not (that is, the camera microcomputer 205 is to receive the next data packet), the flow proceeds to "END."

In S514, the camera microcomputer 205 generates a data packet for the next transmission. At this time, since it is not the camera microcomputer 205 that sets the signal level of the notification channel CS to a low level, the camera microcomputer 205 does not stop outputting Low to the notification channel CS. Then, the flow proceeds to "END."

"END" indicates the end of processing for a single data packet, and thereafter the camera microcomputer 205 returns to S500 again and starts processing the next data packet.

On the other hand, in S600, the lens microcomputer 111 confirms whether the signal level of the notification channel CS is high. In a case where it is high, the flow proceeds to S601, and in a case where it is low, the lens microcomputer 111 waits for it to become high.

In S601, the lens microcomputer 111 determines whether or not the lens microcomputer 111 is to transmit the next data packet, and if so, the flow proceeds to S603; otherwise, the flow proceeds to S610.

In S603, the lens microcomputer 111 connects the data communication channel DATA to the data output unit of the lens microcomputer 111, and starts data transmission in S604.

Next, in S605, the lens microcomputer 111 outputs Low to the notification channel CS to set the signal level of the notification channel CS to a low level. Thereby, the lens microcomputer 111 notifies the next data packet transmitter of a communication standby request.

Next, in S606, the lens microcomputer 111 determines whether or not the lens microcomputer 111 is to transmit the next data packet, and if so, the flow proceeds to S607.

In S607, the lens microcomputer 111 generates a data packet for the next transmission. In a case where the data packet to be transmitted is ready, the lens flow proceeds to S608 and stops outputting Low to the notification channel CS.

In a case where the lens microcomputer 111 has determined in S606 that the lens microcomputer 111 is not to transmit the next data packet, the flow proceeds to S609 and the lens microcomputer 111 connects the data communication channel DATA to the data input unit of the lens microcomputer 111. Next, the flow proceeds to S608 to stop outputting Low to the notification channel CS.

After proceeding from S601 to S610, the camera microcomputer 205 determines whether or not the signal level of the notification channel CS is low in S610, and repeats this determination in a case where it is not low. If it is low, the flow proceeds to S611.

In S611, the lens microcomputer 111 determines whether the lens microcomputer 111 is currently receiving a data packet (that is, whether the lens microcomputer 111 is a receiver). In a case where it is the receiver, the flow proceeds to S612 to analyze the received data, and then the flow proceeds to S613. In a case where it is not the receiver, the flow proceeds to S613 without analyzing the data.

In S613, the lens microcomputer 111 determines whether or not the lens microcomputer 111 is to transmit the next data packet, and if so, the flow proceeds to S614. Otherwise, the flow proceeds to "END".

In S614, the lens microcomputer 111 generates a data packet for the next transmission. At this time, since it is not the lens microcomputer 111 that sets the signal level of the notification channel CS to a low level, the lens microcomputer 111 does not stop outputting Low. Next, the flow proceeds to "END."

"END" indicates the end of processing for a single data packet, and thereafter the flow returns to S600 again to start processing the next data packet.

<Switching to Time-Division Communication>

Figure 11:
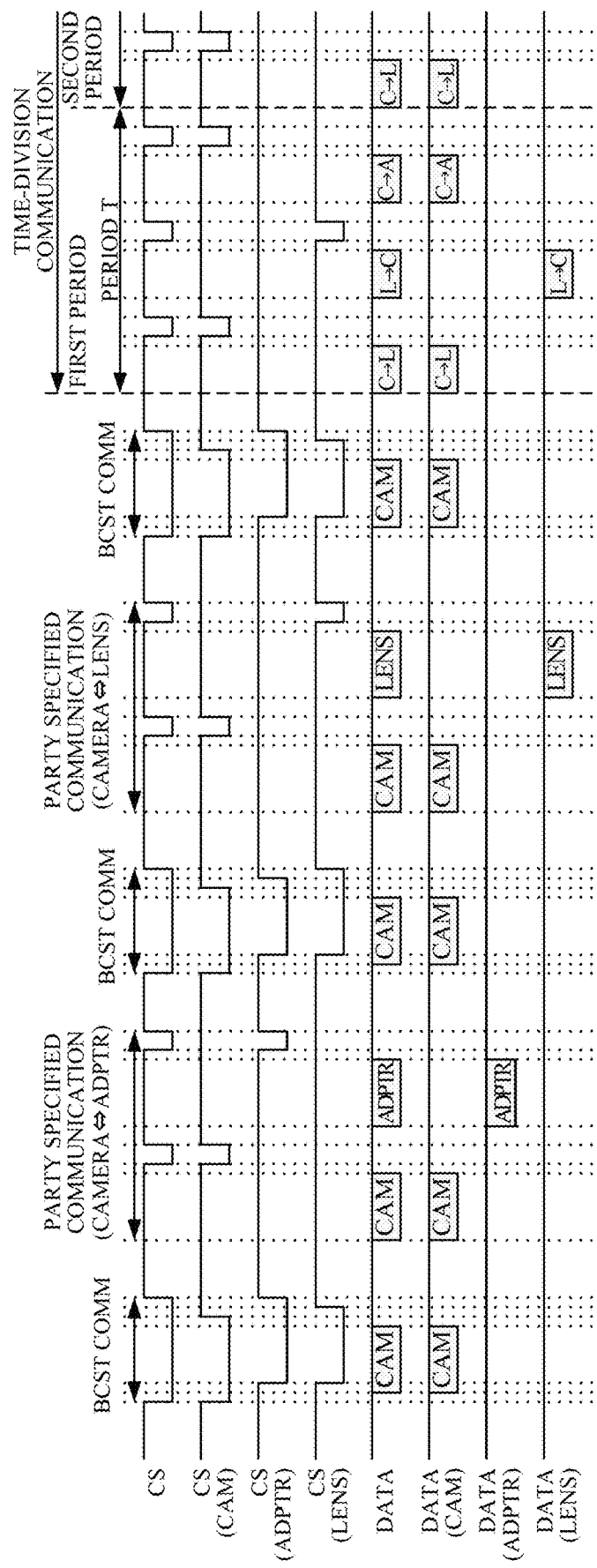
FIG. 11 illustrates signal waveforms in switching a communication method to the time-division communication according to the first embodiment.

FIG. 11 illustrates waveforms of signals in a case where broadcast communication (BCST COMM) and time-division communication are switched and executed. In FIG. 11, broadcast communication and party specified communication are performed until time-division communication is started, and switching between these communications is as described with reference to FIG. 6. The camera microcomputer 205 recognizes in advance the number of attached accessory apparatuses through unillustrated accessory authentication communication or detection of the voltage level of the mount contact before the communication in FIG. 11 is described.

In FIG. 11, the camera microcomputer 205 first specifies the adapter microcomputer 302 as a communication party in broadcast communication. Next, the camera microcomputer 205 requests the adapter microcomputer 302 to transmit information specific to the intermediate adapter 300 (accessory-specific information: referred to as adapter-specific information hereinafter). In accordance with this request, the adapter microcomputer 302 transmits adapter-specific information to the camera microcomputer 205 by party specified communication.

The accessory-specific information (adapter-specific information and lens-specific information described below) includes various information specific to the accessory apparatus, such as ID information, functions, and a communication speed of the accessory apparatus. In particular, four pieces of information (a1) to (a4) illustrated in FIG. 12 are important information for determining a period of time-division communication, a data packet structure, and the like. These pieces of information will be described below in detail.

In FIG. 11, data transmitted from the camera microcomputer 205 to the adapter microcomputer 302 is represented as a single data block, but this is not necessarily 1-byte data or data indicating a single type of information. Rather, the data may include a plurality of pieces of information necessary for requesting adapter-specific information. This is similarly applied to data transmitted from the adapter microcomputer 302 and data transmitted from the lens microcomputer 111, which will be described below.

After the camera microcomputer 205 has completed acquiring the adapter-specific information from the adapter microcomputer 302, the camera microcomputer 205 specifies the lens microcomputer 111 as a communication party through broadcast communication. Next, the camera microcomputer 205 requests the lens microcomputer 111 to transmit lens-specific information that is specific information of the interchangeable lens 100. In accordance with this request, the lens microcomputer 111 transmits the lens-specific information to the camera microcomputer 205 through party specified communication.

Through the above communication, the camera microcomputer 205 acquires all information necessary to start time-division communication. In the following description, a combination of important information for performing time-division communication illustrated in FIG. 12 among accessory-specific information acquired from each accessory, and information about the number of accessory apparatuses attached to the camera 200 will be referred to as accessory characteristic information (information about the accessory apparatus or accessory information).

The camera microcomputer 205 determines setting information for performing time-division communication based on the acquired accessory characteristic information and specific information of the camera 200 itself (information about the camera: referred to as camera-specific information hereinafter). The setting information for this time-division communication (referred to as time-division setting information hereinafter) includes a period T, a data packet structure within one period T, a baud rate (communication speed), a length of a data packet, the number of data packets, a type and order of the data packet, and the like. Details of the time-division setting information will be described below.

Thereafter, the camera microcomputer 205 transmits a time-division communication start command to all accessory apparatuses through broadcast communication. In this embodiment, the time-division setting information is included in the time-division communication start command, and each accessory apparatus prepares to start the time-division communication based on the information and transfers to the time-division communication. The time-division setting information may be transmitted to all accessory apparatuses at different timings as information different from the time-division communication start command. At this time, the time-division setting information may be transmitted to all accessory apparatuses by party specified communication. The details of the time-division communication are as described with reference to FIGS. 9, 10A, and 10B.

<Time-Division Setting Information>

FIG. 12 illustrates four pieces of information included in the accessory characteristic information among the lens-specific information and the adapter-specific information in this embodiment. In addition to these four pieces of information, information about the number of accessory apparatuses attached to the camera 200 is also included in the accessory characteristic information.

Function (a1) represents at least one of functions of each accessory apparatus that is affected by or affects time-division communication. The camera microcomputer 205 recognizes the minimum communication period to be realized for each accessory apparatus based on the information about this function.

Supported baud rate (a2) represents a baud rate that each accessory apparatus can support in time-division communication. The camera microcomputer 205 compares this corresponding baud rate information with a baud rate that the camera 200 can support, and selects the fastest baud rate supportable for all the accessory apparatus and the camera 200.

Communication-direction switching time (a3) represents the maximum time required for each accessory apparatus to prepare for the transmission or reception of a data packet. More specifically, t1 represents time required from when the notification channel CS becomes high to when data transmission is started via the data communication channel DATA. t2 represents time required from when data transmission is completed through the data communication channel DATA to when Low is outputted to the notification channel CS. t3 represents time required from when Low is outputted to the notification channel CS to when the direction of the data communication channel DATA is switched to input until outputting Low to the notification channel CS is stopped.

These times are generally different depending on the performance of the microcomputer (such as the lens microcomputer 111 and the adapter microcomputer 302) in each accessory apparatus, the clock frequency, the firmware structure, and the like. t1, t2 and t3 are also illustrated in FIG. 9.

Transmission/reception buffer size (a4) represents the maximum data amount (size) that each accessory apparatus can transmit or receive at one time. The data packet transmitted and received between each accessory apparatus and the camera 200 must fit within (is equal to or smaller than) this transmission/reception buffer size.

FIG. 13 illustrates time-division setting information according to this embodiment. Period (b1) represents a communication period (T) of time-division communication. As the period, a frequency necessary for each accessory apparatus and the camera 200 to realize their functions is selected based on the function (a1) of the accessory characteristic information illustrated in FIG. 12. In this embodiment, the interchangeable lens 100 has an image stabilization function, and the camera 200 has a function of controlling the image stabilization function of the interchangeable lens 100. The intermediate adapter 300 includes an operation member (control ring) that can operate various setting values (ISO speed, shutter speed, etc.) of the camera 200.

As illustrated in FIG. 12, a period required to control the image stabilizing function is 1 ms, and a period required to transmit an operation amount of the control ring is 16 ms. Therefore, 1 ms is selected as a period of time-division communication in accordance with the most frequent communication. Although this is a somewhat excessive frequency for the intermediate adapter 300, communication may be performed every 1 ms, or the frequency may be suppressed and communication may be performed once every 16 periods.

Baud rate (b2) represents a baud rate of time-division communication. The fastest baud rate that can be supported by all the accessory apparatus and the camera 200 is selected based on the supported baud rate (a2) in FIG. 12. In this embodiment, 2.5 Mbps is selected as illustrated in FIG. 12.

Data packet length (b3) represents a length (number of bytes) of each data packet. This is calculated from the time information (a2) to (a4) in FIG. 12 and the number of data required in one period to realize the function (a1). This embodiment transmits a large data amount from the camera microcomputer 205 to the lens microcomputer 111 in controlling the image stabilizing function, and thus sets 32 bytes to a data packet "C→L," and 20 bytes to other data packets.

(b4) to (b6) represent a data packet structure included within the period T defined in (b1). Maximum data packet number (b4) represents the maximum number of data packets that can exist within one period. This is determined by (a1), (b1), and the number of accessory apparatuses attached to the camera 200. In this embodiment, the period T is 1 ms, and the camera 200 is mounted with a single interchangeable lens 100 that needs communication every period and a single intermediate adapter 300 that does not need communication every period. That is, the data packets "C→L" and "L→C" may be transmitted and received every period, and the data packets "C→A" and "A→C" may be transmitted and received at necessary timings. Thus, the maximum number of data packets that can be included in one period is three.

(b5) represents the type of data packet and the number of data packets in one period. The type means what is determined by a combination of a transmitter (communication source) and a receiver (communication destination), such as "C→L." The number of data packets in one period means the number of data packets that exist in each period within a range that satisfies the maximum number of packets in (b4) described above. This is determined by (a1), (b1), and the number of accessory apparatuses attached to the camera 200. In this embodiment, the camera 200 is to communicate with the interchangeable lens 100 at a period of 1 ms and communicate with the intermediate adapter 300 at a period of 16 ms. Thus, the data packets "C→L" and "L→C" are arranged in the first to fourteenth periods, the data packets "C→A," "C→L," and "L→C" are arranged in the fifteenth period, and the data packets "C→L" and "L→C" are arranged in the sixteenth period.

(b6) represents the order (predetermined order) of data packets within one period, which is determined by (a1). The order is a parameter for handling various cases, such as a case where it is better to receive data earlier than to transmit data in the function (a1), or a case where it is better to receive data from the intermediate adapter 300 before the data is received from the interchangeable lens 100. In this embodiment, since an accurate period is required to control the image stabilizing function, the data packet "C→L" is always placed at the beginning of each period, and then the data packet "L→C" which is a reply from the interchangeable lens 100 is placed. Since the communication for detecting the operation of the control ring starts with the camera microcomputer 205 transmitting to the adapter microcomputer 302 at a predetermined timing, the data packet "C→A" has priority over "A→C."

The method of determining the time-division setting information described so far is merely illustrative, and other determination methods may be used. For example, the lowest baud rate at which the function can be implemented may be selected as a baud rate in order to avoid communication noise. The data packet length may be set to be the same for all data packets. The time-division setting information may be information directly indicating the period T, data packet structure, baud rate, data packet length, number, type, order, etc., or information that can be converted into each of them. In other words, information about the period T, data packet structure, baud rate, data packet length, number, type, order, and the like may be used.

<Processing for Switching to Time-Division Communication>

Figure 14A:
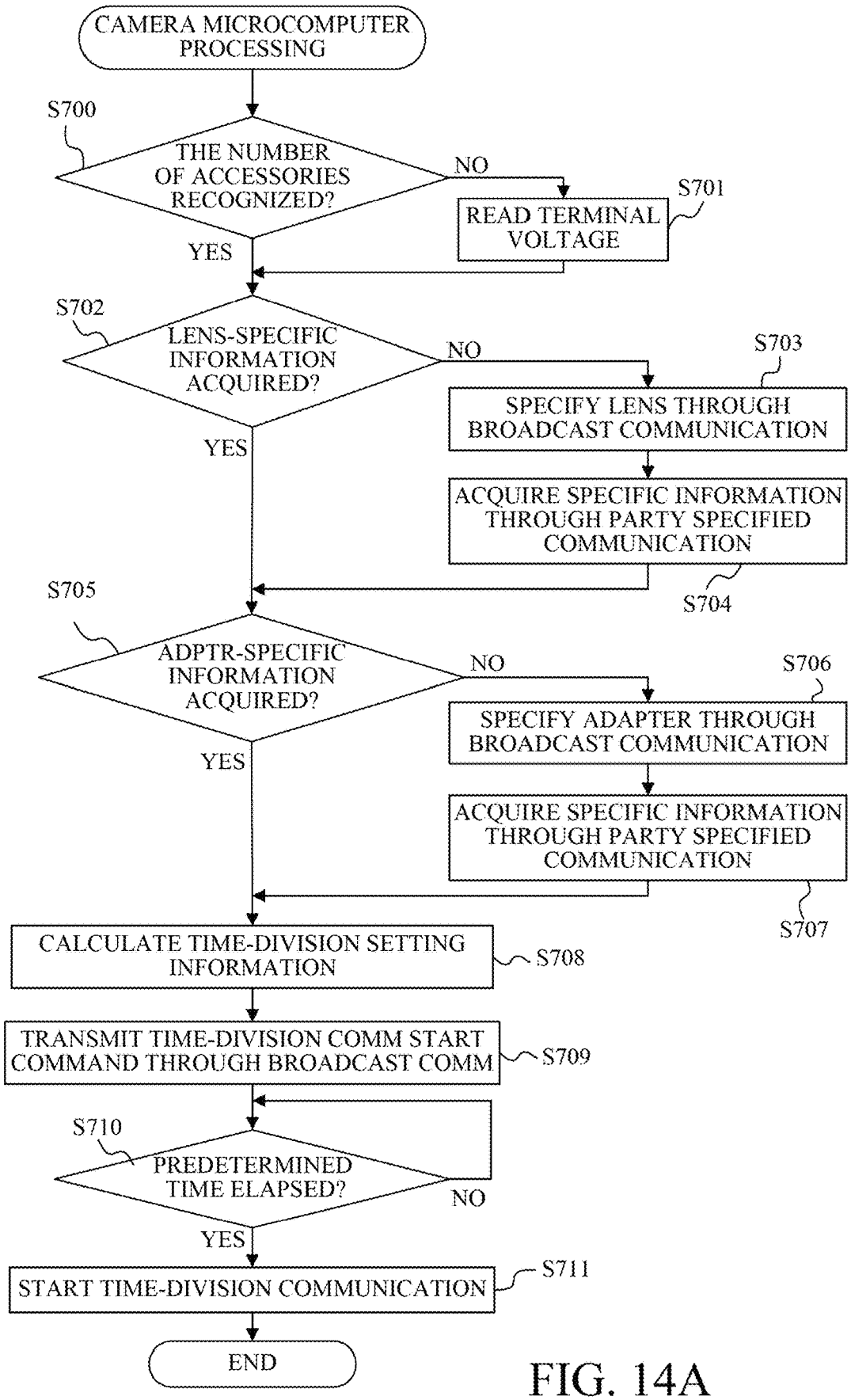
FIGS. 14A and 14B are flowcharts illustrating processing for switching initial communication and a communication method for the time-division communication according to the first embodiment.
Figure 14B:
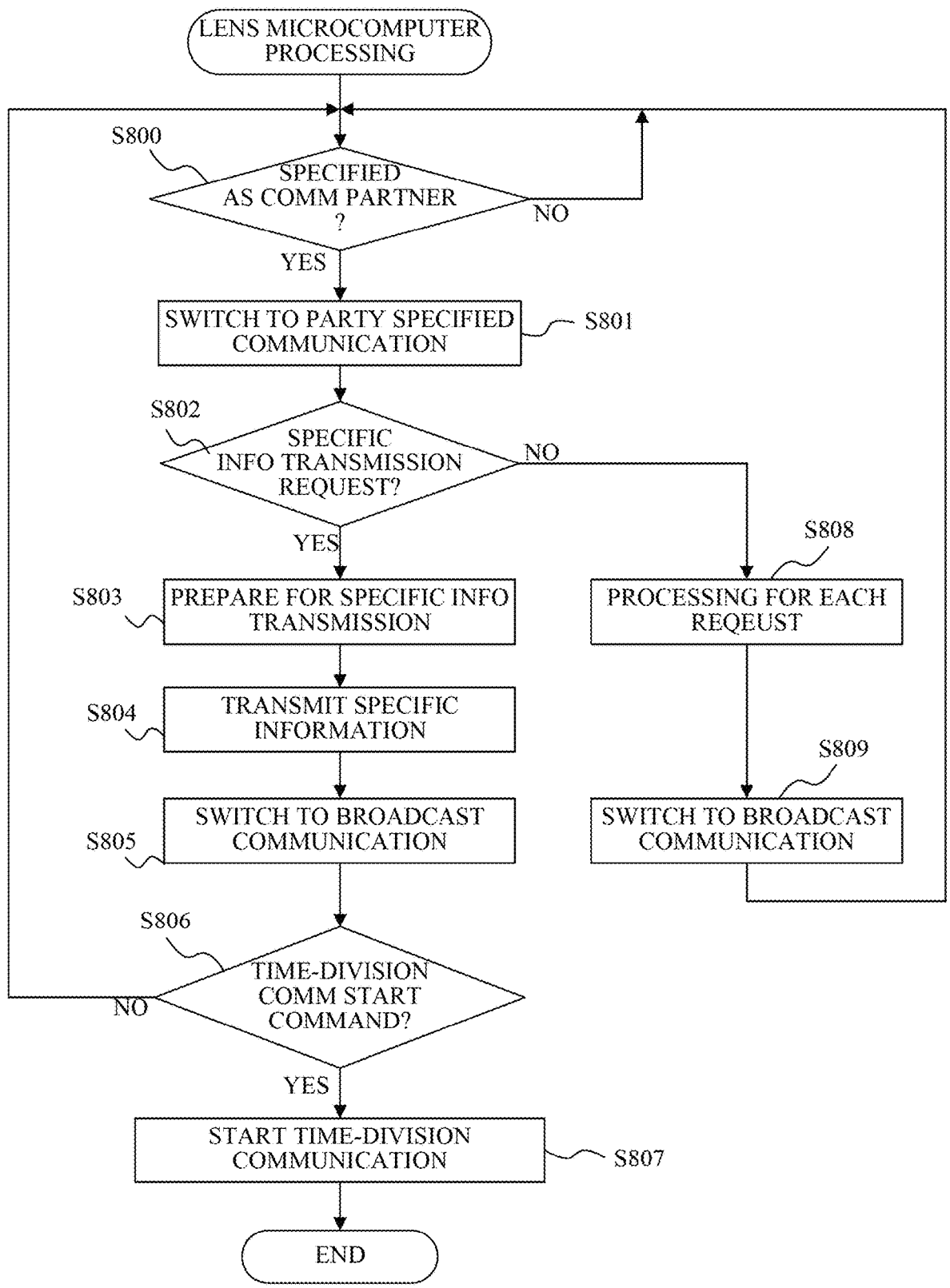

Flowcharts of FIGS. 14A and 14B illustrate processing (communication control method) for switching from broadcast communication to time-division communication. These flowcharts illustrate processing executed by the camera microcomputer 205 as a communication master and the lens microcomputer 111 as a communication slave. The camera microcomputer 205 and the lens microcomputer 111 perform the processing illustrated in the flowcharts of FIGS. 14A and 14B according to computer programs. Since the processing executed by the adapter microcomputer 302 is basically the same as the processing executed by the lens microcomputer 111, a description thereof will be omitted.

The camera microcomputer 205 determines in S700 whether or not the camera microcomputer 205 has recognized the number of accessory apparatuses attached to the camera 200. In a case where the camera microcomputer 205 has not yet recognized it, the flow proceeds to S701, and the camera microcomputer 205 reads the voltage of the contact terminal provided on the mount 401 to recognize the number of accessory apparatuses. The contact terminal of the mount 401 is pulled up inside the camera 200 and pulled down inside the interchangeable lens 100. In the intermediate adapter 300, resistors are connected in series to the contact terminal of the mount 401 on the camera side and the contact terminal of the mount 400 on the lens side. Thereby, as the number of accessory apparatuses attached to the camera 200 increases, a resistance value of the contact terminal of the mount 400 on the lens side becomes higher than that of the contact terminal of the mount 401 on the camera side. The camera microcomputer 205 recognizes the number of attached intermediate accessories by reading the voltage value of the contact terminal of the mount 401. The interchangeable lens 100 is an essential accessory apparatus for the camera 200 and can be considered to be always attached to the camera 200. In a case where the camera microcomputer 205 recognizes the number of attached accessory apparatuses, the flow proceeds to S702.

In S702, the camera microcomputer 205 determines whether or not the camera microcomputer 205 has acquired the lens-specific information from the lens microcomputer 111. In a case where the camera microcomputer 205 has acquired it, the flow proceeds to S705, and in a case where the camera microcomputer 205 has not yet acquired it, the flow proceeds to S703.

In S703, the camera microcomputer 205 outputs Low to the notification channel CS and transmits communication party specified data for specifying the lens microcomputer 111 as a communication party to the lens microcomputer 111 through broadcast communication.

In S704, the camera microcomputer 205 transmits a transmission request for lens-specific information to the lens microcomputer 111 while keeping the notification channel CS high. Thereafter, the camera microcomputer 205 once outputs Low to the notification channel CS, and after completing preparation for data reception in the data communication channel DATA, stops outputting Low to the notification channel CS and waits for a reply from the lens microcomputer 111. In a case where the lens-specific information is returned from the lens microcomputer 111, the flow proceeds to S705.

In S705, the camera microcomputer 205 determines whether or not the camera microcomputer 205 has acquired adapter-specific information from the adapter microcomputer 302. In a case where the camera microcomputer 205 has acquired the adapter-specific information, the flow proceeds to S708, and in a case where the camera microcomputer 205 has not yet acquired the adapter-specific information, the flow proceeds to S706.

In S706, the camera microcomputer 205 outputs Low to the notification channel CS, and transmits communication party specified data for specifying the adapter microcomputer 302 as a communication party through broadcast communication.

In S707, the camera microcomputer 205 transmits a transmission request for adapter-specific information to the adapter microcomputer 302 while keeping the notification channel CS high. Thereafter, the camera microcomputer 205 once outputs Low to the notification channel CS, and after completing preparation for data reception in the data communication channel DATA, stops outputting Low to the notification channel CS and waits for a reply from the adapter microcomputer 302. In a case where the adapter-specific information is returned from the adapter microcomputer 302, the flow proceeds to S708.

In S708, the camera microcomputer 205 calculates time-division setting information based on the number of attached accessory apparatuses and the characteristic information including the lens-specific information from the interchangeable lens 100 and the adapter-specific information from the intermediate adapter 300.

In S709, the camera microcomputer 205 outputs Low to the notification channel CS and transmits a time-division communication start command to the lens microcomputer 111 and the adapter microcomputer 302 through broadcast communication. This time-division communication start command includes the time-division setting information described above.

In S710, the camera microcomputer 205 determines whether or not a predetermined time has elapsed after transmitting the time-division communication start command. The predetermined time may be, for example, the period T or another time. The predetermined time is the time for each accessory apparatus that has received the time-division communication start command to prepare for the time-division communication start. After the predetermined time has elapsed, the flow proceeds to S711 and starts time-division communication.

On the other hand, the lens microcomputer 111 determines in S800 whether or not the lens microcomputer 111 has been specified as a communication party by the camera microcomputer 205. In a case where the lens microcomputer 111 is not specified as a communication party, the lens microcomputer 111 waits, and in a case where the lens microcomputer is specified, the flow proceeds to S801.

In S801, the lens microcomputer 111 switches from broadcast communication to party specified communication and waits for communication from the camera microcomputer 205.

In S802, the lens microcomputer 111 analyzes the communication from the camera microcomputer 205 and determines whether or not the communication includes a specific information transmission request. In a case where the communication includes a specific information transmission request, the flow proceeds to S803 to prepare for transmission of lens-specific information. Then, in S804, the lens microcomputer 111 waits for the camera microcomputer 205 that has transmitted the specific information transmission request to stop outputting Low to the notification channel CS and the notification channel CS to become high. In a case where the notification channel CS becomes high, the lens microcomputer 111 connects the data communication channel DATA to the data output unit of the lens microcomputer 111 and starts transmitting the lens-specific information.

In S805, the lens microcomputer 111 switches from the party specified communication to the broadcast communication again.

In S806, the lens microcomputer 111 determines whether the data received from the camera microcomputer 205 through the broadcast communication includes a time-division communication start command. In a case where the data includes the time-division communication start command, the flow proceeds to S807 to set time-division communication according to the time-division setting information included in the received time-division communication start command, and waits for the camera microcomputer 205 to start communication. In a case where the lens microcomputer 111 determines in S806 that the data does not include the time-division communication start command, the flow returns to S800.

The lens microcomputer 111 that has determined in S802 that the communication from the camera microcomputer 205 does not include the specific information transmission request performs processing for each of other requests. Then, the flow proceeds to S809 to switch from the party specified communication to the broadcast communication again, and returns to S800.

<Data Packet Structure>

FIG. 15 illustrates a structure of one data packet. The accessory apparatus is the interchangeable lens 100 as an example, but may be the intermediate adapter 300.

A description will now be given of the structure of a data packet transmitted from the camera microcomputer 205 to the lens microcomputer 111. The data packet has destination information ADDR, one or more command packets CMDPn, and a data packet checksum TSUM. Each command packet CMDPn includes command length information LENn, command CMDn, command data CDATAn-m, and command packet checksum PSUMn. Each of n and m is an integer of 1 or more.

The destination information ADDR is information representing a transmitter and a receiver of the data packet, and a number is assigned for each type of data packet such as "01" for "C→L" and "02" for "C→A." The checksum TSUM of a data packet is the sum of numerical values of all data from the head to the second from TSUM in one data packet.

One or more command packets CMDP is included in one data packet. Each command packet indicates a request command for the lens microcomputer 111, such as a data reception request, a data transmission request, and an actuator driving request.

The command length information LENn in the command packet CMDP represents a data amount in one entire command packet. The command CMDn represents a request from the camera microcomputer 205 to the lens microcomputer 111, and each request is given a specific number, such as "01" for an image stabilizing data reception request, and "02" for a control ring operation amount transmission request.

The command data CDATAn-m is a data group accompanying each command CMDn, and corresponds to, for example, a plurality of bytes of image stabilizing data accompanying the image stabilizing data reception request. In a case where data transmission from the camera microcomputer 205 is unnecessary, such as the control ring operation amount transmission request, the command data CDATAn-m may be omitted. The checksum PSUM of a command packet is the sum of numerical values of all data from the head to the second from PSUM in one command packet.

A description will now be given of the structure of the data packet transmitted from the lens microcomputer 111 to the camera microcomputer 205. Its basic structure is the same as a data packet transmitted from the camera microcomputer 205. However, a command packet included in the data packet transmitted from the lens microcomputer 111 is always a reply to a certain request previously received from the camera microcomputer 205. For example, in a case where the lens microcomputer 111 receives an image stabilizing data reception request as CMDP1 from the camera microcomputer 205, CMDPR1 transmitted from the lens microcomputer 111 is a response to the image stabilizing data reception request.

The data packet structure described above is merely illustrative. Transmission and reception from the camera microcomputer 205 to the accessory apparatus may not necessarily be paired, and an error check may be performed by a cyclic redundancy check (CRC) instead of a checksum. A completely different data packet structure may be employed.

<Time-Division Communication According to Predetermined Time-Division Setting Information>

Figure 16:
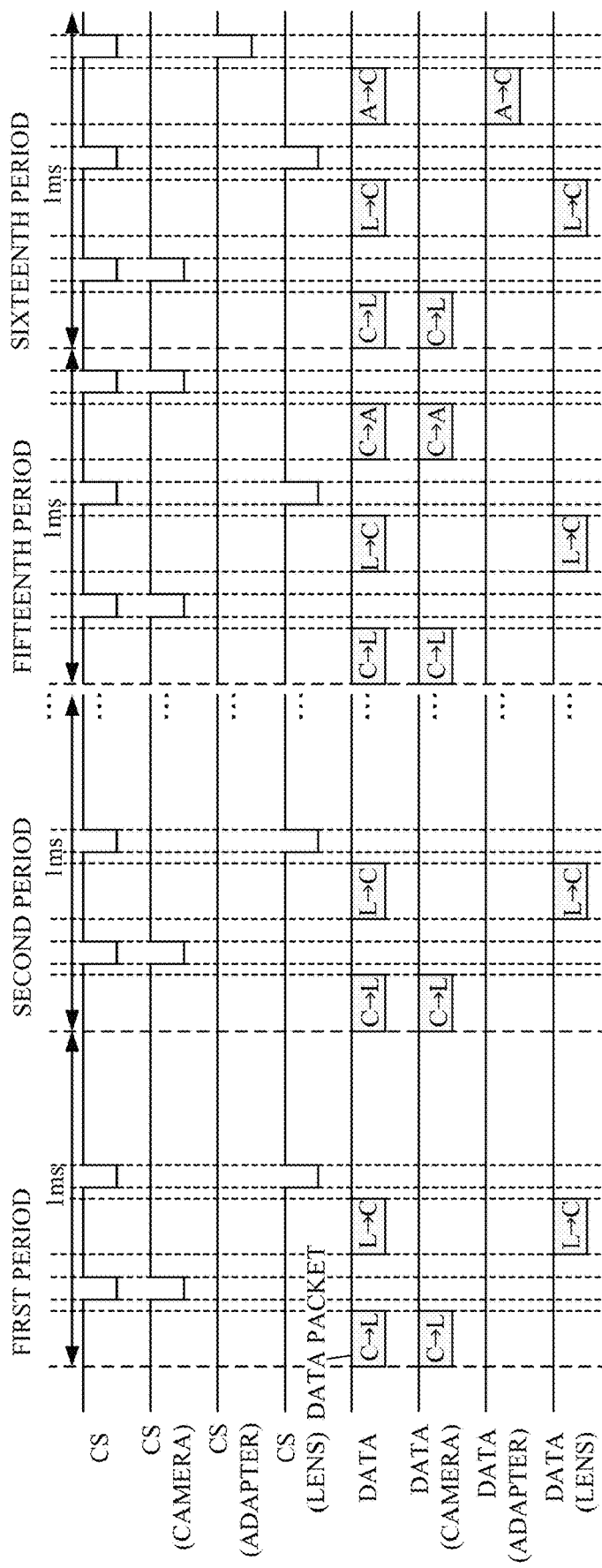
FIG. 16 illustrates signal waveforms in data packets determined before the time-division communication according to the first embodiment.

FIG. 16 illustrates signal waveforms in a case where time-division communication is performed according to time-division setting information determined before the time-division communication is performed. FIG. 16 illustrates signal waveforms where the camera 200 is mounted with the interchangeable lens 100 that performs communication regarding the image stabilizing function (referred to as image stabilizing communication hereinafter) and the intermediate adapter 300 that performs communication regarding operation of the control ring (referred to as ring operation communication hereinafter). The method of determining the time-division setting information is as described with reference to FIGS. 12 and 13. A communication period (T) is 1 ms, and up to three data packets are included in each period. The data packets "C→L" and "L→C" are transmitted and received in each period, and the data packet "C→L" is always placed at the beginning of each period. Since ring operation communication may be performed once every 16 ms, the data packet "C→A" is additionally transmitted and received in the fifteenth period, and the data packet "A→C" is additionally transmitted and received in the sixteenth period. As long as the time-division setting information is not changed or the time-division communication is not stopped, the communication in the first period to the sixteenth period is repeated.

Although FIGS. 12 and 13 respectively illustrate examples of characteristic information and time-division setting information of the accessory apparatus, other characteristic information and time-division setting information may be used. For example, the maximum number of data packets in one period may be set to four, and all data packets "C→L," "L→C," "C→A," and "A→C" may be communicated every period. Two or more identical data packets may exist within one period. Communication between the camera 200 and the interchangeable lens 100 does not have to be performed every period. The data packet "C→A" may be set to the head in each period.

<Changing Time-Division Setting Information During Time-Division Communication>

Figure 18:
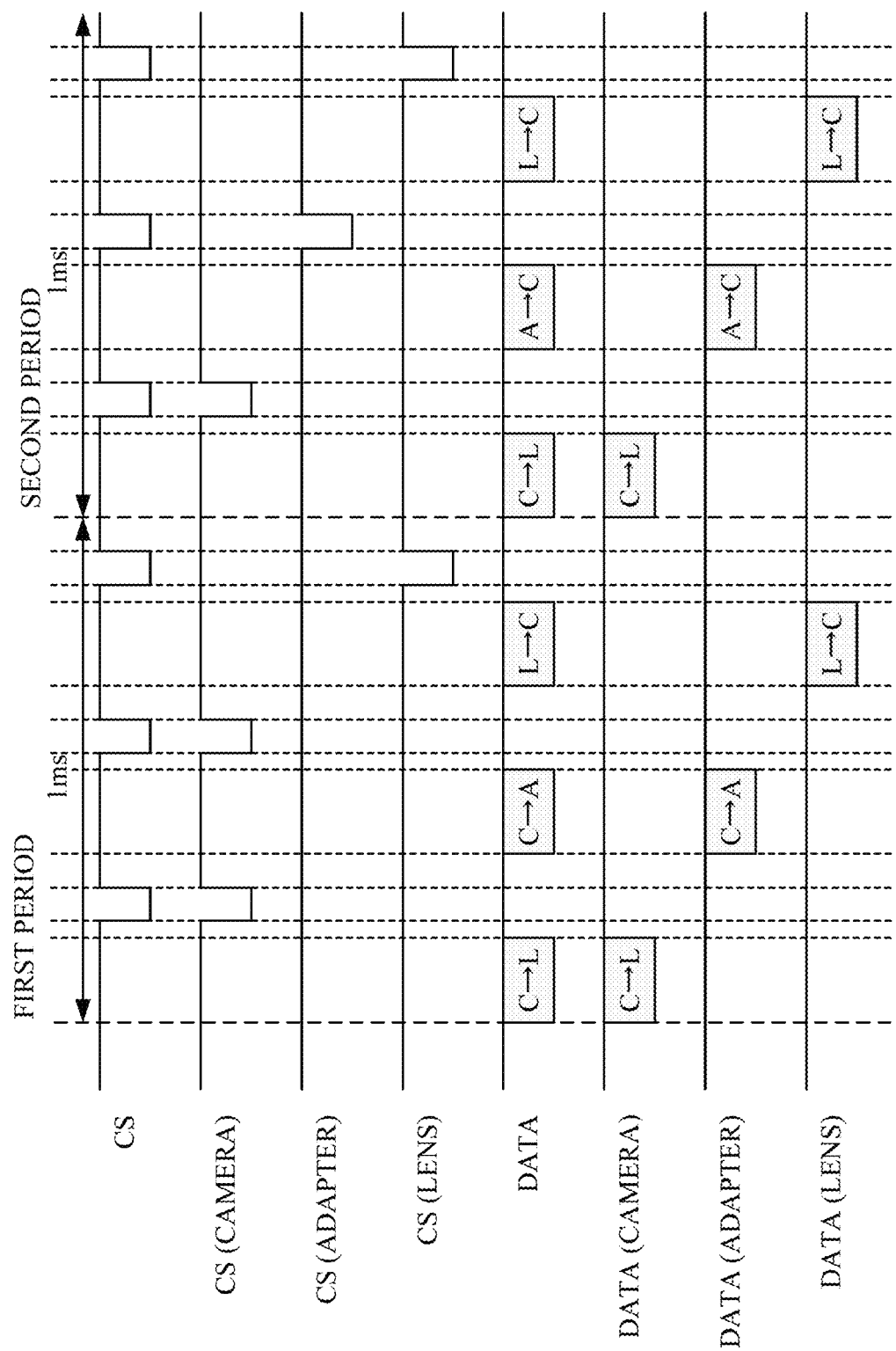
FIG. 18 illustrates signal waveforms of setting information after the change according to the first embodiment.

The time-division setting information may be changed during time-division communication. FIG. 17 illustrates an example of pre-change time-division setting information and post-change time-division setting information. FIG. 18 illustrates signal waveforms in time-division communication according to the post-change time-division setting information illustrated in FIG. 17. FIGS. 17 and 18 illustrate examples in which the control ring of the intermediate adapter 300 is operated during the time-division communication, the ring operation function becomes active, and the time-division setting information is changed. The maximum number of data packets, the type and number of data packets, the order of data packets, and the data packet length are as described with reference to FIG. 13.

In FIGS. 17 and 18, the frequencies of the data packets "C→A" and "A→C" transmitted and received by the camera microcomputer 205 and the adapter microcomputer 302 are changed from once every 16 ms to once every 2 ms, and "C→A" and "A→C" are changed to be located before "L→C." Thus, changing the time-division setting information in the middle of the time-division communication can switch the communication frequencies of the data packets "C→A" and "A→C" to the communication frequencies that emphasize the responsiveness of the control ring.

The functions that require changing the time-division setting information during the time-division communication and the post-change time-division setting information described here are merely illustrative, and may be changed to other time-division setting information when another function becomes active.

<Change Processing of Time-Division Setting Information During Time-Division Communication>

Figure 19A:
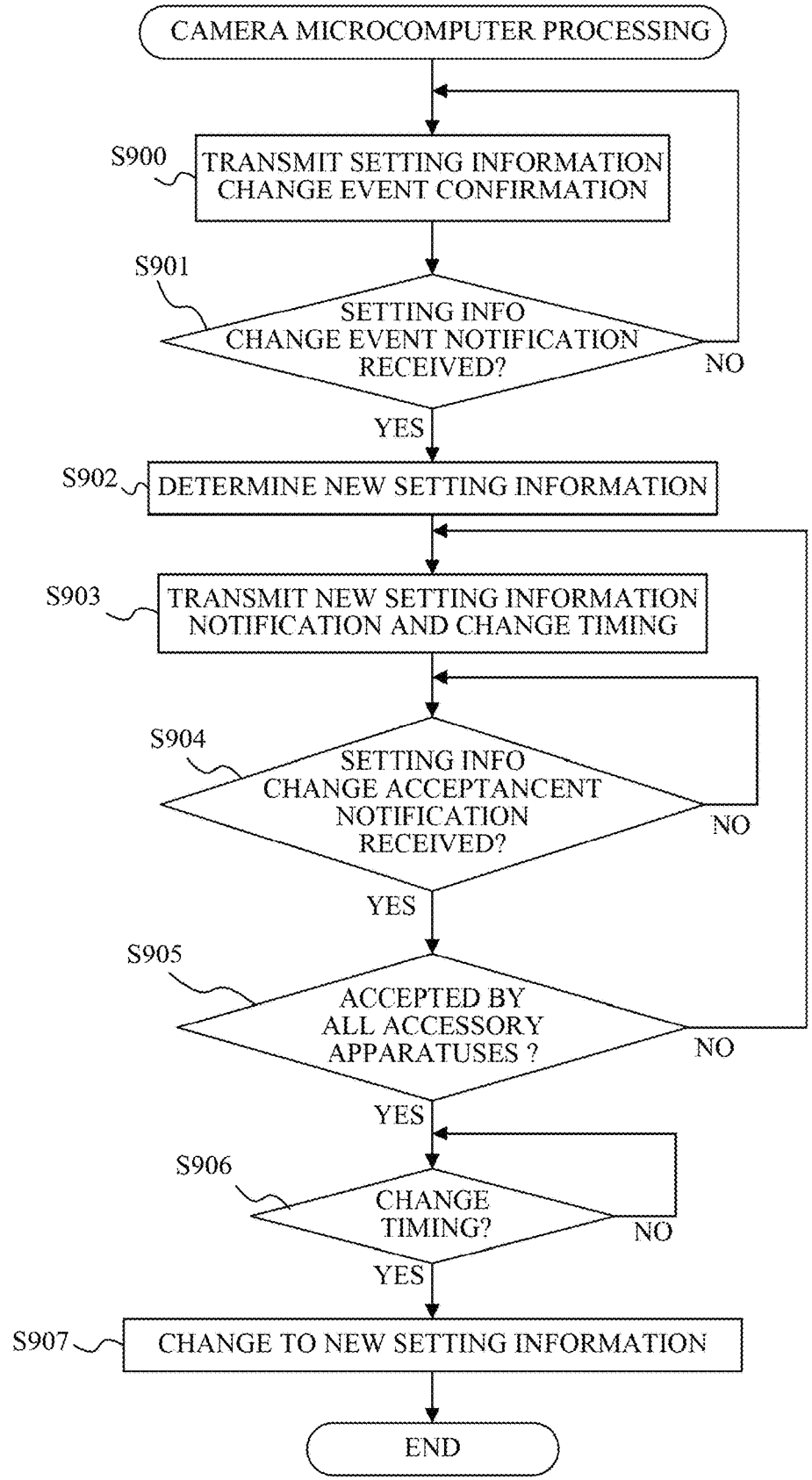
FIGS. 19A and 19B are flowcharts illustrating processing for switching data packet structures during the time-division communication according to the first embodiment.
Figure 19B:
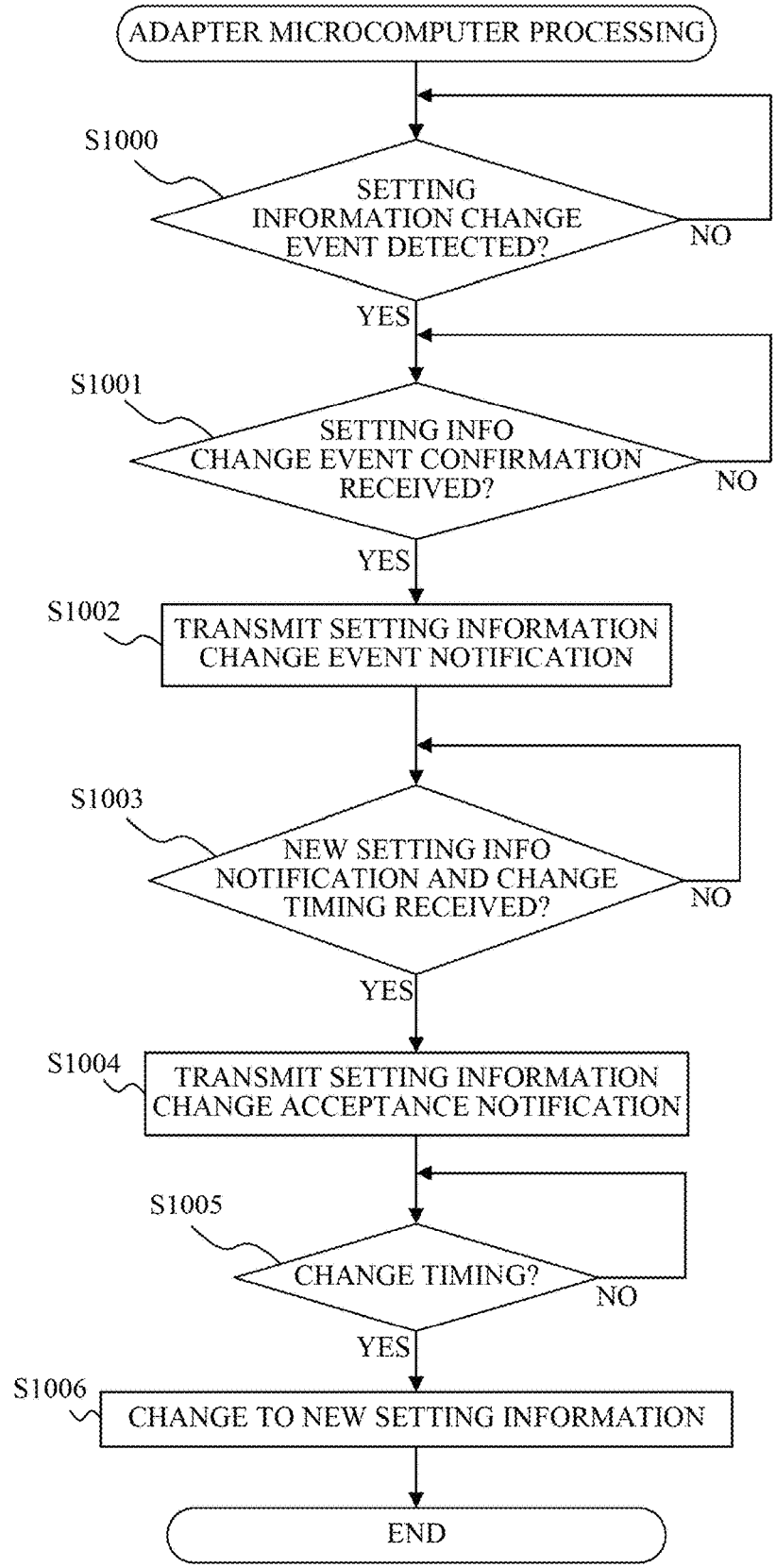

Flowcharts of FIGS. 19A and 19B illustrate processing for changing time-division setting information during time-division communication. FIGS. 19A and 19B illustrate processing executed by the camera microcomputer 205 as a communication master and the adapter microcomputer 302 as a communication slave. The camera microcomputer 205 and the adapter microcomputer 302 perform the processing illustrated in the flowcharts of FIGS. 19A and 19B according to computer programs. Since the processing executed by the lens microcomputer 111 is basically the same as the processing executed by the adapter microcomputer 302, a description thereof will be omitted.

In S900, the camera microcomputer 205 transmits to each accessory apparatus attached to the camera 200 a request that requests it to confirm whether a function that needs to change the time-division setting information (abbreviated as setting information in FIGS. 19A and 19B) is activated. The function here is assumed to be the control ring operation function in the intermediate adapter 300 as illustrated in FIG. 17, but may be a function of another accessory apparatus.

In S901, in a case where the camera microcomputer 205 receives notification from the accessory apparatus (adapter microcomputer 302) that the function that needs to change of the time-division setting information has been activated, the flow proceeds to S902.

In S902, the camera microcomputer 205 determines new time-division setting information according to the activated function. The determination method is as described with reference to FIGS. 17 and 18.

In S903, the camera microcomputer 205 transmits to each accessory apparatus in data packets "C→L" and "C→A" of the time-division communication, the newly determined time-division setting information for the accessory apparatus and information indicating its change timing (referred to as change timing information hereinafter). The change timing information is to match the timing at which the camera microcomputer 205, the lens microcomputer 111, and the adapter microcomputer 302 change the time-division setting information, and is information such as the number of periods up to the change and the number of data packets. The new time-division setting information and change timing information need not be transmitted at the same time, and may be transmitted separately. While the camera microcomputer 205 transmits the change timing information to each accessory apparatus here, but each microcomputer may match the change timing based on the pre-change time-division setting information and the post-change time-division setting information.

In S904, in a case where the camera microcomputer 205 receives a change acceptance notification from each accessory apparatus, the flow proceeds to S905. The change acceptance notification indicates that the time-division setting information can be changed based on the new time-division setting information and change timing information received by the accessory apparatus. The accessory apparatus may transmit the acceptance notification of the new time-division setting information and the acceptance notification of the change timing information to the camera microcomputer 205 at the same time or at different timings as separate notifications. Unless required by the camera microcomputer 205, the accessory apparatus may not transmit the acceptance notification.

In S905, the camera microcomputer 205 determines whether or not the camera microcomputer 205 has received change acceptance notifications from all the accessory apparatuses attached to the camera 200. If so, the flow proceeds to S906, and if there is an accessory apparatus from which the camera microcomputer 205 has not yet received the change acceptance notification, the flow returns to S903.

In S906, the camera microcomputer 205 determines whether or not the change timing has come, and in a case where it comes, changes the time-division setting information to new one in S907.

On the other hand, in a case where the adapter microcomputer 302 detects an event to change the time-division setting information in S1000, the flow proceeds to S1001. The event here is the operation of the control ring.

In S1001, the adapter microcomputer 302 determines whether or not the adapter microcomputer 302 has received a request from the camera microcomputer 205 for confirming whether a function that needs to change the time-division setting information has been activated, and if so, the flow proceeds to 51002.

In 51002, the adapter microcomputer 302 transmits to the camera microcomputer 205 a notification indicating that the function that needs to change the time-division setting information has been activated.

In 51003, the adapter microcomputer 302 determines whether or not new time-division setting information and change timing information have been received from the camera microcomputer 205. If so, the flow proceeds to 51004. As described above, the new time-division setting information and change timing information do not necessarily need to be received at the same time, and may be received separately. Further, as described above, the change timing of the time-division setting information may be matched based on the pre-change time-division setting information or the post-change time-division setting information without using the change timing information.

In 51004, the adapter microcomputer 302 transmits the change acceptance notification to the camera microcomputer 205. As described above, the change acceptance notification of the time-division setting information and the acceptance notification of the change timing information may be transmitted to the camera microcomputer 205 at the same time or at different times, or may not be transmitted unless the camera microcomputer 205 requires them.

In 51005, the adapter microcomputer 302 determines whether or not the change timing has come, and in a case where it comes, changes the time-division setting information to new information in S1006.

Second Embodiment

A description will now be given of a second embodiment according to the disclosure. The camera system according to the second embodiment has a configuration similar to that of the first embodiment. However, the accessory characteristic information includes function information, a request period, and a request data size as information about functions possessed by the accessory apparatus. Determining a data packet size as the data packet length described in the first embodiment based on the accessory characteristic information can improve communication efficiency in the time-division communication.

FIG. 20 illustrates accessory characteristic information according to this embodiment. Function information (a11) represents a classification of functions possessed by the accessory apparatus. This embodiment sets three types of function information 1, function information 2, and function information 3, which are different in function classification. The data packet size is determined by allocating a data size to a data packet according to the priority of data communication associated with each piece of function information. A method of determining the data packet size will be described below with reference to FIGS. 21 and 22.

The function information 1 indicates functions of the accessory apparatus controlled by the camera 200, such as image stabilization, autofocus, aperture driving, and zoom driving, by transmitting a control value from the camera 200 to the accessory apparatus. These functions require higher responsiveness than functions classified as other function information, and are executed in strict periods, so communication must be given priority over other functions. In other words, by preferentially securing the data packet size corresponding to the function classified as the function information 1, efficient communication can be obtained while the execution period of the function is secured.

The function information 2 is information indicating a function that requires responsiveness among functions for transmitting information from the accessory apparatus to the camera 200. The functions classified as the function information 2 include functions that are used by the camera 200 to control or change settings, such as a notification function of the operation of the control ring of the intermediate adapter 300 and a notification function of a current position of the image stabilizing lens 103 or the focus lens 104 in the interchangeable lens 100. Functions classified as function information 2 do not require higher responsiveness than functions classified as the function information 1, but may cause the performance of the accessory apparatus to deteriorate in a case where the responsiveness is lost. Therefore, a data packet size is preferentially secured for the functions classified as the function information 2 in order to perform preferential communication over functions classified as the function information 3 described below.

The function information 3 is information indicating a function for transmitting or receiving information that does not require high responsiveness between the camera 200 and the accessory apparatus. Functions classified as function information 3 include a function of transmitting and receiving information indicating a setting state of a switch for switching between autofocus and manual focus in the interchangeable lens 100 and a state of a switch for switching turning on and turning off of the image stabilization. Although it is necessary to notify the camera 200 of these setting states, this information is less influential on the user than the functions classified as function information 2 in a case where notification delays. Thus, the functions classified as the function information 3 are given lower priority than the other functions to secure the data packet size.

The function information 1, the function information 2, and the function information 3 are merely illustrative, and the number of pieces of function information does not have to be three. The function information may be provided for each period necessary to execute a function. In determining the data packet size, the function information 2 may be given priority over the function information 1, and some functions may be given higher priority among the same function information.

Required period (a12) represents a required period for each accessory apparatus to execute the corresponding function. For example, a period required for a function of controlling image stabilization (referred to as an image stabilizing control function hereinafter) classified as function information 1 is 1 ms, and a period required for a transmission function of control ring operation amount (referred to as control ring operation function hereinafter) classified as function information 2 is 16 ms. A status notifying function classified as the function information 3 has no particular period restriction. There are generations (methods with different data types and transmission frequencies) for the function of controlling the image stabilization, and the necessary period may be different for each generation. A plurality of values may be set as a period corresponding to a function. A period may be settable for each accessory apparatus rather than for each function.

Required data size (a13) represents a required data size for executing the function of each accessory apparatus. In this embodiment, communication with the image stabilizing control function requires a command packet size of 24 bytes in a direction from C to L within a period of 1 ms. The control ring operation function requires a command packet size of 16 bytes in a direction from A to C within a period of 16 ms. The status notifying function requires 12 bytes for each data packet as the command packet size, although there is no periodical limit.

The required data size described here is merely illustrative. For example, the specific data size required to execute the function may be different from the number of bytes described above, and the required data size may be different for each period corresponding to the function. The required data size may range from the minimum required data size for executing the function to a sufficiently large data size.

The accessory characteristic information (supported baud rate, communication direction switching time, and transmission/reception buffer size) in FIG. 20 is as described in FIG. 12.

Figure 21:
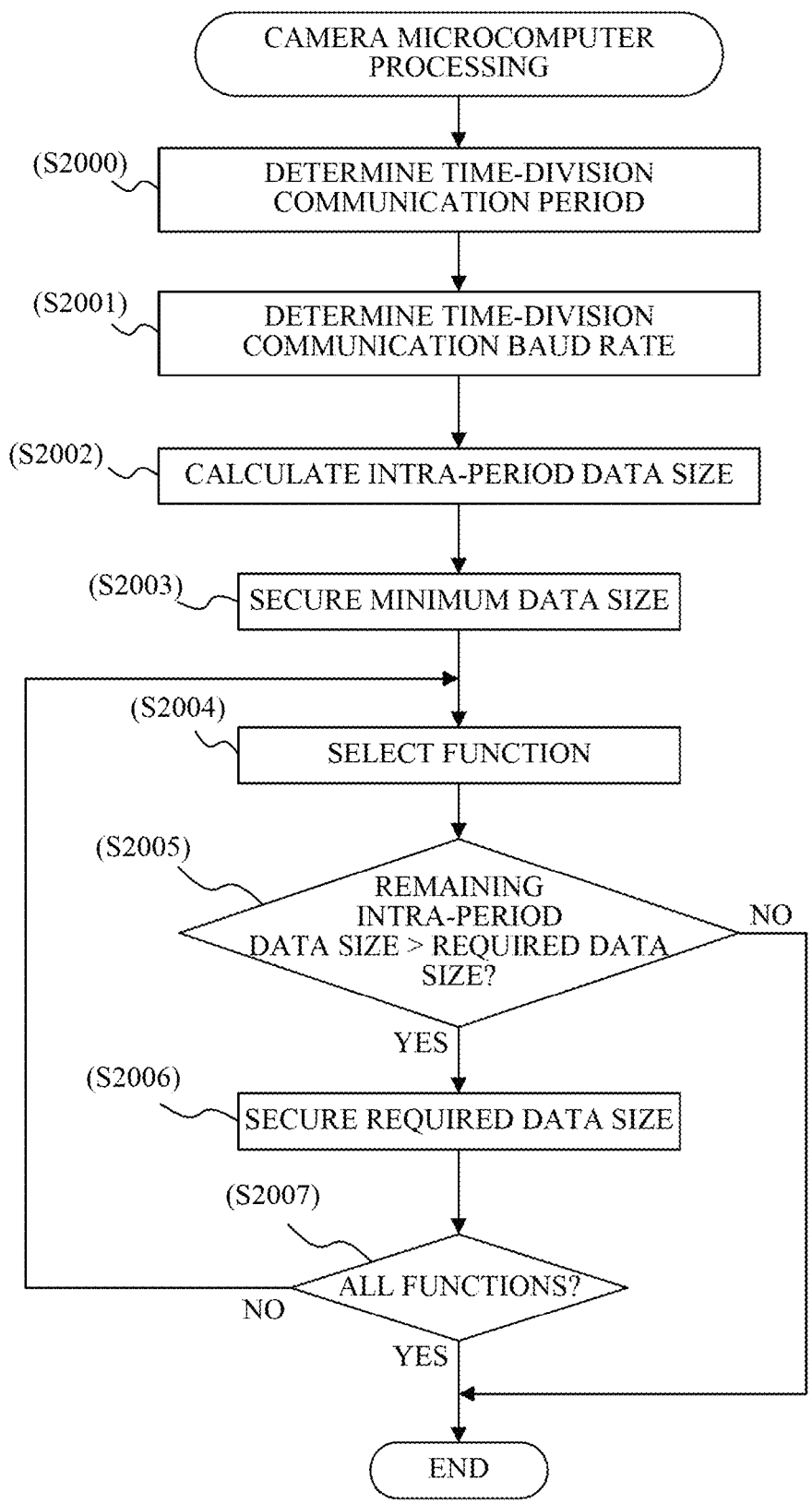
FIG. 21 is a flowchart illustrating data packet size determination processing according to the second embodiment.

A flowchart in FIG. 21 illustrates processing (communication control method) for the camera microcomputer 205 to determine a data packet size based on the accessory characteristic information described in FIG. 20. The camera microcomputer 205 executes this processing according to a computer program.

The camera microcomputer 205 acquires accessory characteristic information from all accessory apparatuses connected to the camera 200 in S2000. Then, the camera microcomputer 205 compares the request periods (a11) in FIG. 20 of all accessory apparatuses, and determines the minimum value among them as the communication period. The determined communication period is not only an element for determining a data packet size, but also time-division setting information to be notified to the accessory apparatus included in FIG. 23, which will be described below.

Next, in S2001, the camera microcomputer 205 selects as the communication baud rate the fastest baud rate that can be supported by all the accessory apparatuses and the camera 200. A method of determining a communication baud rate may be different from this method. For example, the lowest baud rate may be selected to avoid communication noise, or different baud rates may be set for respective accessory apparatuses. The determined communication baud rate, similar to the communication period, is an element for determining the data packet size, and is also time-division setting information to be notified to the accessory apparatus.

Next, in S2002, the camera microcomputer 205 calculates an intra-period (or in-period) transmittable/receivable time, which is the time allocated for data transmission/reception within one communication period, by subtracting the communication direction switching time for the data packet from the determined communication period. Then, the camera microcomputer 205 calculates an intra-period data size, which is the maximum data size that can be transmitted and received within the period, by multiplying the intra-period transmittable/receivable time by the communication baud rate.

In the subsequent steps, the camera microcomputer 205 determines a data packet size for each communication direction by allocating an intra-period data size to a data packet distinguished for each communication direction. In the following description, the intra-period data size that has not yet been allocated will be referred to as a remaining intra-period data size.

Next, in S2003, the camera microcomputer 205 secures the minimum required data size for performing time-division communication from the intra-period data size. The camera microcomputer 205 secures the minimum required data size on the assumption that the destination information ADDR and the checksum TSUM of the data packet are required for each data packet.

The minimum required data size is not limited to this example, and may not be secured by considering that it is 0 bytes, or a data size for the command length information LENn, the command CMDn, and the checksum PSUM of the command packet may be secured, which are components of the command packet. Alternatively, a completely different data packet structure may be employed to secure the data size required for the data packet structure.

Next, in S2004, the camera microcomputer 205 selects a function according to the priority of data communication determined based on the function information. In this embodiment, the image stabilizing control function classified as the function information 1 has the highest priority and is selected first. Next, the control ring operation function classified as the function information 2 is selected second. Finally, the status notifying function classified as the function information 3 is selected. The selection order and priority of the functions are not limited to this example, and not all functions may be selected, and the priority may be determined by the user.

Next, in S2005, the camera microcomputer 205 compares the required data size of the selected function with the remaining intra-period data size. In a case where the remaining intra-period data size is larger than the required data size, the flow proceeds to S2006. S2005 is not always necessary, and in a case where the intra-period data size is sufficiently larger than the required data size of the function or other cases, the flow may proceed directly from S2004 to S2006.

In S2006, the camera microcomputer 205 secures the required data size of the function within the remaining intra-period data size and allocates it to the corresponding data packet. At this time, the required data size of the function may be obtained from the accessory apparatus as accessory characteristic information, or may be previously stored as internal data in the camera 200.

Next, in S2007, the camera microcomputer 205 determines whether data sizes have been allocated to all functions, and in a case where all functions have been allocated, ends this processing. In a case where the allocation processing to all functions has not been completed, the flow returns to S2004 to select the next function from the priority determined based on the function information.

The camera microcomputer 205 repeats the above processing until the required data size of the function cannot be secured or data sizes are assigned to all functions. Thus, the data packet size is determined by allocating the data size based on the function information.

Figure 22:
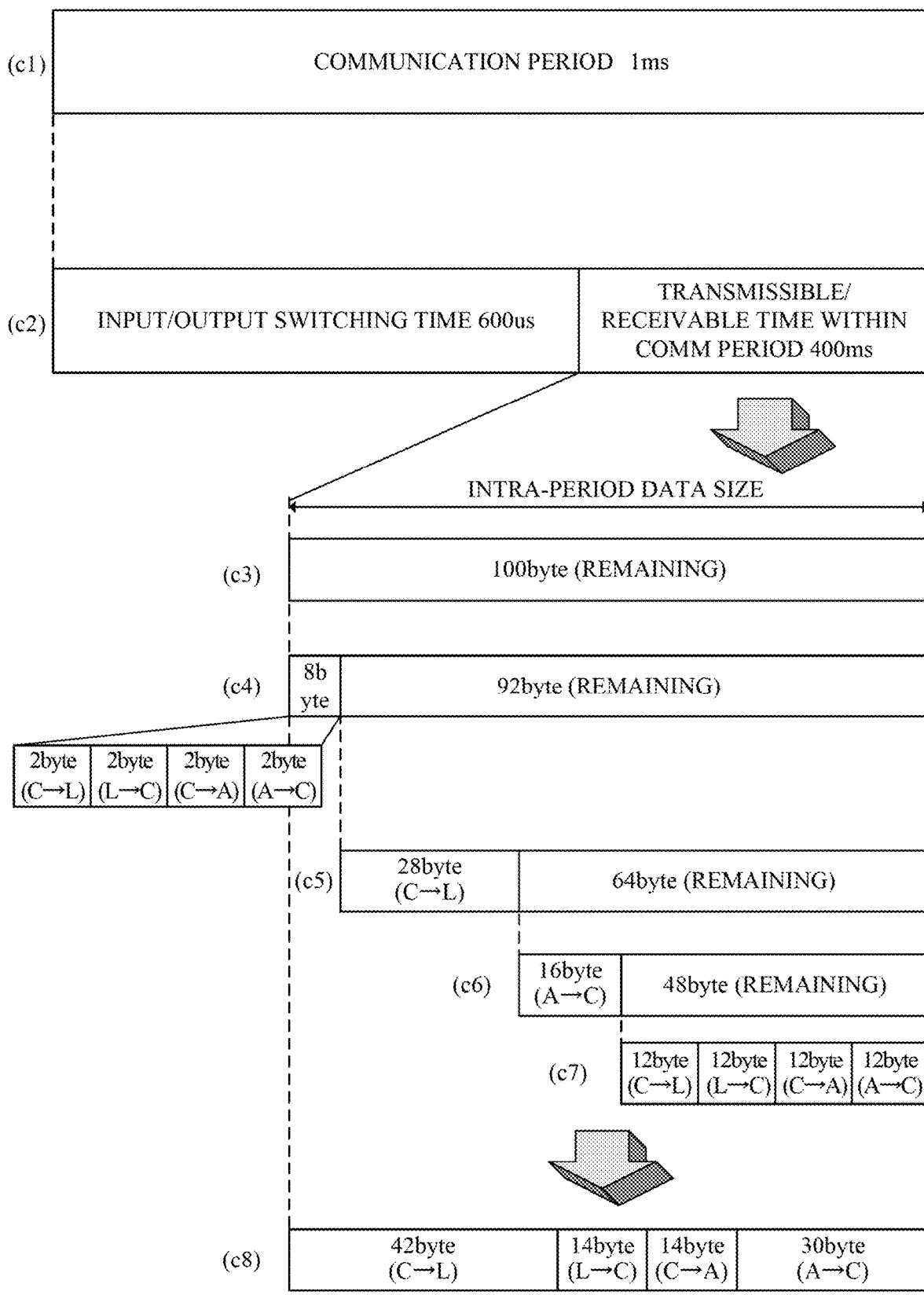
FIG. 22 illustrates a flow of determining the data packet size according to the second embodiment.

FIG. 22 illustrates how the camera microcomputer 205 determines the data packet size in the processing illustrated in FIG. 21 based on the accessory characteristic information illustrated in FIG. 20.

In (c1), in S2000, 1 ms is determined as the communication period. 1 ms is a shorter one of a period of 1 ms required to execute the image stabilizing control function in FIG. 20 and a required period of 16 ms required to transmit the operation amount of the control ring.

Next, in (c2), in S2001, the transmissible/receivable time within the communication period is calculated by subtracting the sum of communication direction switching time that occurs between intra-period data packets from the communication period. In this embodiment, data packets are communicated in the order of C→L, L→C, C→A, and A→C within a communication period. There are two data packets depending on the communication direction switching time between the interchangeable lens 100 and the intermediate adapter 300, and for the communication direction switching time between the interchangeable lens 100 and the intermediate adapter 300 in FIG. 20, 600 μs is totally required. Hence, the transmissible/receivable within the communication period time is 400 μs.

It is not always necessary to determine the transmissible/receivable time within the communication period based on the communication direction switching time between the interchangeable lens 100 and the intermediate adapter 300. For example, the transmissible/receivable time within the communication period may be determined based on the communication direction switching time that the camera 200 has as internal information, or the transmissible/receivable time within the communication period may be previously determined as a communication rule.

In (c2), in S2001, 2.5 Mbps is determined as the communication baud rate. 2.5 Mbps is the fastest baud rate amount the supported baud rates of the interchangeable lens 100 and the intermediate adapter 300 illustrated in FIG. 20.

Next, in (c3), in S2002, the intra-period data size of 100 bytes is calculated by multiplying the transmissible/receivable time within the communication period of 400 μs by the communication baud rate of 2.5 Mbps. Since this embodiment adds a start bit and a stop bit in transmitting and receiving data for each 1 byte, 1 byte is calculated as 10 bits.

Next, in (c4), in S2003, a total of 8 bytes is secured within the intra-period data size, for 2 bytes of the destination information ADDR and the checksum TSUM of the data packet for each data packet as the minimum necessary data size for time-division communication.

Next, in (c5), in S2004 and S2005, 24 bytes as the required data size of the image stabilizing control function, which is a function classified as the function information 1, is allocated to a data packet of C→L.

Also, in (c6), similarly, 16 bytes as the required data size of the control ring operation function, which is a function classified as the function information 2, is allocated to a data packet of A→C.

In (c7), a total of 48 bytes, 12 bytes for each data packet, is secured as the required data size for a status notifying function classified as the function information 3.

As illustrated in (c8), the secured data size is organized for each data packet as follows. 42 bytes for C→L, 14 bytes for L→C, 14 bytes for C→A, and 30 bytes for A→C. This embodiment secures a data packet size corresponding to C→L larger than another data packet size according to the required data size of the image stabilizing control function. In addition, due to the required data size of the control ring operation function, the corresponding data packet size of L→C is secured larger than other data packet sizes excluding that for C→L. The data packet size is determined as described above.

The data packet size determination method described here is merely illustrative, and another determination method may be used. For example, the data packet size may be determined by the function, or the data packet size may be the same for each data packet as long as the required data size can be sufficiently secured.

FIG. 23 illustrates time-division setting information that the camera microcomputer 205 notifies to the lens microcomputer 111 and the adapter microcomputer 302 in this embodiment. The time-division setting information includes a communication period, a communication baud rate, and a data packet size of each data packet for time-division communication. The communication period is 1 ms, and the communication baud rate is 2.5 Mbps. The data packet sizes are as follows: 42 bytes for C→L, 14 bytes for L→C, 14 bytes for C→A, and 30 bytes for A→C. These values are merely illustrative, and for example, the communication period and communication baud rate may be fixed and not included in the time-division setting information. The time-division setting information may include the order of data packets and the transmission and reception timings within the communication period.

The time-division setting information including the data packet size is notified to each accessory apparatus through the party specified communication illustrated in FIGS. 8A and 8B of the first embodiment before time-division communication is performed. This configuration allows the camera 200 and all accessory apparatus to share the time-division setting information. The method of notifying the time-division setting information is not limited to this example. For example, as illustrated in FIGS. 14A and 14B of the first embodiment, the time-division setting information may be notified by including the time-division setting information in the time-division communication start command transmitted by broadcast communication.

The method of determining and notifying the time-division setting information including the data packet size for the time-division communication described above is merely illustrative, and another method may be adopted. For example, parameters other than the function information may be fixed and the data packet size may be determined based on the function information, or the data packet structure may be different.

The camera microcomputer 205 may determine a data packet size itself described above, information for determining the data packet size (such as the maximum data size that the accessory apparatus can transmit and receive as a data packet), or information that can be converted into the data packet size. That is, the camera microcomputer 205 may determine information about the data packet size.

Third Embodiment

A description will now be given of a third embodiment according to the disclosure. The camera system according to this embodiment has the same configuration as that of the second embodiment. In this embodiment, in a case where the determined data packet size is smaller than the required data size of the function, the data is divided, transmitted, and received. In other words, the data size information is determined so that if the data packet size is larger than the maximum data size that can be transmitted or received at one time to or from the accessory apparatus, the data packet is divided into a plurality of data packets within the maximum data size. This configuration enables more functions to be executed.

<Determination of Data Packet Size Using Data Division>

A description will now be given of a method of determining the data packet size for time-division communication according to this embodiment. FIG. 24 illustrates accessory characteristic information of each accessory apparatus in this embodiment. The number of required data bytes has the same value as that illustrated in FIG. 20 in the second embodiment, but in this embodiment, the number of required data bytes indicates the number of requested data bytes within the required period. Even in a case where the number of required data bytes for executing the function cannot be secured in determining the data packet, the function data, which is the data required to be transmitted and received for executing the function, is divided into a plurality of data packets, and transmitted and received at different communication periods. Thereby, that function can be executed. The function data may be control values for image stabilization, autofocus, aperture driving, zoom driving, etc., or may be commands for executing these controls. Alternatively, it may be an instruction to interrupt or terminate time-division communication.

As for the transmission/reception buffer size, both the transmission buffer size and the reception buffer size of the intermediate adapter 300 are 8 bytes, which is smaller than those of the first and second embodiments. Other accessory characteristic information is the same as that illustrated in FIG. 20.

Figure 25:
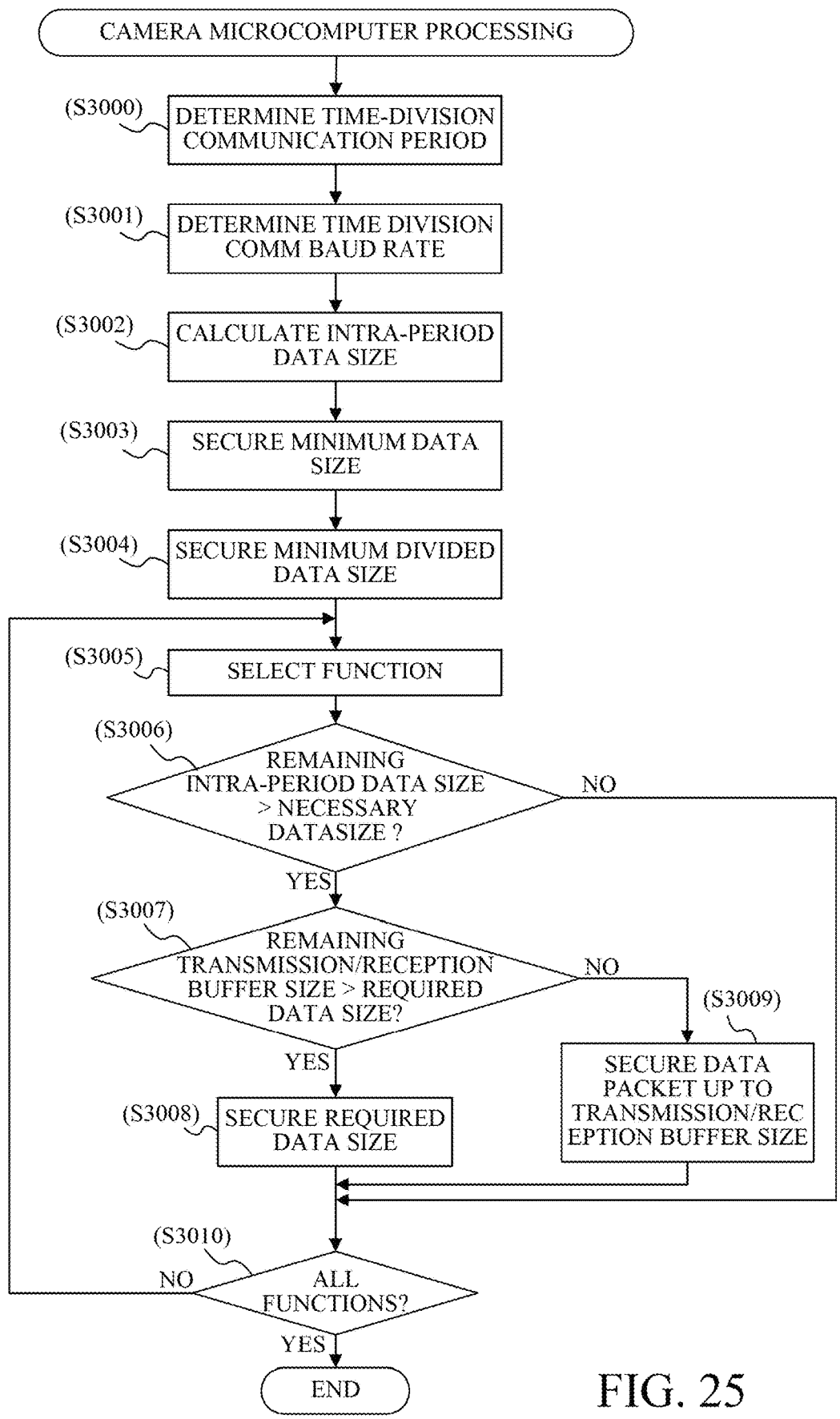
FIG. 25 is a flowchart illustrating data packet size determination processing according to a third embodiment.

A flowchart in FIG. 25 illustrates processing of determining a data packet size based on the accessory characteristic information described in FIG. 24. The camera microcomputer 205 executes this processing according to a computer program.

S3000 to S3003 are the same as S2000 to S2003 of the second embodiment (FIG. 21).

In S3004, the camera microcomputer 205 secures the minimum divided data size within the remaining intra-period data size. The minimum divided data size is the minimum data size that can be transmitted and received by dividing function data. By securing the minimum divided data size, the function data to be transmitted and received can be divided, transmitted and received in order to execute the function within the minimum divided data size and the data size secured in S3009, which will be described below, even if the required data size of the function is not secured in S3008. The data size secured as the minimum division data size may be used to transmit and receive a plurality of function data.

Next, in S3005, the camera microcomputer 205 selects a function according to the priority determined based on the function information, as in S2004 of FIG. 21.

Then, in S3006, the camera microcomputer 205 compares the required data size of the function and the remaining intra-period data size in the same manner as that in S2005 of FIG. 21. In a case where the remaining intra-period data size is larger, the flow proceeds to S3007; otherwise, the flow proceeds to S3010.

In S3007, the camera microcomputer 205 compares a remaining transmission/reception buffer size obtained by subtracting the already secured data size from the transmission/reception buffer size of the corresponding data packet with the required data size of the function. In a case where the remaining transmission/reception buffer size is larger, the flow proceeds to S3008; otherwise, the flow proceeds to S3009.

In S3008, similarly to S2006, the camera microcomputer 205 secures the required data size of the function within the remaining intra-period data size and allocates it to the corresponding data packet.

In S3009, the camera microcomputer 205 secures a data packet corresponding to the function up to the transmission/reception buffer size. Different from the second embodiment, added S3007 and S3009 can limit the data packet size so that it does not exceed the transmission/reception buffer size.

In S3010, the camera microcomputer 205 determines whether data sizes have been allocated to all functions. In a case where all functions have been allocated, this processing ends. In a case where the allocation processing to all functions has not yet been completed, the flow returns to S3005 to select the next function according to the priority determined based on the function information.

Figures 27, 28:
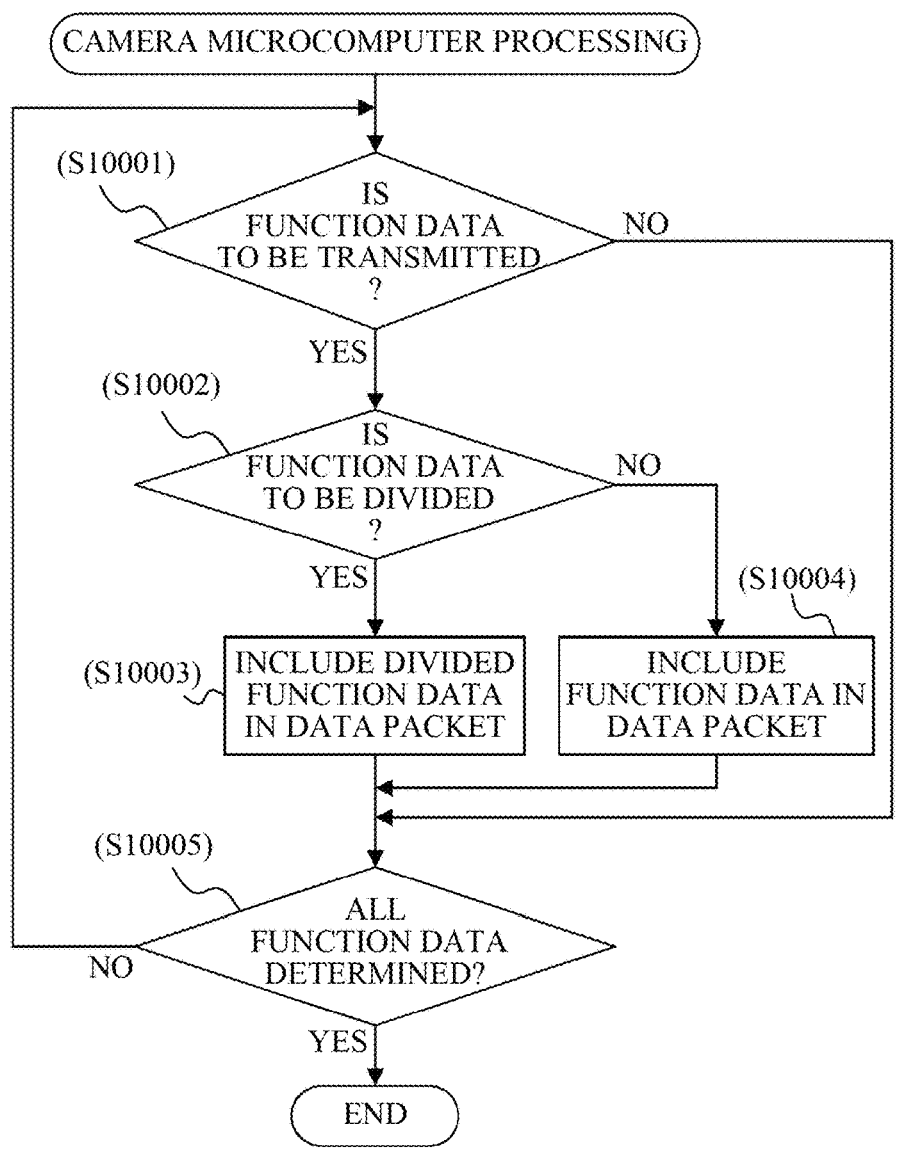
FIG. 27 illustrates setting information for the time-division communication determined based on characteristic information according to the third embodiment.
FIG. 28 is a flowchart illustrating processing for dividing and transmitting data during the time-division communication according to the third embodiment.

The camera microcomputer 205 repeats the above processing until data sizes are assigned to all functions. Thus, the data packet size is determined by allocating the data size based on the function information. Securing the minimum divided data size in advance enables the function to be executed, even if the required data size of the function is not secured, by dividing the data packet and transmitting and receiving it as illustrated in FIG. 28, which will be described below.

Figure 26:
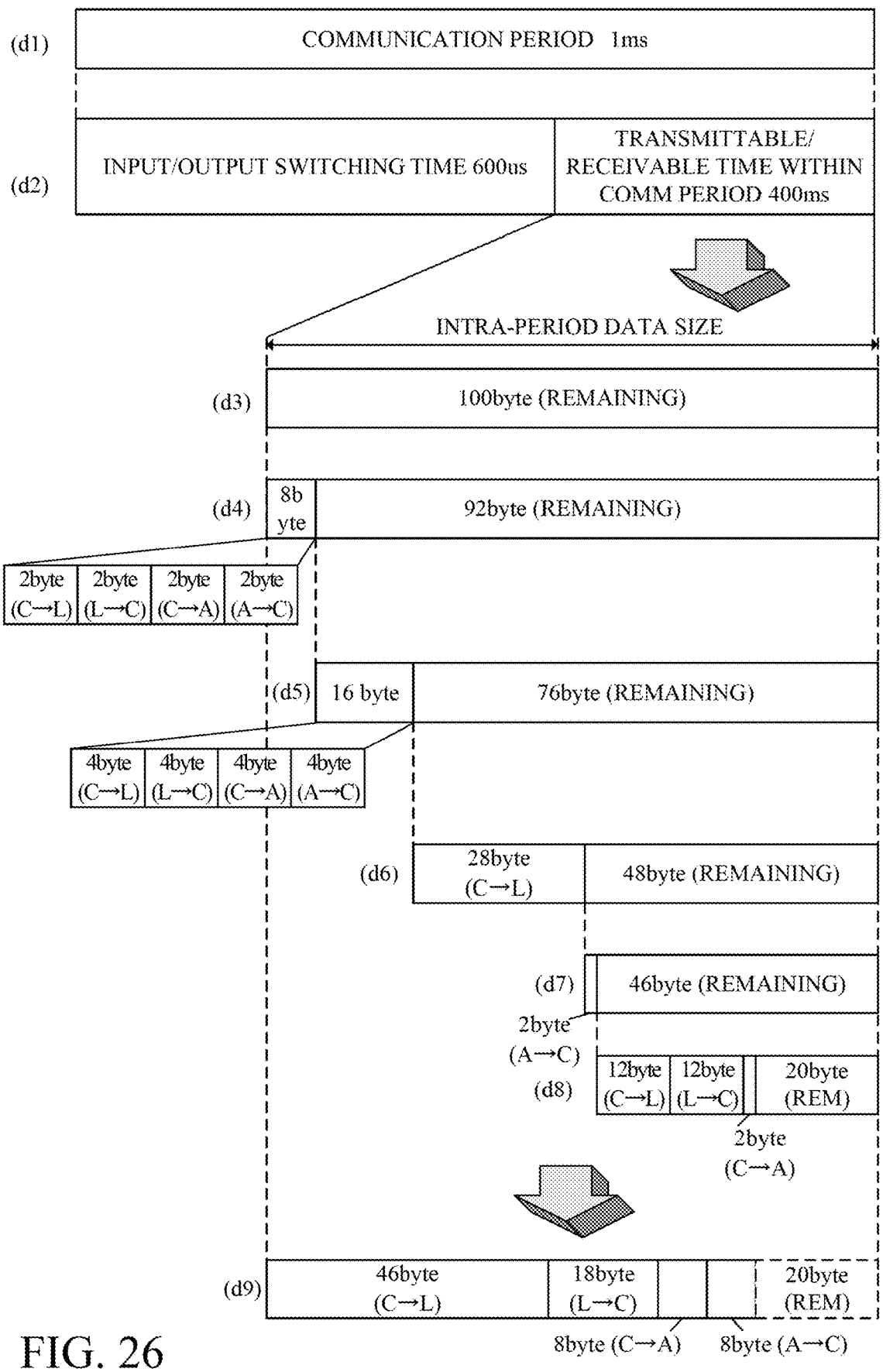
FIG. 26 illustrates a flow of determining the data packet size according to the third embodiment.

FIG. 26 illustrates a flow in which the camera microcomputer 205 performs the processing illustrated in FIG. 25 based on the accessory characteristic information illustrated in FIG. 24 to determine the data packet size.

(d1) to (d4) are the same as (c1) to (c4) in the second embodiment (FIG. 22). At (d4), the remaining intra-period data size is 92 bytes.

In (d5), in S3004, a minimum divided data size of at least 4 bytes for each data packet as a data size that enables at least a divided command to be transmitted and received, that is, totally 16 bytes, is secured.

In (d6), in S3008, a required data size is secured after the flow passes through S3006 and S3007 for the image stabilizing control function initially selected in S3005. In this embodiment, the required data size of 28 bytes is allocated to a C→L data packet.

Next, in (d7), the remaining transmission/reception buffer size and the required data size are compared in S3007 for a control ring operation function selected in S3005. As a result, since the required data size cannot be secured, the data packet for the transmission/reception buffer size is secured in S3009. In this embodiment, 6 bytes are already secured for an A→C data packet corresponding to a control ring operation function. Since the transmission/reception buffer size is 8 bytes, 2 bytes are secured for the A→C data packet corresponding to the control ring operation function.

Next, in (d8), a status notifying function is selected in S3005, and 12 bytes, which is a required data size of the status notifying function, is secured in S3008 for the C→L and L→C data packets. The C→A and A→C data packets are secured up to the transmission/reception buffer size in S3009. 6 bytes have already been secured for the C→A data packet, and since the transmission/reception buffer size is 8 bytes, 2 bytes of the C→A data packet corresponding to the status notifying function are secured. 8 bytes have already been secured for the A→C data packets, and since the transmission/reception buffer size is 8 bytes, no A→C data packets corresponding to the status notifying function are secured.

As illustrated in (d9), the secured data size is organized for each data packet as follows: 46 bytes for C→L, 18 bytes for L→C, 8 bytes for C→A, and 8 bytes for A→C. 20 bytes remain.

FIG. 27 illustrates time-division setting information (including a communication period, a communication baud rate, and a data packet size) that the camera microcomputer 205 notifies to the lens microcomputer 111 and the adapter microcomputer 302. The data packet size in this embodiment is restricted by the transmission/reception buffer size different from the time-division setting information illustrated in the second embodiment (FIG. 23) as follows: 8 bytes for C→A and 8 bytes for A→C. Therefore, in this embodiment, the control ring operating function is executed by transmitting and receiving divided function data.

The method of notifying the time-division setting information from the camera 200 to the interchangeable lens 100 and the intermediate adapter 300 is the same as that described with reference to FIG. 23.

<Time-Division Communication Processing of Divided Function Data>

The camera microcomputer 205, lens microcomputer 111, and adapter microcomputer 302 each have a communication block and a function block. The communication block performs communication control including the time-division processing illustrated in FIGS. 10A and 10B. The function block controls the execution of a function. The communication block and the function block also have a shared memory that shares function data and a local memory that the communication block accesses. The shared memory and the local memory may be the same memory, and a plurality of function blocks may be provided for each function. For example, the function blocks may include a function block for an image stabilizing control function and a function block for a control ring operation function.

The camera microcomputer 205 and the lens microcomputer 111 perform the time-division communication processing illustrated in FIGS. 10A and 10B in the first embodiment. Since the time-division communication processing executed by the adapter microcomputer 302 is basically the same as the time-division communication processing executed by the lens microcomputer 111, a description thereof will be omitted.

FIG. 28 illustrates processing for generating a transmission data packet based on a data packet size previously determined by the camera microcomputer 205. This processing is performed in S507 and S514 of FIG. 10A. The lens microcomputer 111 generates a transmission data packet in S607 and S614 of FIG. 10B in the same manner as that of in FIG. 28. A detailed description will be omitted of the processing of the lens microcomputer 111 to generate the transmission data packet.

In S10001, the function block of the camera microcomputer 205 determines whether or not function data is to be transmitted. If the function data is to be transmitted, the camera microcomputer 205 acquires the function data from the shared memory, and the flow proceeds to S10002. If the function data is not to be transmitted, the flow proceeds to S10005. The function block prepares the function data in the shared memory before determining whether or not the function data is to be transmitted.

In this embodiment, the function block of the camera microcomputer 205 prepares function data for an image stabilizing control function in a shared memory, and notifies the communication block that the function data for the image stabilizing control function is to be transmitted for each communication period. The function block of the adapter microcomputer 302 prepares function data for a control ring operation function in a shared memory, and notifies the communication block that the function data for the control ring operation function is to be transmitted once every 16 periods. However, these are merely illustrative. For example, the function data of the control ring operation function may be determined to be transmitted only in a case where the control ring is actually operated by the user, or may not be transmitted in a case where the image stabilizing function is turned off.

Next, in S10002, the communication block of the camera microcomputer 205 determines whether or not the function data is to be divided and transmitted. In a case where the function data is to be divided and transmitted, the flow proceeds to S10003, and in a case where the function data is not to be divided and transmitted, the flow proceeds to S10004. In this embodiment, whether or not to divide the function data is determined based on whether or not the required data size is secured for that function in S3008, which is the data packet size determination step described with reference to FIG. 25. That is, In a case where the required data size is not secured, it is determined that the function data is to be divided. This is merely illustrative, and whether or not to divide and transmit the function data may be determined depending on whether or not the data packet size is exceeded in including the function data in the data packet.

In S10003, the communication block of the camera microcomputer 205 includes in a data packet the command packet obtained by dividing the function data at the accessory apparatus within the transmission data packet size. In this embodiment, the control ring operation function of the adapter microcomputer 302 corresponds to the function of dividing function data. The number of data bytes required by the control ring operation function is 16 bytes. The data size assigned to the control ring operation function is totally 6 bytes, which is the sum of 4 bytes of the minimum divided data size of the L→C data packet size, and 2 bytes of the data packet corresponding to the control ring operation function secured up to the transmission/reception buffer size. Thus, the command packet is generated by dividing the function data within the allocated size.

This embodiment simply divides the function data of the control ring operation function into three pieces: first to sixth bytes, seventh to twelfth bytes, and thirteenth to sixteenth bytes, which are 6 bytes each. Then, first, the command packet of the first to sixth bytes is included in the data packet. The command packet of the seventh to twelfth bytes and the command packet of the thirteenth to sixteenth bytes are stored in the local memory, and are included in the data packet in S10003 at the time of data packet generations in the next period and the period just after the next period. Then, the flow proceeds to S10005.

This method of generating a command packet by dividing function data is merely illustrative, and other generation methods may be used. For example, for each command packet generated by division, the data sizes may or may not be secured for the command length information LENn, the command CMDn, and the checksum PSUM of the command packet, which are the components of the command packet. In order to secure the data size of the status notifying function, etc., the command packet may be divided into smaller command packets. The number of divisions of function data may be 16 according to the required period.

In S10004, the communication block of the camera microcomputer 205 includes a command packet containing all data necessary for the accessory apparatus to perform its function in a transmission data packet. More specifically, the camera microcomputer 205 includes the command packet for the image stabilizing control function in the transmission data packet. The number of data bytes required for the image stabilizing control function is 24 bytes, and a 24-byte command packet is generated and included in the data packet without dividing the function data. Then, the flow proceeds to S10005.

In S10005, the communication block of the camera microcomputer 205 confirms whether or not the determination in S10001 has been executed for all function data, and the flow returns to S10001 if there is any function data that has not been executed. In this way, this processing is repeated until whether or not transmission is necessary is determined for all function data. If the determination in S10001 is executed for all function data, the flow proceeds to END. END indicates the end of this processing of generating one transmission data packet.

Figure 29:
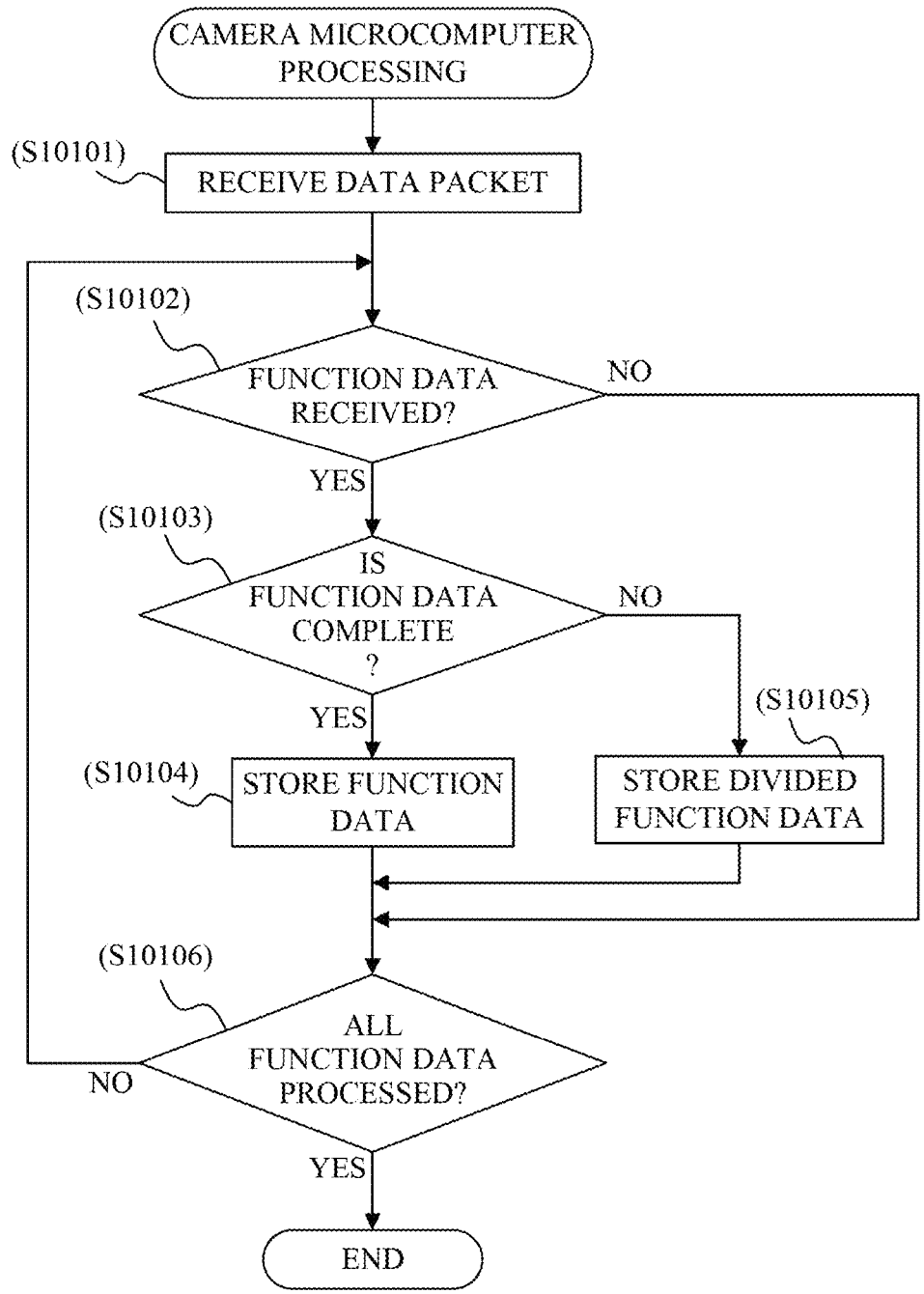
FIG. 29 is a flowchart illustrating processing for dividing and receiving data during the time-division communication according to the third embodiment.

FIG. 29 illustrates processing in which the camera microcomputer 205 receives and analyzes a transmission data packet generated based on a predetermined data packet size. This processing is performed in S512 of FIG. 10A. The lens microcomputer 111 receives and analyzes a transmission data packet in the same processing as that of FIG. 29 in S612 in FIG. 10B. A detailed description of the processing of receiving and analyzing the transmission data packet by the lens microcomputer 111 will be omitted.

The communication block of the camera microcomputer 205 waits to receive a data packet in S10101, and the flow proceeds to S10102 upon reception.

In S10102, the communication block of the camera microcomputer 205 determines whether or not the function data has been received. If not, the flow proceeds to S10106. If received, the communication block analyzes the command packet within the received data packet and selects one of the function data. In this embodiment, the function data are selected in order of reception. The function data may be selected according to the priority of the function information associated with it.

Next, in S10103, the communication block of the camera microcomputer 205 determines whether or not the received function data is divided function data (referred to as divided function data hereinafter). If it is not divided function data, the flow proceeds to S10104, and if it is divided function data, the flow proceeds to S10105. If the received function data is the divided function data and the pre-division function data is complete with the divided function data acquired this time, the pre-division function data is generated by extracting the divided function data from the local memory, and the flow proceeds to S10104.

In S10104, the communication block of the camera microcomputer 205 stores the received function data in the shared memory. The function block performs that function based on the function data stored in the shared memory. In this embodiment, the function block of the camera microcomputer 205 executes the control ring operation function based on the function data of the control ring operation function. For example, if the control ring is assigned a function of changing a set value of a shutter speed, the function block of the camera microcomputer 205 changes the shutter speed set value in the camera 200 according to the operation of the control ring. The function block of the lens microcomputer 111 executes an image stabilizing function based on the function data of the image stabilizing control function received from the camera microcomputer 205. Another function is also executed based on the function data.

In S10105, the communication block of the camera microcomputer 205 stores the received divided function data in the local memory.

Next, in S10106, the communication block of the camera microcomputer 205 determines whether or not all the received function data have been processed. If all the function data have not yet been processed, the flow returns to S10102 to continue to analyze a data packet. If all function data have been processed, the flow proceeds to END. END indicates the end of analysis processing for one received data packet.

Each of the above embodiments can provide efficient data communication between the image pickup apparatus and the accessory apparatus, and thereby achieve excellent communication between the image pickup apparatus and the accessory apparatus.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-083901, filed on May 23, 2022, which is hereby incorporated by reference herein in its entirety.

What is claimed is:

1. A camera that is operable while a plurality of accessory apparatuses are connected to the camera, the camera comprising:
    a memory device that stores a set of instructions; and
    at least one processor that executes the instructions to:
    control communication with the plurality of accessory apparatuses using a notification channel for notification with the plurality of accessory apparatuses and a data communication channel for data communication with the plurality of accessory apparatuses, and
    perform first communication for simultaneous communication with the plurality of accessory apparatuses using the data communication channel, and second communication for individual communication with a specific accessory apparatus among the plurality of accessory apparatuses using the data communication channel,
    wherein in performing the second communication with the plurality of accessory apparatuses by switching between specific accessory apparatuses in a predetermined order within one or more communication periods, at least one of the communication period, a communication speed, a data packet number, a data packet length, and a combination and an order of a communication source and a communication destination to be communicated for each communication period is determined based on accessory information acquired from the plurality of accessory apparatuses.

2. The camera according to claim 1, wherein the at least one processor transmits, to the plurality of accessory apparatuses through the first communication or the second communication, at least one of the communication period, the communication speed, the data packet number, the data packet length, and the combination and order of the communication source and the communication destination, which has been determined.

3. The camera according to claim 1, wherein before performing the second communication by switching between the specific accessory apparatuses in the predetermined order, the at least one processor sequentially specifies each of the plurality of accessory apparatuses as the specific accessory apparatus through the first communication and acquires the accessory information from the specific accessory apparatus through the second communication.

4. The camera according to claim 1, wherein the accessory information includes information indicating a function supported by each of the plurality of accessory apparatuses.

5. The camera according to claim 1, wherein the accessory information includes information indicating the number of the plurality of accessory apparatuses.

6. The camera according to claim 1, wherein the at least one processor determines at least one of the data packet number, the data packet length, and the combination and order of the communication source and the communication destination, based on the accessory information and the communication period.

7. The camera according to claim 1, wherein the at least one processor determines a data packet for each communication period so that a data packet of the same combination of the communication source and the communication destination is included every one or more communication periods.

8. The camera according to claim 1, wherein the at least one processor changes at least one of the data packet number, the data packet length, and the combination and order of the communication source and the communication destination, during the second communication by switching between the specific accessory apparatuses in the predetermined order.

9. An accessory apparatus connectable to a camera that is operable while a plurality of accessory apparatuses are connected to the camera, the accessory apparatus comprising:
   a memory device that stores a set of instructions; and
   at least one processor that executes the instructions to:
      control communication with the camera using a notification channel for notification with the camera and a data communication channel for data communication with the camera, and
      perform first communication for simultaneous communication from the camera to the plurality of accessory apparatuses using the data communication channel, and second communication for individual communication with the camera using the data communication channel,
   wherein in performing the second communication with the plurality of accessory apparatuses by switching between specific accessory apparatuses that communicate in a predetermined order within one or more communication periods, at least one of the communication period, a communication speed, a data packet number, a data packet length, and a combination and order of a communication source and a communication destination to be communicated for each communication period is determined based on accessory information acquired by the camera from the plurality of accessory apparatuses.

10. The accessory apparatus according to claim 9, wherein the at least one processor receives, from the camera through the first communication or the second communication, at least one of the communication period, the communication speed, the data packet number, the data packet length, and the combination and order of the communication source and the communication destination, which has been determined by the camera.

11. The accessory apparatus according to claim 9, wherein before the camera performs the second communication by switching between the specific accessory apparatuses in the predetermined order, the at least one processor transmits the accessory information to the camera through the second communication in a case where the accessory apparatus is specified as a specific accessory apparatus through the first communication.

12. The accessory apparatus according to claim 9, wherein the accessory information includes information indicating a function supported by the accessory apparatus.

13. The accessory apparatus according to claim 9, wherein the at least one processor performs the second communication with the camera in a case where the camera has changed at least one of the data packet number, the data packet length, and the combination and order of the communication source and the communication destination, during the second communication by switching between the specific accessory apparatuses.

14. A communication control method for a camera that is operable while a plurality of accessory apparatuses are connected to the camera, the communication control method being configured to control communication with the plurality of accessory apparatuses using a notification channel for notification with the plurality of accessory apparatuses and a data communication channel for data communication with the plurality of accessory apparatuses, and the camera being configured to perform first communication for simultaneous communication with the plurality of accessory apparatuses using the data communication channel, and second communication for individual communication with a specific accessory apparatus among the plurality of accessory apparatuses using the data communication channel, the communication control method comprising:
   causing the camera to determine, in performing the second communication with the plurality of accessory apparatuses by switching between specific accessory apparatuses in a predetermined order within one or more communication periods, at least one of the communication period, a communication speed, a data packet number, a data packet length, and a combination and order of a communication source and a communication destination to be communicated for each communication period, based on accessory information acquired from the plurality of accessory apparatuses.

15. A non-transitory computer-readable storage medium storing a program that causes a computer of a camera that is operable while a plurality of accessory apparatuses are connected to the camera, to execute the communication control method according to claim 14.

16. A communication control method for an accessory apparatus connectable to a camera that is operable while a plurality of accessory apparatuses are connected to the camera, the communication control method being configured to control communication with the camera using a notification channel for notification with the camera and a data communication channel for data communication with the camera, and the accessory apparatus being configured to perform first communication for simultaneous communication from the camera to the plurality of accessory apparatuses using the data communication channel, and second communication for individual communication with the camera using the data communication channel, the communication control method comprising:
> causing the accessory apparatus to determine, in performing the second communication with the plurality of accessory apparatuses by switching between specific accessory apparatuses that communicate in a predetermined order within one or more communication periods, at least one of the communication period, a communication speed, a data packet number, a data packet length, and a combination and order of a communication source and a communication destination to be communicated for each communication period, based on accessory information acquired by the camera from the plurality of accessory apparatuses.

17. A non-transitory computer-readable storage medium storing a program that causes a computer of an accessory apparatus connectable to a camera that is operable while a plurality of accessory apparatuses are connected to the camera, to execute the communication control method according to claim 16.

* * * * *